US008473511B2

(12) United States Patent
Arrouye et al.

(10) Patent No.: US 8,473,511 B2
(45) Date of Patent: Jun. 25, 2013

(54) METHODS AND SYSTEMS FOR MANAGING DATA

(75) Inventors: Yan Arrouye, Mountain View, CA (US); Dominic Giampaolo, Mountain View, AZ (US); Bas Ording, San Francisco, CA (US); Gregory Christie, San Jose, CA (US); Stephen Olivier Lemay, San Francisco, CA (US); Marcel Van Os, San Francisco, CA (US); Imran Chaudhri, San Francisco, CA (US); Kevin Tiene, Cupertino, CA (US); Pavel Cisler, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/532,719

(22) Filed: Jun. 25, 2012

(65) Prior Publication Data

US 2012/0265786 A1 Oct. 18, 2012

Related U.S. Application Data

(63) Continuation of application No. 13/424,248, filed on Mar. 19, 2012, which is a continuation of application No. 11/648,370, filed on Dec. 28, 2006, now Pat. No. 8,166,065, which is a continuation of application No. 10/877,584, filed on Jun. 25, 2004, now Pat. No. 7,730,012.

(51) Int. Cl.
*G06F 17/30* (2006.01)

(52) U.S. Cl.
USPC .......................... 707/775; 707/805; 715/700

(58) Field of Classification Search
USPC .............. 715/200, 243, 273, 765, 780, 781, 715/788, 792, 804, 700, 793; 707/805, 764, 707/765, 766, 713, 731, 738, 740, 743, 744, 707/745, 746, 774, 775
See application file for complete search history.

(56) References Cited

U.S. PATENT DOCUMENTS

| 4,270,182 A | 5/1981 | Asija |
| 4,704,703 A | 11/1987 | Fenwick |
| 4,736,308 A | 4/1988 | Heckel |
| 4,939,507 A | 7/1990 | Beard et al. |

(Continued)

FOREIGN PATENT DOCUMENTS

| EP | 1 024 440 A2 | 8/2000 |
| WO | WO 01/46870 A1 | 6/2001 |

(Continued)

OTHER PUBLICATIONS

PCT Invitation to Pay Additional Fees for PCT International Appln No. PCT/US2005/022535, mailed Nov. 14, 2005 (6 pages).

(Continued)

*Primary Examiner* — Greta Robinson
(74) *Attorney, Agent, or Firm* — Blakely, Sokoloff, Taylor & Zafman LLP

(57) ABSTRACT

Systems and methods for managing data, such as metadata. In one exemplary method, metadata from files created by several different software applications are captured, and the captured metadata is searched. The type of information in metadata for one type of file differs from the type of information in metadata for another type of file. Other methods are described and data processing systems and machine readable media are also described.

24 Claims, 47 Drawing Sheets

U.S. PATENT DOCUMENTS

| | | | |
|---|---|---|---|
| 4,985,863 | A | 1/1991 | Fujisawa et al. |
| 5,008,853 | A | 4/1991 | Bly et al. |
| 5,072,412 | A | 12/1991 | Henderson, Jr. et al. |
| 5,161,223 | A | 11/1992 | Abraham |
| 5,228,123 | A | 7/1993 | Heckel |
| 5,231,578 | A * | 7/1993 | Levin et al. .................. 715/203 |
| 5,241,671 | A | 8/1993 | Reed et al. |
| 5,319,745 | A | 6/1994 | Vinsonneau et al. |
| 5,355,497 | A | 10/1994 | Cohen-Levy |
| 5,392,428 | A | 2/1995 | Robins |
| 5,437,029 | A | 7/1995 | Sinha |
| 5,504,852 | A | 4/1996 | Thompson-Rohrlich |
| 5,544,360 | A | 8/1996 | Lewak et al. |
| 5,557,793 | A | 9/1996 | Koerber |
| 5,592,608 | A | 1/1997 | Weber et al. |
| 5,623,681 | A | 4/1997 | Rivette et al. |
| 5,644,657 | A | 7/1997 | Capps et al. |
| 5,659,735 | A | 8/1997 | Parrish et al. |
| 5,668,966 | A | 9/1997 | Ono et al. |
| 5,689,665 | A | 11/1997 | Mitsui et al. |
| 5,710,844 | A | 1/1998 | Capps et al. |
| 5,761,655 | A | 6/1998 | Hoffman |
| 5,761,678 | A | 6/1998 | Bendert et al. |
| 5,828,376 | A | 10/1998 | Solimene et al. |
| 5,832,500 | A | 11/1998 | Burrows |
| 5,845,301 | A | 12/1998 | Rivette et al. |
| 5,890,147 | A | 3/1999 | Peltonen et al. |
| 5,913,215 | A | 6/1999 | Rubinstein et al. |
| 5,950,190 | A | 9/1999 | Yeager et al. |
| 5,966,710 | A | 10/1999 | Burrows |
| 5,983,248 | A | 11/1999 | DeRose et al. |
| 6,003,034 | A | 12/1999 | Tuli |
| 6,012,053 | A | 1/2000 | Pant et al. |
| 6,023,721 | A | 2/2000 | Cummings |
| 6,026,404 | A | 2/2000 | Adunuthula et al. |
| 6,055,543 | A | 4/2000 | Christensen et al. |
| 6,061,692 | A | 5/2000 | Thomas et al. |
| 6,067,541 | A | 5/2000 | Raju et al. |
| 6,078,924 | A | 6/2000 | Ainsbury et al. |
| 6,091,411 | A | 7/2000 | Straub et al. |
| 6,115,717 | A | 9/2000 | Mehrotra et al. |
| 6,119,118 | A | 9/2000 | Kain, III et al. |
| 6,185,574 | B1 | 2/2001 | Howard et al. |
| 6,195,662 | B1 | 2/2001 | Ellis et al. |
| 6,202,060 | B1 | 3/2001 | Tran |
| 6,208,345 | B1 | 3/2001 | Sheard et al. |
| 6,212,518 | B1 | 4/2001 | Yoshida et al. |
| 6,239,802 | B1 | 5/2001 | Lahey et al. |
| 6,243,724 | B1 | 6/2001 | Mander et al. |
| 6,246,410 | B1 | 6/2001 | Bergeron et al. |
| 6,272,489 | B1 | 8/2001 | Rauch et al. |
| 6,301,586 | B1 | 10/2001 | Yang et al. |
| 6,353,823 | B1 | 3/2002 | Kumar |
| 6,363,386 | B1 | 3/2002 | Soderberg et al. |
| 6,370,562 | B2 | 4/2002 | Page et al. |
| 6,374,260 | B1 | 4/2002 | Hoffert et al. |
| 6,385,600 | B1 | 5/2002 | McGuinness et al. |
| 6,389,412 | B1 | 5/2002 | Light |
| 6,389,467 | B1 | 5/2002 | Eyal |
| 6,401,097 | B1 | 6/2002 | McCotter et al. |
| 6,408,301 | B1 | 6/2002 | Patton et al. |
| 6,434,548 | B1 | 8/2002 | Emens et al. |
| 6,449,627 | B1 | 9/2002 | Baer et al. |
| 6,466,237 | B1 | 10/2002 | Miyao et al. |
| 6,473,794 | B1 | 10/2002 | Guheen et al. |
| 6,480,835 | B1 | 11/2002 | Light |
| 6,486,897 | B1 | 11/2002 | Arrouye et al. |
| 6,549,916 | B1 | 4/2003 | Sedlar |
| 6,564,225 | B1 | 5/2003 | Brogliatti et al. |
| 6,567,805 | B1 | 5/2003 | Johnson et al. |
| 6,613,101 | B2 | 9/2003 | Mander et al. |
| 6,633,864 | B1 | 10/2003 | Christensen et al. |
| 6,633,867 | B1 | 10/2003 | Kraft et al. |
| 6,636,856 | B2 | 10/2003 | Pasquali |
| 6,647,383 | B1 | 11/2003 | August |
| 6,665,657 | B1 | 12/2003 | Dibachi |
| 6,668,377 | B1 | 12/2003 | Dunn |
| 6,681,227 | B1 | 1/2004 | Kojima et al. |
| 6,681,229 | B1 | 1/2004 | Cason et al. |
| 6,687,712 | B2 | 2/2004 | Mito et al. |
| 6,691,125 | B1 | 2/2004 | Engle et al. |
| 6,704,739 | B2 | 3/2004 | Craft et al. |
| 6,721,747 | B2 | 4/2004 | Lipkin |
| 6,732,088 | B1 | 5/2004 | Glance |
| 6,741,996 | B1 | 5/2004 | Brechner et al. |
| 6,757,673 | B2 | 6/2004 | Makus et al. |
| 6,760,721 | B1 | 7/2004 | Chasen et al. |
| 6,760,731 | B2 | 7/2004 | Huff |
| 6,766,315 | B1 | 7/2004 | Bratsos et al. |
| 6,772,167 | B1 | 8/2004 | Snavely et al. |
| 6,785,683 | B1 | 8/2004 | Zodik et al. |
| 6,785,688 | B2 | 8/2004 | Abajian et al. |
| 6,804,674 | B2 | 10/2004 | Hsiao et al. |
| 6,847,959 | B1 | 1/2005 | Arrouye et al. |
| 6,847,982 | B2 | 1/2005 | Parker et al. |
| 6,850,257 | B1 | 2/2005 | Colleran et al. |
| 6,862,713 | B1 | 3/2005 | Kraft et al. |
| 6,895,430 | B1 | 5/2005 | Schneider |
| 6,947,959 | B1 | 9/2005 | Gill |
| 6,952,695 | B1 | 10/2005 | Trinks et al. |
| 6,961,731 | B2 | 11/2005 | Holbrook |
| 6,980,949 | B2 | 12/2005 | Ford |
| 7,039,635 | B1 | 5/2006 | Morgan et al. |
| 7,039,637 | B2 | 5/2006 | Murray et al. |
| 7,054,870 | B2 | 5/2006 | Holbrook |
| 7,137,099 | B2 | 11/2006 | Knight et al. |
| 7,155,504 | B1 | 12/2006 | Fujieda |
| 7,162,466 | B2 | 1/2007 | Kaasten et al. |
| 7,162,473 | B2 | 1/2007 | Dumais et al. |
| 7,188,100 | B2 | 3/2007 | De Bellis et al. |
| 7,188,317 | B1 | 3/2007 | Hazel |
| 7,209,915 | B1 | 4/2007 | Taboada et al. |
| 7,266,546 | B2 | 9/2007 | Son |
| 7,269,604 | B2 | 9/2007 | Moore et al. |
| 7,275,063 | B2 | 9/2007 | Horn |
| 7,302,435 | B2 | 11/2007 | Kohut et al. |
| 7,334,195 | B2 | 2/2008 | Gemmell |
| 7,337,448 | B1 | 2/2008 | Dalia et al. |
| 7,340,472 | B2 | 3/2008 | Makus |
| 7,493,315 | B2 | 2/2009 | Holbrook |
| 7,555,476 | B2 | 6/2009 | Holbrook |
| 7,613,689 | B2 | 11/2009 | Arrouye et al. |
| 7,734,690 | B2 * | 6/2010 | Moromisato et al. .......... 709/204 |
| 7,769,752 | B1 | 8/2010 | Turner |
| 7,769,794 | B2 * | 8/2010 | Moore et al. ................... 707/831 |
| 7,925,657 | B2 | 4/2011 | Broussard et al. |
| 2001/0037332 | A1 | 11/2001 | Miller et al. |
| 2001/0054042 | A1 | 12/2001 | Watkins et al. |
| 2002/0002453 | A1 | 1/2002 | Lazaridis et al. |
| 2002/0004709 | A1 | 1/2002 | Peter et al. |
| 2002/0032677 | A1 | 3/2002 | Morgenthaler et al. |
| 2002/0040442 | A1 | 4/2002 | Ishidera |
| 2002/0049738 | A1 | 4/2002 | Epstein |
| 2002/0049749 | A1 | 4/2002 | Helgeson et al. |
| 2002/0059210 | A1 | 5/2002 | Makus |
| 2002/0059288 | A1 | 5/2002 | Yagi et al. |
| 2002/0069218 | A1 | 6/2002 | Sull et al. |
| 2002/0075312 | A1 | 6/2002 | Amadio et al. |
| 2002/0122077 | A1 | 9/2002 | Doney |
| 2002/0135612 | A1 | 9/2002 | Royer et al. |
| 2002/0152267 | A1 | 10/2002 | Lennon |
| 2002/0167538 | A1 | 11/2002 | Bhetanabhotla |
| 2002/0169771 | A1 | 11/2002 | Melmon et al. |
| 2002/0184195 | A1 | 12/2002 | Qian |
| 2002/0184196 | A1 | 12/2002 | Lehmeier et al. |
| 2002/0188603 | A1 | 12/2002 | Baird et al. |
| 2002/0188616 | A1 | 12/2002 | Chinnici et al. |
| 2002/0188620 | A1 | 12/2002 | Doss et al. |
| 2002/0194164 | A1 | 12/2002 | Morrow |
| 2002/0196295 | A1 * | 12/2002 | Haley et al. ................... 345/968 |
| 2003/0005464 | A1 | 1/2003 | Gropper et al. |
| 2003/0009484 | A1 | 1/2003 | Hamanaka et al. |
| 2003/0018622 | A1 | 1/2003 | Chau |
| 2003/0028545 | A1 | 2/2003 | Wang et al. |
| 2003/0033296 | A1 | 2/2003 | Rothmuller et al. |
| 2003/0046292 | A1 | 3/2003 | Subramanian et al. |
| 2003/0069880 | A1 | 4/2003 | Harrison et al. |

| | | |
|---|---|---|
| 2003/0069882 A1 | 4/2003 | Nieswand et al. |
| 2003/0069902 A1 | 4/2003 | Narang et al. |
| 2003/0084087 A1 | 5/2003 | Berry |
| 2003/0088567 A1 | 5/2003 | Rosenfelt et al. |
| 2003/0088573 A1 | 5/2003 | Stickler |
| 2003/0097361 A1 | 5/2003 | Huang et al. |
| 2003/0098893 A1 | 5/2003 | Makinen |
| 2003/0100999 A1 | 5/2003 | Markowitz |
| 2003/0117907 A1 | 6/2003 | Kang |
| 2003/0122873 A1 | 7/2003 | Dieberger et al. |
| 2003/0122874 A1 | 7/2003 | Dieberger et al. |
| 2003/0135828 A1 | 7/2003 | Dockter et al. |
| 2003/0135840 A1 | 7/2003 | Szabo et al. |
| 2003/0140035 A1 | 7/2003 | Burrows |
| 2003/0140051 A1 | 7/2003 | Fujiwara et al. |
| 2003/0142953 A1 | 7/2003 | Terada et al. |
| 2003/0144990 A1 | 7/2003 | Benelisha et al. |
| 2003/0158855 A1 | 8/2003 | Farnham et al. |
| 2003/0164855 A1 | 9/2003 | Grant et al. |
| 2003/0164856 A1 | 9/2003 | Prager et al. |
| 2003/0172082 A1 | 9/2003 | Benoit et al. |
| 2003/0187950 A1 | 10/2003 | Rising |
| 2003/0195877 A1 | 10/2003 | Ford et al. |
| 2003/0196094 A1 | 10/2003 | Hillis et al. |
| 2003/0200218 A1 | 10/2003 | Tijare et al. |
| 2003/0200234 A1 | 10/2003 | Koppich et al. |
| 2003/0220853 A1 | 11/2003 | Back et al. |
| 2003/0236842 A1 | 12/2003 | Natarajan et al. |
| 2004/0003011 A1 | 1/2004 | Broussad |
| 2004/0015521 A1 | 1/2004 | Hudicka |
| 2004/0078224 A1 | 4/2004 | Schramm-Apple |
| 2004/0078358 A1 | 4/2004 | Hughes et al. |
| 2004/0078382 A1 | 4/2004 | Mercer et al. |
| 2004/0088316 A1 | 5/2004 | Cleraux et al. |
| 2004/0111728 A1 | 6/2004 | Schwalm |
| 2004/0117374 A1 | 6/2004 | Hung et al. |
| 2004/0126038 A1 | 7/2004 | Aublant et al. |
| 2004/0133544 A1 | 7/2004 | Kiessig et al. |
| 2004/0143569 A1 | 7/2004 | Gross et al. |
| 2004/0158584 A1 | 8/2004 | Necsoiu et al. |
| 2004/0162845 A1 | 8/2004 | Kim et al. |
| 2004/0163020 A1 | 8/2004 | Sidman |
| 2004/0174396 A1 | 9/2004 | Jobs et al. |
| 2004/0177057 A1 | 9/2004 | Fairchild et al. |
| 2004/0177319 A1 | 9/2004 | Horn |
| 2004/0186860 A1 | 9/2004 | Lee et al. |
| 2004/0199491 A1 | 10/2004 | Bhatt |
| 2004/0199507 A1 | 10/2004 | Tawa, Jr. |
| 2004/0199867 A1 | 10/2004 | Brandenborg |
| 2004/0199921 A1 | 10/2004 | Snader et al. |
| 2004/0205076 A1 | 10/2004 | Huang et al. |
| 2004/0205514 A1 | 10/2004 | Sommerer |
| 2004/0215611 A1 | 10/2004 | Jawa et al. |
| 2004/0215643 A1 | 10/2004 | Brechner et al. |
| 2004/0230571 A1 | 11/2004 | Robertson |
| 2004/0243567 A1 | 12/2004 | Levy |
| 2004/0254923 A1 | 12/2004 | Piersol |
| 2004/0267811 A1 | 12/2004 | Nelson et al. |
| 2005/0015389 A1 | 1/2005 | Novak et al. |
| 2005/0020043 A1 | 1/2005 | Lai |
| 2005/0027750 A1 | 2/2005 | Martin et al. |
| 2005/0038831 A1 | 2/2005 | Souder et al. |
| 2005/0050043 A1 | 3/2005 | Pyhalammi et al. |
| 2005/0050301 A1 | 3/2005 | Whittle et al. |
| 2005/0055351 A1 | 3/2005 | Barton et al. |
| 2005/0055372 A1 | 3/2005 | Springer et al. |
| 2005/0060337 A1 | 3/2005 | Chou et al. |
| 2005/0075544 A1 | 4/2005 | Shapiro et al. |
| 2005/0080770 A1 | 4/2005 | Lueder |
| 2005/0080807 A1 | 4/2005 | Beilinson et al. |
| 2005/0154716 A1 | 7/2005 | Watson et al. |
| 2005/0165777 A1 | 7/2005 | Hurst-Hiller et al. |
| 2005/0203918 A1 | 9/2005 | Holbrook |
| 2005/0210507 A1 | 9/2005 | Hawkins et al. |
| 2005/0216489 A1 | 9/2005 | Young et al. |
| 2005/0234984 A1 | 10/2005 | Rogerson et al. |
| 2005/0240640 A1 | 10/2005 | Kaler et al. |
| 2005/0246311 A1 | 11/2005 | Whelan et al. |
| 2005/0246324 A1 | 11/2005 | Paalasmaa et al. |
| 2005/0246645 A1 | 11/2005 | Beam et al. |
| 2005/0251753 A1 | 11/2005 | Sawyer |
| 2005/0283468 A1 | 12/2005 | Kamvar et al. |
| 2006/0004693 A1 | 1/2006 | Ramanathan et al. |
| 2006/0004787 A1 | 1/2006 | Borthakur et al. |
| 2006/0031214 A1 | 2/2006 | Solaro et al. |
| 2006/0161535 A1 | 7/2006 | Holbrook |
| 2010/0198815 A1 | 8/2010 | Poston et al. |

FOREIGN PATENT DOCUMENTS

| | | |
|---|---|---|
| WO | WO 01/86484 A2 | 11/2001 |
| WO | WO 03/060774 A1 | 7/2003 |
| WO | WO 03/090056 A2 | 10/2003 |
| WO | WO 2004/023243 A2 | 3/2004 |

OTHER PUBLICATIONS

PCT Chapter I International Preliminary Report on Patentability (IPRP Chapter I) PCT/US2005/022535 mailed Dec. 28, 2006. (15 Pages).

PCT International Search Report and Written Opinion for PCT International Appln No. PCT/US2005/022535 mailed Feb. 27, 2006. (22 pages).

PCT Invitation to Pay Additional Fees for PCT International Appln No. PCT/US2005/022537, mailed Nov. 14, 2005 (4 pages).

PCT Invitation to Pay Additional Fees for PCT International Appln No. PCT/US2005/022536, mailed Nov. 16, 2005 (5pages).

PCT International Search Report and Written Opinion for PCT International Appln No. PCT/US2005/022748 mailed Jan. 5, 2006. (33 pages).

PCT International Search Report and Written Opinion for PCT International Appln No. PCT/US2005/022537 mailed Jan. 12, 2006. (16 pages).

PCT Chapter I International Preliminary Report on Patentability (IPER) for PCT Application No. PCT/US2005/022748 mailed Dec. 28, 2006.

European Search Report, EP 09 17 9152, dated Jul. 15, 2010, 3 pgs.
European Search Report EP 10 18 4539, dated Nov. 29, 2010, 1 pg.
European Search Report EP 10 17 0529 dated Nov. 25, 2010, 2 pgs.
European Search Report 10 18 4010 dated Dec. 23, 2010, 2 pgs.

U.S. Appl. No. 10/461,642, filed Jun. 13, 2003, titled "Domain Specific Search Engine", by inventor Nikhil Bhatt, 72 pages (specification and drawings).

U.S. Appl. No. 10/407,853, filed Apr. 4, 2003, titled "Method and Apparatus for Tagging and Locating Audio Data", by inventor Nikhil Bhatt, 51 pages (specification and drawings).

U.S. Appl. No. 10/873,661, filed Jun. 21, 2004, titled "Methods and Apparatuses for Operating a Data Processing System," by inventors Bas Ording and Donald Lindsay, 91 pages (specification and drawings).

U.S. Appl. No. 10/951,915, filed Apr. 22, 2005, titled "Live Content Resizing", by inventors Steven P. Jobs, Stephen O. Lemay, Jessica Kahn, Sarah Wilkin, David Hyatt, Jens Alfke and Wayne Loffbourrow, 38 pages (specification and drawings).

Baeza-Yates R.A., et al., "New Approaches to Information Management: Attribute-Centric Data Systems", String Processing and Information Retrieval, 2000. Spire 2000. Proceedings. Seventh International Symposium on Sep. 27-29, 2000, Piscataway, NJ, USA, IEEE, Sep. 27, 2000, pp. 17-27, XP010517584.

Baeza-Yates R.A., et al.,"Modern Information Retrieval", Jan. 1, 1999, Modern Information Retrieval, ACM Press, New Yorks, pp. 257-339, XP002210866 OSBN: 978-0-201-39829-8.

Bowman, C.M., "A File for Information Management", Proceedings of the ISMM International Conference. Intelligent Information Management Systems. Proceedings of ISMM Symposium, Jun. 1, 1994, pp. 66-71, XP002224131.

Caban, Pipo, et al., "Improved Downloading Capabilities for Internet Browsers and File Management Capabilities for Windows Explorer to Minimize User Intervention", Research Disclosure, Mason Publications, Hampshire, GB, vol. 473, No. 23, Sep. 2003, 3 pages.

Floyd, Richard A., et al.,"Directory Reference Patterns in Hierarchical File Systems", Knowledge and Data Engineering, IEEE Transactions on vol. 1, Issue 2, Jun. 1989, pp. 238-247, Digital Object Identifier 10.1109/69.87963.

Giampaolo, Dominic, "Practical File System Design with the Be File System", 1999 Cover Page and Table of Contents (p. 1-7), Chapters 4&5 (pp. 45-98) and Index (pp. 225-247), Morgan Kaufmann Publishers, San Francisco, CA.

Grimes, Richard, "Revolutionary File Storage System Lets Users Search and Manage Files Based on Content", MSDN Magazine, Jan. 2004, ( 6 pages).

Halfhill, T.R., "GUIS Get a Facelift", Byte, McGraw-Hill Inc. St. Peterborough, US, bol. 21, No. 7, Jul. 1, 1996, XP000592154, ISSN: 0360-5280.

Welch, Kevin P., "Find Files Under Presentation Manager and Windows With a Handy Utility", Microsoft Systems Journal, vol. 4, No. 5, Sep. 1989, pp. 61-68.

Davis, Marc., "Active Capture: Integrating Human-Computer Interaction and Computer Vision/Audition to Automate Media Capture", Multimedia and Expo, 2003. ICME 2003. Proceedings, 2003 International Conference on, vol. 2, Jul. 6-9, 2003 p. II-185-8 vol. 2.

* cited by examiner

| Name | Parent | Date Modified ▼ | Kind |
|---|---|---|---|
| Today | | | |
| FindBrowse | Finder | 2/11/04 | Folder |
| findBrowse sequence2 | FindBrowse | 2/4/04 | Macromedia Director Movie |
| Yesterday | | | |
| findBrowse multi 3.dir | FindBrowse | 2/4/04 | Macromedia Director Movie |
| FindBrowse.dir | Find Starting Point | 2/2/04 | Macromedia Director Movie |
| findBrowse.sequence | FindBrowse | 2/2/04 | Macromedia Director Movie |
| browse by date5 header5 copy.tif | assets | 2/2/04 | Adobe Photoshop TIFF file |
| findBrowse sequ assets | FindBrowse | 2/2/04 | Folder |
| before Yesterday | | | |
| findBrowse assets | FindBrowse | 2/2/04 | Folder |
| find Browse multi 2.dir | FindBrowse | 2/2/04 | Macromedia Director Movie |
| find Browse multi 1.dir | FindBrowse | 2/2/04 | Macromedia Director Movie |
| browse by keyword map + SB2.psd | Finder | 1/12/04 | Adobe Photoshop file |
| browse by keyword map + SB.psd | Finder | 1/9/04 | Adobe Photoshop file |
| over a Week ago | | | |
| Browse by keyword map.psd | Finder | 12/17/03 | Adobe Photoshop file |
| Browse by date5 + info2.psd | Finder | 12/15/03 | Adobe Photoshop file |
| Browse by folder + info.psd | Finder | 12/15/03 | Adobe Photoshop file |
| Browse by date5 + info.psd | Finder | 12/15/03 | Adobe Photoshop file |
| Browse by date5 + actions2.psd | Finder | 12/12/03 | Adobe Photoshop file |
| Browse by date5 + actions.psd | Finder | 12/12/03 | Adobe Photoshop file |
| Browse by date5 header5.psd | Finder | 12/11/03 | Adobe Photoshop file |
| Browse by date5 header4.psd | Finder | 12/10/03 | Adobe Photoshop file |
| Browse by date5 header3.psd | Finder | 12/10/03 | Adobe Photoshop file |
| Browse by date5 header2.psd | Finder | 12/10/03 | Adobe Photoshop file |
| Browse by date5 header.psd | Finder | 12/10/03 | Adobe Photoshop file |
| Browse by date5.psd | Finder | 12/10/03 | Adobe Photoshop file |
| Browse by day4.psd | Finder | 12/10/03 | Adobe Photoshop file |
| Browse by day3.psd | Finder | 12/10/03 | Adobe Photoshop file |
| Browse by day2.psd | Finder | 12/9/03 | Adobe Photoshop file |
| Browse by day.psd | Finder | 12/9/03 | Adobe Photoshop file |

FIG. 8A

| Name | Parent | Date Modified | Kind |
|---|---|---|---|
| Adobe Photoshop file | | | |
| browse by date5 + actions.psd | Finder | 12/12/03 | Adobe Photoshop file |
| browse by date5 + actions2.psd | Finder | 12/12/03 | Adobe Photoshop file |
| browse by date5 + info.psd | Finder | 12/15/03 | Adobe Photoshop file |
| browse by date5 + info2.psd | Finder | 12/15/03 | Adobe Photoshop file |
| browse by date5 + header.psd | Finder | 12/10/03 | Adobe Photoshop file |
| browse by date5 + header2.psd | Finder | 12/10/03 | Adobe Photoshop file |
| browse by date5 + header3.psd | Finder | 12/10/03 | Adobe Photoshop file |
| browse by date5 + header4.psd | Finder | 12/11/03 | Adobe Photoshop file |
| browse by date5 + header5.psd | Finder | 12/10/03 | Adobe Photoshop file |
| browse by date5.psd | Finder | 12/9/03 | Adobe Photoshop file |
| browse by day2.psd | Finder | 12/9/03 | Adobe Photoshop file |
| browse by day3.psd | Finder | 12/10/03 | Adobe Photoshop file |
| browse by day4.psd | Finder | 12/10/03 | Adobe Photoshop file |
| browse by folder + info.psd | Finder | 12/15/03 | Adobe Photoshop file |
| browse by keyword map + SB.psd | Finder | 12/9/04 | Adobe Photoshop file |
| browse by keyword map + SB2.psd | Finder | 12/12/04 | Adobe Photoshop file |
| browse by keyword map.psd | Finder | 12/17/03 | Adobe Photoshop file |
| Adobe Photoshop TIFF file | | | |
| browse by date5 header5 copy.tif | assets | 2/2/04 | Adobe Photoshop TIFF file |
| Folder | | | |
| FindBrowse | Finder | 2/11/04 | Folder |
| findBrowse assets | FindBrowse | 2/2/04 | Folder |
| findBrowse sequ asets | FindBrowse | 2/2/04 | Folder |
| Macromedia Director Movie | | | |
| find browse multi 1.dir | FindBrowse | 2/2/04 | Macromedia Director Movie |
| find browse multi 2.dir | FindBrowse | 2/2/04 | Macromedia Director Movie |
| find browse multi 3.dir | FindBrowse | 2/4/04 | Macromedia Director Movie |
| findBrowse sequence | FindBrowse | 2/2/04 | Macromedia Director Movie |
| findBrowse sequence2 | FindBrowse | 2/4/04 | Macromedia Director Movie |
| FindBrowse.dir | Find Starting Point | 2/2/04 | Macromedia Director Movie |

FIG. 8B

Spotlight: forstall

524 Results    forstall

▼ Contacts
| Freya Forstall | Today | 3:30 pm |
| Molly Forstall | Today | 2:57 pm |
| Nils Forstall | Yesterday | 4:30 pm |
| Scott Forstall | Tuesday | 2:23 pm |
| Olaf Forstall | June 15 | 1:47 pm |

▼ Documents
| The Forstall Report | Today | 8:07 am |
| Scott Forstall Speech Transcript | Today | 8:05 am |
| Budget 2004 | Today | 8:03 am |
| Meeting Notes | Yesterday | 3:55 pm |
| Product Rollout 2004 | Yesterday | 2:34 pm |

102 more...

▼ iCal Events
| Rock Climbing Competition | Today | 8:00 am |
| Freya Forstall's Birthday | Monday | 3:30 pm |
| User Experience meeting | June 1 | 2:56 pm |
| SF Film Festival (Finding Forstall) | April 24 | 7:00 pm |
| Nils Forstall Graduation | April 23 | 4:00 pm |

344 more...

▼ Mail Messages
| Scott Forstall | Ready for the conference? | Today | 9:30 am |
| Olaf Forstall | Madonna tickets on sale! | Today | 9:25 am |
| Molly Forstall | Next week's Dinner Party | Yesterday | 2:13 pm |
| Scott Forstall | You've got to see this... | Yesterday | 5:56 pm |
| Jimmie Page | Playing Forstall's house tonight | June 24 | 11:07 pm |

56 more...

Group By:
Category
Kind
Date
People
Flat List

Sort Within Group by:
Name
Date
Kind
People
Popularity

When:
Any Date
Today
Since Yesterday
This Week
This Month
This Year

Where:
Everywhere
Home
My Hard Drive
Firewire Hard Drive
iPod

FIG. 19E

METHODS AND SYSTEMS FOR MANAGING DATA

This application is a continuation of co-pending U.S. patent application Ser. No. 13/424,248, filed on Mar. 19, 2012, which is a continuation of U.S. patent application Ser. No. 11/648,370, filed on Dec. 28, 2006, now U.S. Pat. No. 8,166,065, which is a continuation of U.S. patent application Ser. No. 10/877,584, filed on Jun. 25, 2004, now U.S. Pat. No. 7,730,012.

BACKGROUND OF THE INVENTION

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. However, this search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. A program such as Microsoft Word may automatically create some of this data when a user creates a file and the user may add additional data or edit the data by selecting the "property sheet" from a menu selection in Microsoft Word. The property sheets in Microsoft Word allow a user to create metadata for a particular file or document. However, in existing systems, a user is not able to search for metadata across a variety of different applications using one search request from the user. Furthermore, existing systems can perform one search for data files, but this search does not also include searching through metadata for those files.

SUMMARY OF THE DESCRIPTION

Methods for managing data in a data processing system and systems for managing data are described herein.

A method of managing data in one exemplary embodiment includes capturing metadata from a plurality of files created by a plurality of different software applications which execute on a data processing system. The type of information in the metadata for the files of a first software application differs from the type of information in metadata for files of a second software application. This captured metadata may be searched. In one embodiment, this search may occur concurrently for all of the metadata from the different files created by or used by the different software applications. In one implementation of this method, a single search interface may be provided to search all of the metadata for all of the different files created by the different software applications, thereby allowing a single search to search through all of the metadata for all of the files created by the different software applications. Further, the single search may also search through non-metadata such as the indexed (or non-indexed) content of the actual data files.

According to another aspect of the invention, an exemplary method includes capturing metadata from a plurality of different files created by a plurality of different software applications and storing the metadata on a storage medium in a flat file format. Another aspect relates to a flat file format for the metadata on the storage medium.

Another aspect of the present invention relates to various user interfaces which may be provided by a system to allow a user to search through the metadata. In one exemplary embodiment of such a user interface, the method includes capturing metadata from a plurality of files created by a plurality of different software applications and displaying a search input interface for searching through the metadata, wherein the type of information in metadata for files of a first software application differs from the type of information in metadata for files of a second software application. Various implementations of user interfaces are discussed for search input and also for the presentation (e.g. display) of search results. For example, the search results may be displayed in multiple different formats (e.g. list view, icon view, column view) and they may be displayed with headers or titles which separate the groups of matches in a search results list. Further, the displayed results may be limited to a predetermined number (or a dynamically generated number) for each category so that a limited viewing can still display multiple categories within a search result window. Further, a search query can be saved as a folder which appears within a user configurable portion of the search results window, and a selection of the folder causes another search to be performed using the saved search query (sometimes also referred to as search criteria). A display of the search results from the saved search query can then be sorted or further searched to limit the results to a subset of the original matches from the saved search query. Numerous other user interface implementations are shown and described. Another user interface feature includes the ability to provide both a list view and another view (e.g. icon view) for different portions (e.g. different categories) of a search results window.

Another aspect of the present invention relates to a software architecture for managing metadata. One exemplary embodiment of this architecture includes a first plurality of application programs which are capable of creating a plurality of different data files and a metadata management program which is coupled through programming interfaces with the first plurality of application programs and which is coupled to a file system storage of metadata which is captured from files created by the first plurality of application programs. Normally, the type of information in metadata for files of a first application program differs from the type of information in metadata for files of a second application program. The metadata management program is also coupled to other (non-metadata) sources of information about the data files such as an indexed database of the full text content of the data files and software which is capable of searching this indexed database. Search queries which are directed to the metadata may also be concurrently directed to the non-metadata sources so that the search results include matches from both the metadata and the non-metadata sources, and these searches, through both metadata and non-metadata sources, may be in response to a single search query or a single search request or command and these searches may be performed concurrently.

Another aspect of the inventions described herein relates to one or more importers which interact with new or modified files created by different application programs. These one or more importers may be invoked (e.g. called) by the application programs or by an operating system component (e.g. a metadata processing software) which responds to a call from the application programs or from an operating system kernel. In one particular example, an importer is called by a metadata processing software in response to a notification from an OS kernel that a new file has been created or an existing file has been modified; in this case, the particular importer called by the metadata processing system will typically depend upon the type of file (e.g. text file or image file or MP3 file, etc.), although one, single importer for all file types on a system may be used regardless of the type of file. An importer will typically specify a file path name for the extracted metadata and specify selected data to be extracted and written into the file path name of the file containing the extracted metadata.

Another aspect of the inventions described herein relates to performing a search through a system while receiving input from a user, where the search is through a plurality of data files created by different software applications on a data processing system. In an exemplary method of this aspect, the data processing system begins a search through the plurality of data files as the user enters input and before the user completes the entry of the search query. Thus, a user may enter a search ("quick brown fox") and before the user has entered "fox," the data processing system has searched through, or begins to search through, the plurality of data files created by different software applications and has displayed the list of matches to the partial search query "quick brown" (or at least begins to display a partial list of matches to the partial search query "quick brown"). This search may be performed through the plurality of data files as well as the metadata for the plurality of data files, wherein the type of information in metadata for files of a first software application differs from the type of information in metadata for files of a second software application. The search results may be sorted by relevancy, and the system may display first only a partial list of matches and then, in response to a user request, display all the matches. The search results may be organized by categories (e.g. see FIGS. 8A and 8B). Selecting one of the items in the search result may cause the display of additional information, beyond what is already displayed in the original search results listing.

Another aspect of the inventions relates to a method of selecting a group of items, such as a group of individual data files. In an exemplary method of this aspect, a data processing system receives a selection of a plurality of items such as data files, folders (e.g. graphical user interface representations of subdirectories), application programs or a combination of one or more of these items. This selection may be performed by one of the many conventional ways to select a plurality of items such as (a) pointing a cursor at each item individually (e.g. through movement of a mouse) and indicating a selection individually by, for example, pressing and releasing a button such as a mouse's button; (b) pointing a cursor at a first item in a list and indicating a selection of the first item and pointing the cursor at a last item in a list of items and indicating a selection of all items from the first item to the last item in the list; (c) drawing a selection rectangle by a dragging operation of the cursor, etc. After the selection of the plurality of items has been received, the data processing system receives a command to create a new folder and add or move, e.g. in one operation, the selected plurality of items into the new folder. The add operation creates the new folder (optionally with a name specified by the user as a result of a prompt or request by the system) and copies the selected files into the new folder, which represents a new subdirectory. This add operation is in response to the single command which requests that a new folder be created and that copies of the selected items be created and stored with a path name reflecting storage within the new folder. The move operation also creates a new folder (optionally with a name specified by the user as a result of a prompt or request by the system) and may merely change the path names associated with each of the selected items, which changed path names reflect the new file system location (within the subdirectory of the new folder) of the selected items.

Other aspects of the present invention include various data processing systems which perform these methods and machine readable media which perform various methods described herein.

BRIEF DESCRIPTION OF THE DRAWINGS

The present invention is illustrated by way of example and not limitation in the figures of the accompanying drawings in which like references indicate similar elements.

FIGS. 8A and 8B show two examples of formats for displaying search results according to one exemplary embodiment of the invention.

FIGS. 19A, 19B, 19C, 19D, and 19E show further illustrative embodiments of user interfaces according to the present invention.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2003.

Figure 1:
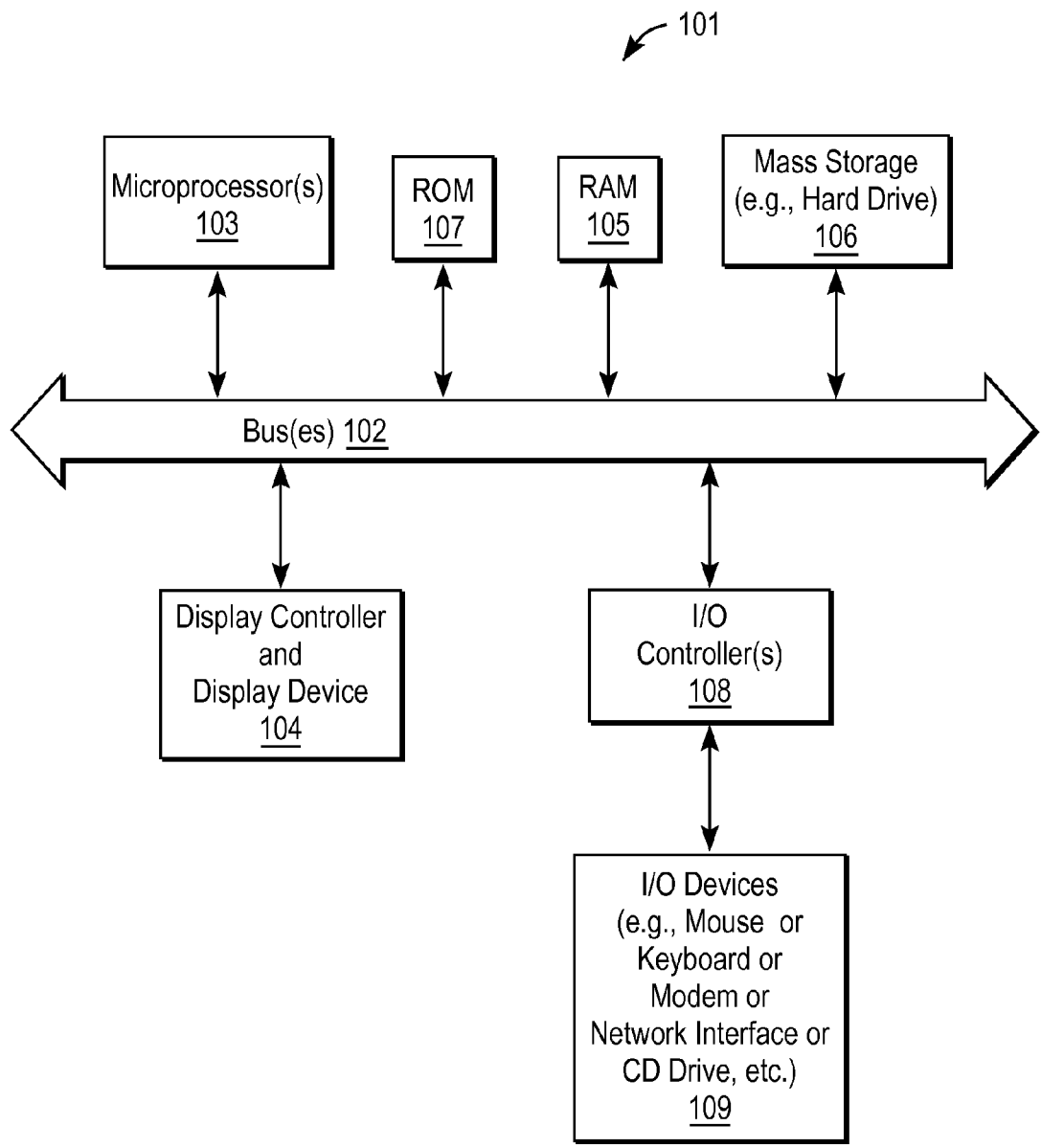
FIG. 1 shows an exemplary embodiment of a data processing system, which may be a general purpose computer system and which may operate in any of the various methods described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be a Macintosh computer from Apple Computer, Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Capturing and Use of Metadata Across a Variety of Application Programs

Figure 2:
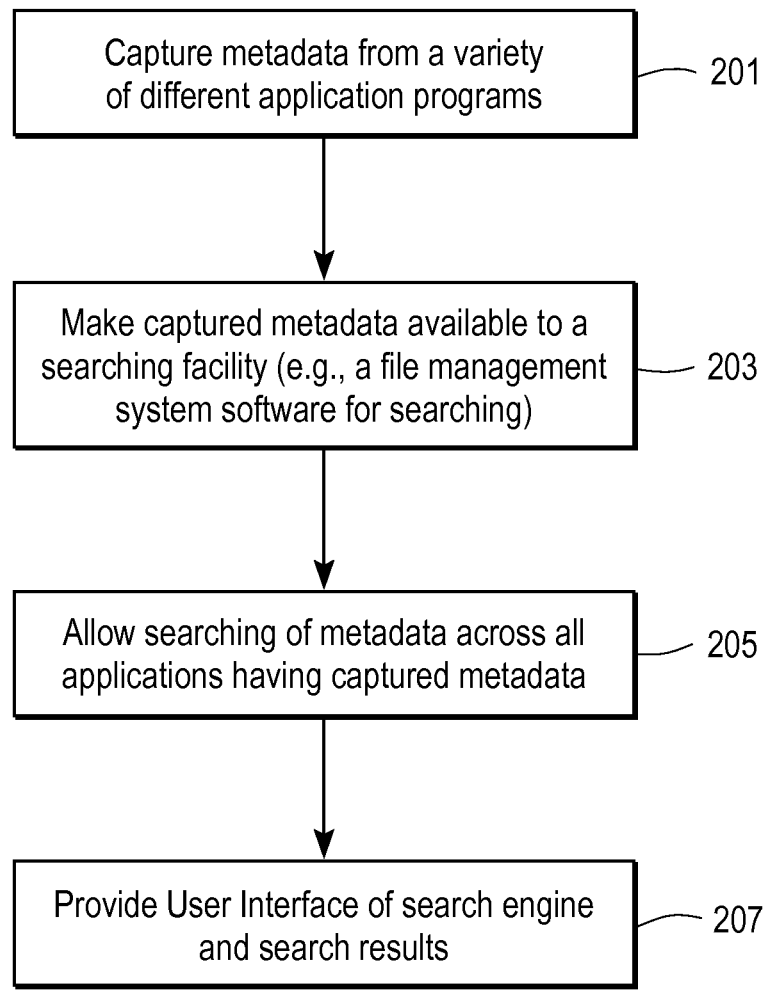
FIG. 2 shows a general example of one exemplary method of one aspect of the invention.
Figure 5:
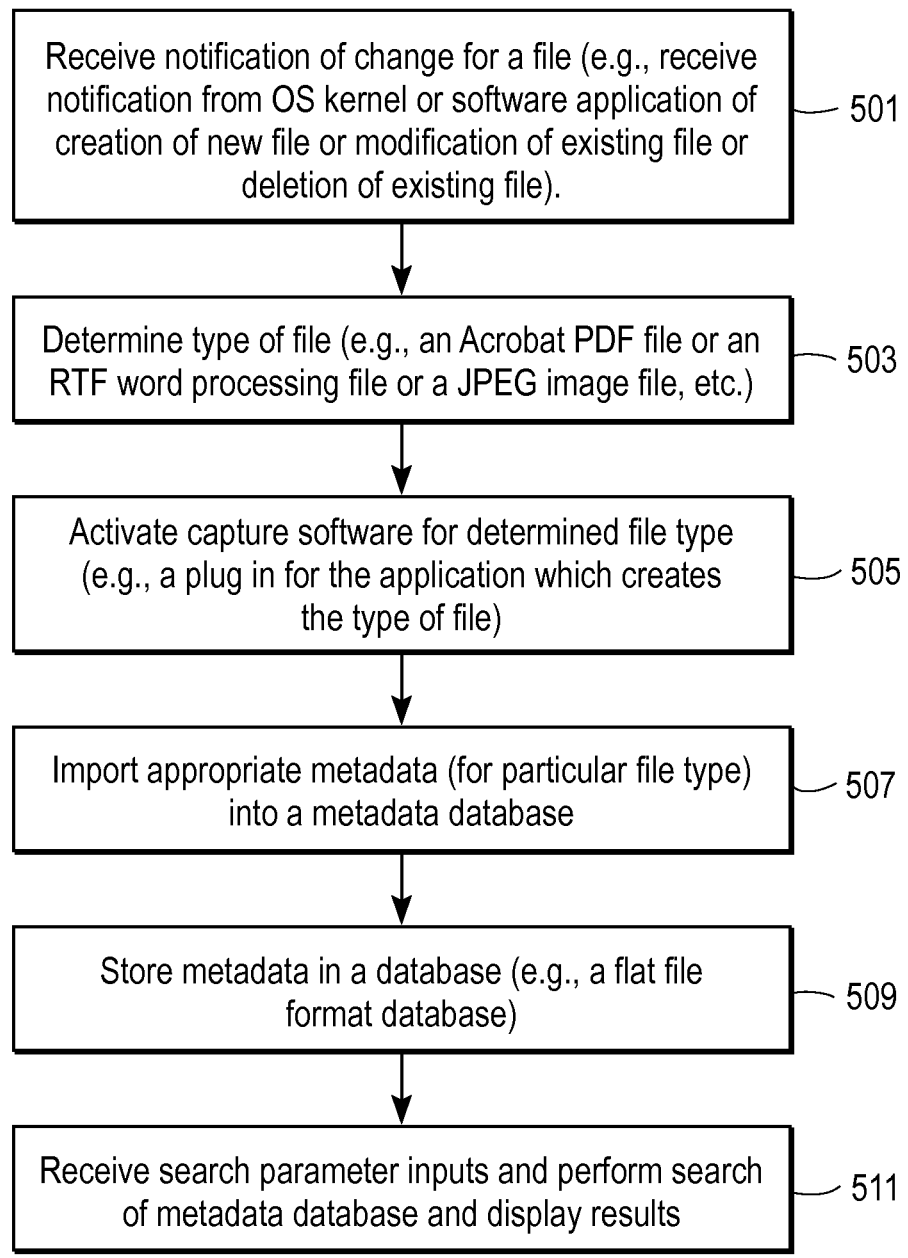
FIG. 5 is a flowchart showing another exemplary method of the present invention.

FIG. 2 shows a generalized example of one embodiment of the present invention. In this example, captured metadata is made available to a searching facility, such as a component of the operating system which allows concurrent searching of all metadata for all applications having captured metadata (and optionally for all non-metadata of the data files). The method of FIG. 2 may begin in operation 201 in which metadata is captured from a variety of different application programs. This captured metadata is then made available in operation 203 to a searching facility, such as a file management system software for searching. This searching facility allows, in operation 205, the searching of metadata across all applications having captured metadata. The method also provides, in operation 207, a user interface of a search engine and the search results which are obtained by the search engine. There are numerous possible implementations of the method of FIG. 2. For example, FIG. 5 shows a specific implementation of one exemplary embodiment of the method of FIG. 2. Alternative implementations may also be used. For example, in an alternative implementation, the metadata may be provided by each application program to a central source which stores the metadata for use by searching facilities and which is managed by an operating system component, which may be, for example, the metadata processing software. The user interface provided in operation 207 may take a variety of different formats, including some of the examples described below as well as user interfaces which are conventional, prior art user interfaces. The metadata may be stored in a database which may be any of a variety of formats including a B tree format or, as described below, in a flat file format according to one embodiment of the invention.

The method of FIG. 2 may be implemented for programs which do not store or provide metadata. In this circumstance, a portion of the operating system provides for the capture of the metadata from the variety of different programs even though the programs have not been designed to provide or capture metadata. For those programs which do allow a user to create metadata for a particular document, certain embodiments of the present invention may allow the exporting back of captured metadata back into data files for applications which maintain metadata about their data files.

Figure 4:
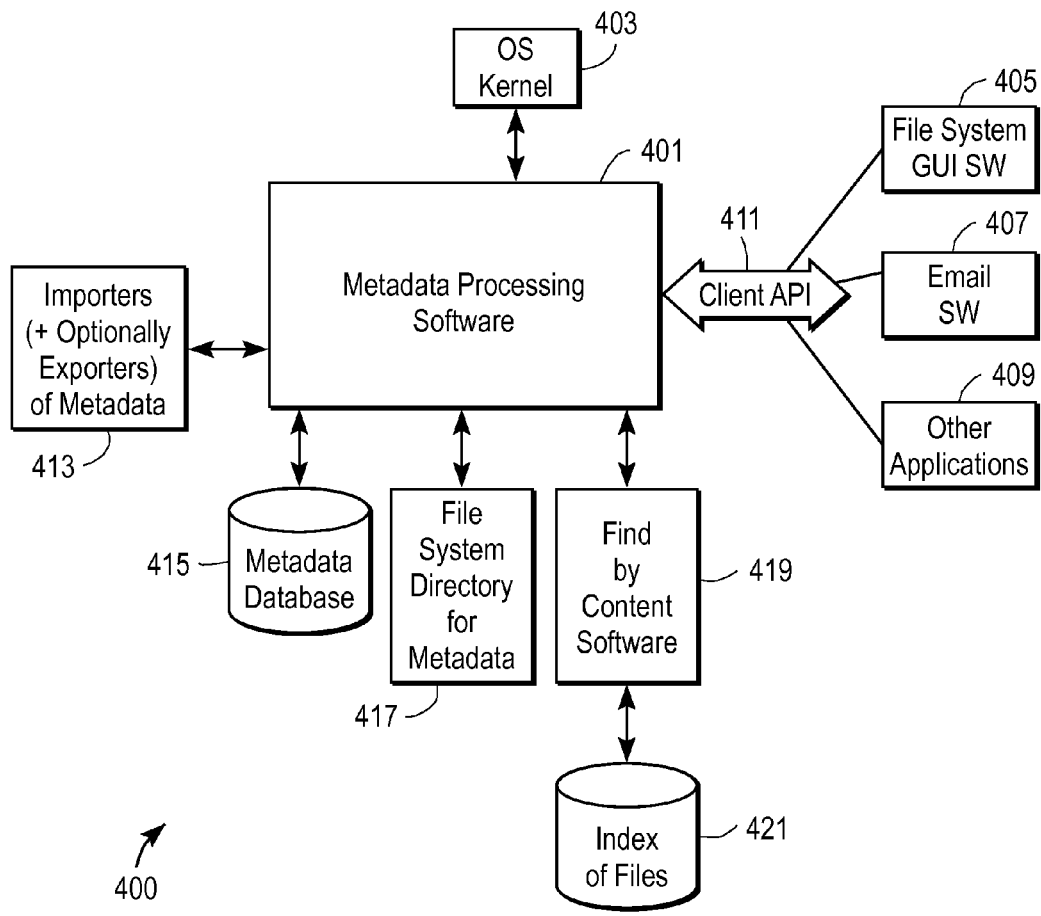
FIG. 4 shows an example of an architecture for managing metadata according to one exemplary embodiment of the invention.

The method of FIG. 2 allows information about a variety of different files created by a variety of different application programs to be accessible by a system wide searching facility, which is similar to the way in which prior art versions of the Finder or Windows Explorer can search for file names, dates of creation, etc. across a variety of different application programs. Thus, the metadata for a variety of different files created by a variety of different application programs can be accessed through an extension of an operating system, and an example of such an extension is shown in FIG. 4 as a metadata processing software which interacts with other components of the system and will be described further below.

Figure 3A:
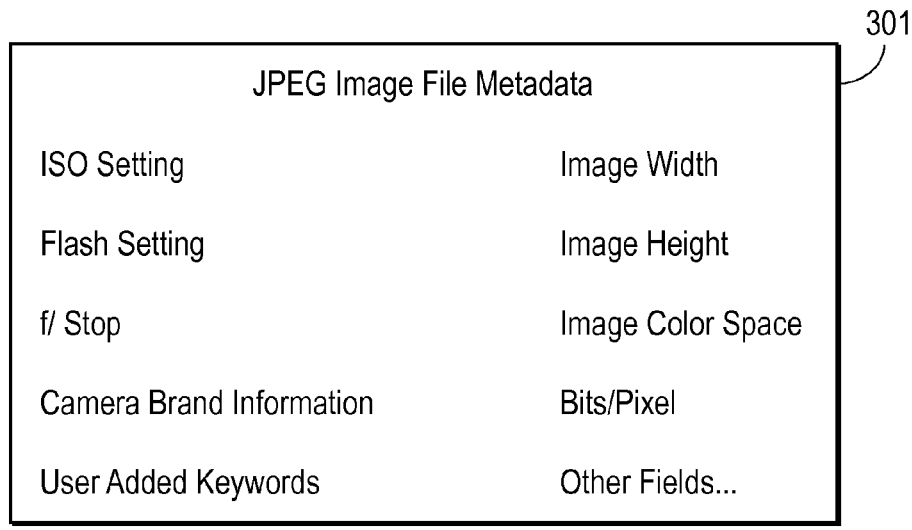
FIG. 3A shows an example of the content of the particular type of metadata for a particular type of file.
Figure 3B:
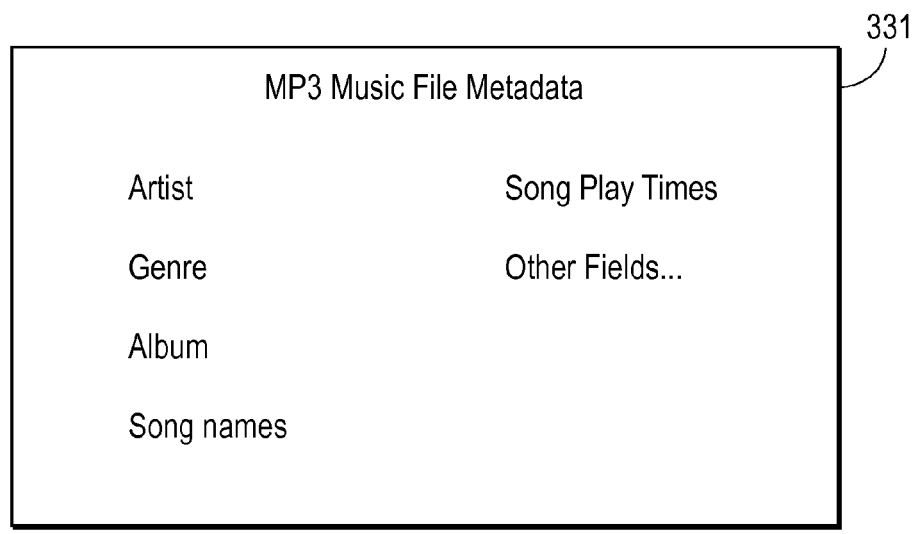
FIG. 3B shows another example of a particular type of metadata for another particular type of file.

FIGS. 3A and 3B show two different metadata formats for two different types of data files. Note that there may be no overlap in any of the fields; in other words, no field in one type of metadata is the same as any field in the other type of metadata. Metadata format 301 may be used for an image file such as a JPEG image file. This metadata may include information such as the image's width, the image's height, the image's color space, the number of bits per pixel, the ISO setting, the flash setting, the F/stop of the camera, the brand name of the camera which took the image, user-added keywords and other fields, such as a field which uniquely identifies the particular file, which identification is persistent through modifications of the file. Metadata format 331 shown in FIG. 3B may be used for a music file such as an MP3 music file. The data in this metadata format may include an identification of the artist, the genre of the music, the name of the album, song names in the album or the song name of the particular file, song play times or the song play time of a particular song and other fields, such as a persistent file ID number which identifies the particular MP3 file from which the metadata was captured. Other types of fields may also be used. The following chart shows examples of the various fields which may be used in metadata for various types of files.

| Item name | Parent in hierarchy | Attribute name | Description/Notes | CFType | Multi-value |
|---|---|---|---|---|---|
| Item | n/a | Authors | Who created or contributed to the contents of this item | CFString | Yes |
| | | Comment | A free form text comment | CFString | No |
| | | ContentType | This is the type that is determined by UTI | CFString | No |
| | | ContentTypes | This is the inheritance of the UTI system | CFString | Yes |
| | | CreatedDate | When was this item created | CFDate | No |
| | | DisplayName | The name of the item as the user would like to read it. Very well may be the file name, but it may also be the subject of an e-mail message or the full name of a person, for example. | CFString | No |
| | | Keywords | This is a list words set by the user to identify arbitrary sets of organization. The scope is determined by the user and can be flexibly used for any kind of organization. For example, Family, Hawaii, Project X, etc. | CFString | Yes |
| | | Contact Keywords | A list of contacts that are associated with this document, beyond what is captured as Author. This may be a person who's in the picture or a document about a person or contact (performance review, contract) | CFString | Yes |
| | | ModifiedDate | When this item was last modified | CFDate | No |

-continued

| | | | | | |
|---|---|---|---|---|---|
| | | Rating | A relative rating (0 to 5 value) on how important a particular item is to you, whether it's a person, file or message | CFNumber | No |
| | | RelatedTos | A list of other items that are arbitrarily grouped together. | CFString | Yes |
| | | TextContent | An indexed version of any content text | CFString | No |
| | | UsedDates | Which days was the document opened/viewed/played | CFDate | Yes |
| Content/ Data | Item | Copyright | Specifies the owner of this content, i.e. Copyright Apple Computer, Inc. | CFString | No |
| | | CreatorApp | Keeps track of the application that was used to create this document (if it's known). | CFString | No |
| | | Languages | The languages that this document is composed in (for either text or audio-based media) | CFString | Yes |
| | | ParentalControl | A field that is used to determine whether this is kid-friendly content or not | CFString | No |
| | | Publishers | The name or a person or organization that published this content. | CFString | Yes |
| | | PublishedDate | The original date that this content was published (if it was), independent of created date. | CFDate | No |
| | | Reviewers | A list of contacts who have reviewed the contents of this file. This would have to be set explicitly by an application. | CFString | Yes |
| | | ReviewStatus | Free form text that used to specify where the document is in any arbitrary review process | CFString | No |
| | | TimeEdited | Total time spent editing document | CFDate | No |
| | | WhereTos | Where did this go to, eg. CD, printed, backedup | CFString | Yes |
| | | WhereFroms | Where did this come from, e.g. camera, email, web download, CD | CFString | Yes |
| Image | Data | BitsPerSample | What is the bit depth of the image (8-bit, 16-bit, etc.) | CFNumber | No |
| | | ColorSpace | What color space model is this document following | CFString | No |
| | | ImageHeight | The height of the image in pixels | CFNumber | No |
| | | ImageWidth | The width of the image in pixels | CFNumber | No |
| | | ProfileName | The name of the color profile used with for image | CFString | No |
| | | ResolutionWidth | Resolution width of this image (i.e. dpi from a scanner) | CFNumber | No |
| | | ResolutionHeight | Resolution height of this image (i.e. dpi from a scanner) | CFNumber | No |
| | | LayerNames | For image formats that contain "named" layers (e.g. Photoshop files) | CFString | Yes |
| | | Aperture | The f-stop rating of the camera when the image was taken | CFNumber | No |
| | | CameraMake | The make of the camera that was used to acquire this image (e.g. Nikon) | CFString | No |
| | | CameraModel | The model of the camera used to acquire this image (Coolpix 5700) | CFString | No |
| | | DateTimeOriginal | Date/time the picture was taken | CFDate | No |
| | | ExposureMode | Mode that was used for the exposure | CFString | No |

-continued

| | | | | | |
|---|---|---|---|---|---|
| | | ExposureTime | Time that the lens was exposed while taking the picture | CFDate | No |
| | | Flash | This attribute is overloaded with information about red-eye reduction. This is not a binary value | CFNumber | No |
| | | GPS | Raw value received from GPS device associated with photo acquisition. It hasn't necessarily been translated to a user-understandable location. | CFString | No |
| | | ISOSpeed | The ISO speed the camera was set to when the image was acquired | CFNumber | No |
| | | Orientation | The orientation of the camera when the image was acquired | CFString | No |
| | | WhiteBalance | The white balance setting of the camera when the picture was taken | CFNumber | No |
| | | EXIFversion | The version of EXIF that was used to generate the metadata for the image | CFString | No |
| Time-based | Data | AcquisitionSources | The name or type of device that used to acquire the media | CFString | Yes |
| | | Codecs | The codecs used to encode/decode the media | CFString | Yes |
| | | DeliveryType | FastStart or RTSP | CFString | No |
| | | Duration | The length of time that the media lasts | CFNumber | No |
| | | Streamable | Whether the content is prepared for purposes of streaming | CFBoolean | No |
| | | TotalBitRate | The total bit rate (audio & video combined) of the media. | CFNumber | No |
| | | AudioBitRate | The audio bit rate of the media | CFNumber | No |
| | | AspectRatio | The aspect ratio of the video of the media | CFString | No |
| | | ColorSpace | The color space model used for the video aspect of the media | CFString | No |
| | | FrameHeight | The frame height in pixels of the video in the media | CFNumber | No |
| | | FrameWidth | The frame width in pixels of the video in the media | CFNumber | No |
| | | ProfileName | The name of the color profile used on the video portion of the media | CFString | No |
| | | VideoBitRate | The bit rate of the video aspect of the media | CFNumber | No |
| Text | Data | Subject | The subject of the text. This could be metadata that's supplied with the text or something automatically generated with technologies like VTWIN | CFString | No |
| | | PageCount | The number of printable pages of the document | CFNumber | No |
| | | LineCount | The number of lines in the document | CFNumber | No |
| | | WordCount | The number of words in the document | CFNumber | No |
| | | URL | The URL that will get you to this document (or at least did at one time). Relevant for saved HTML documents, bookmarks, RSS feeds, etc. | CFString | No |
| | | PageTitle | The title of a web page. Relevant to HTML or bookmark documents | CFString | No |
| | | Google Hierarchy | Structure of where this page can be found in the Google hierarchy. Relevant to HTML or bookmark documents | CFString | No |

| | | | -continued | | |
|---|---|---|---|---|---|
| Compound document | Data | <Abstract> | There are no specific attributes assigned to this item. This is to catch all app-specific file formats that fall within Data, but don't fit into any of the other types. Typically these documents have multiple types of media embedded within them. (e.g. P | n/a | n/a |
| PDF | Compound document | NumberOfPages | The number of printable pages in the document | CFNumber | No |
| | | PageSize | The size of the page stored as points | CFNumber | No |
| | | PDFTitle | PDF-specific title metadata for the document | CFString | No |
| | | PDFAuthor | PDF-specific author metadata for the document | CFString | No |
| | | PDFSubject | PDF-specific subject metadata for the document | CFString | No |
| | | PDFKeywords | PDF-specific keywords metadata for the document | CFString | Yes |
| | | PDFCreated | PDF-specific created metadata for the document | CFDate | No |
| | | PDFModified | PDF-specific modified metadata for the document | CFDate | No |
| | | PDFVersion | PDF-specific version metadata for the document | CFString | No |
| | | SecurityMethod | Method by which this document is kept secure | CFString | No |
| Presentation (Keynote) | Compound document | SlideTitles | A collection of the titles on slides | CFString | Yes |
| | | SlideCount | The number of slides | CFString | No |
| | | SpeakerNotesContent | The content of all the speaker notes from all of the slides together | CFString | ? |
| Application | Item | Categories | The kind of application this is: productivity, games, utility, graphics, etc. A set list that | CFString | Yes |
| Message | Item | Recipients | Maps to To and Cc: addresses in a mail message. | CFString | Yes |
| | | Priority | The priority of the message as set by the sender | CFString | No |
| | | AttachmentNames | The list of filenames that represent attachments in a particular message (should be actionable within the Finder) | CFString | Yes |
| | | Authors | maps to From address in mail message | CFString | Yes |
| | | Comment | Not applicable to Mail right now (should we consider?) | CFString | No |
| | | ContentType | | CFString | No |
| | | ContentTypes | | CFString | Yes |
| | | CreatedDate | When was this message was sent or received | CFDate | No |
| | | DisplayName | Subject of the message | CFString | No |
| | | Keywords | There will be a way to set keywords within Mail | CFString | Yes |
| | | Contact Keywords | Could be where recipients are held | CFString | Yes |
| | | ModifiedDate | Not applicable | CFDate | No |
| | | Rating | A relative rating (0 to 5 stars) on how important a particular message is to you (separate from a message's Priority) | CFNumber | No |
| | | RelatedTos | Potentially threaded messages could be put into this category | CFString | Yes |
| | | TextContent | An indexed version of the mail message | CFString | No |
| | | UsedDates | The day/time in which the mail message was viewed/read | CFDate | Yes |
| Contact | Item | Company | The company that this contact is an employee of | CFString | No |
| | | E-mails | A list of e-mail addresses that this contact has | CFString | Yes |
| | | IMs | A list of instant message handles this contact has | CFString | Yes |

-continued

| | | Phones | A list of phone numbers that relate to this contact | CFString | Yes |
|---|---|---|---|---|---|
| | | Addresses | A list of physical addresses that relate to this person | CFString | Yes |
| | | Authors | the name of the owner of the Address Book (current user name) | CFString | Yes |
| | | Comment | | CFString | No |
| | | ContentType | | CFString | No |
| | | ContentTypes | | CFString | Yes |
| | | CreatedDate | date the user entered this into his AddressBook (either through import or direct entry) | CFDate | No |
| | | DisplayName | Composite name of contact (First Name, Last Name) | CFString | No |
| | | Keywords | There will be a way to set keywords within Address Book | CFString | Yes |
| | | Contact Keywords | | CFString | Yes |
| | | ModifiedDate | Last time this contact entry was modified | CFDate | No |
| | | Rating | A relative rating (0 to 5 stars) on how important a particular contact is to you (separate from a message's Priority) | CFNumber | No |
| | | RelatedTos | (potentially could be used to associate people from the same company or family) | CFString | Yes |
| | | TextContent | An indexed version of the Notes section | CFString | No |
| | | UsedDates | The day/time in which the contact entry was viewed in Address Book | CFDate | Yes |
| Meeting(TBD) | Item | Body | text, rich text or document that represents the full content of the event | CFString | No |
| | | Description | text describing the event | CFString | No |
| | | EventTimes | time/date the event starts | CFDate | Yes |
| | | Duration | The length of time that the meeting lasts | CFNumber | No |
| | | Invitees | The list of people who are invited to the meeting | CFString | Yes |
| | | Location | The name of the location where the meeting is taking place | CFString | No |

| Item name | Parent in hierarchy | Attribute name | Localized | User settable | Gettable | Copied with copy | App viewable |
|---|---|---|---|---|---|---|---|
| Item | n/a | Authors | No | Yes | Yes | Yes | Address Book |
| | | Comment | No | Yes | Yes | Yes | |
| | | ContentType | ? | No | Yes | Yes | |
| | | ContentTypes | ? | No | Yes | Yes | |
| | | CreatedDate | No | No | Yes | Yes | |
| | | DisplayName | Yes | Yes | Yes | Yes | Finder (or Launch Services) |
| | | Keywords | System-provided keywords (if any) | Yes | Yes | Ask | |
| | | Contact Keywords | No | Yes | Yes | Ask | Address Book |
| | | ModifiedDate | No | No | Yes | | |
| | | Rating | n/a | Yes | Yes | | |
| | | RelatedTos | No | Yes | Yes | | |
| | | TextContent | No | No | Yes | | |
| | | UsedDates | No | No | Yes | | |
| Content/ Data | Item | Copyright | No | Yes | Yes | | |
| | | CreatorApp | ? | No | Yes | | |
| | | Languages | Yes | Yes | Yes | | |
| | | ParentalControl | ? | Yes | Yes | | |
| | | Publishers | No | Yes | Yes | | Address Book |
| | | PublishedDate | No | Yes | Yes | | |
| | | Reviewers | No | Yes | Yes | | Address Book |
| | | ReviewStatus | ? | Yes | Yes | | |
| | | TimeEdited | No | No | Yes | | |

-continued

| | | | | | | | |
|---|---|---|---|---|---|---|---|
| | | WhereTos | System-provided words only (if any) | ? | Yes | | |
| | | WhereFroms | System-provided words only (if any) | ? | Yes | | |
| Image | Data | BitsPerSample | | | Yes | | |
| | | ColorSpace | | | Yes | | ColorSync Utility? |
| | | ImageHeight | | | Yes | | |
| | | ImageWidth | | | Yes | | |
| | | ProfileName | | | Yes | | ColorSync Utility? |
| | | ResolutionWidth | | | Yes | | |
| | | ResolutionHeight | | | Yes | | |
| | | LayerNames | | | Yes | | |
| | | Aperture | | | Yes | | |
| | | CameraMake | Yes | | Yes | | |
| | | CameraModel | Yes | | Yes | | |
| | | DateTimeOriginal | | | Yes | | |
| | | ExposureMode | | | Yes | | |
| | | ExposureTime | | | Yes | | |
| | | Flash | | | Yes | | |
| | | GPS | | | Yes | | |
| | | ISOSpeed | | | Yes | | |
| | | Orientation | | | Yes | | |
| | | WhiteBalance | | | Yes | | |
| | | EXIFversion | | | Yes | | |
| Time-based | Data | AcquisitionSources | | | Yes | | |
| | | Codecs | | | Yes | | |
| | | DeliveryType | | | Yes | | |
| | | Duration | | | Yes | | |
| | | Streamable | | | Yes | | |
| | | TotalBitRate | | | Yes | | |
| | | AudioBitRate | | | Yes | | |
| | | AspectRatio | | | Yes | | |
| | | ColorSpace | | | Yes | | |
| | | FrameHeight | | | Yes | | |
| | | FrameWidth | | | Yes | | |
| | | ProfileName | | | Yes | | |
| | | VideoBitRate | | | Yes | | |
| Text | Data | Subject | | | Yes | | |
| | | PageCount | | | Yes | | |
| | | LineCount | | | Yes | | |
| | | WordCount | | | Yes | | |
| | | URL | | | Yes | | |
| | | PageTitle | | | Yes | | |
| | | Google Hierarchy | | | Yes | | |
| Compound document | Data | <Abstract> | n/a | n/a | n/a | n/a | n/a |
| PDF | Compound document | NumberOfPages | | | Yes | | |
| | | PageSize | | No | Yes | | |
| | | PDFTitle | | ? | Yes | | |
| | | PDFAuthor | | ? | Yes | | Address Book |
| | | PDFSubject | | ? | Yes | | |
| | | PDFKeywords | | ? | Yes | | |
| | | PDFCreated | | ? | Yes | | |
| | | PDFModified | | ? | Yes | | |
| | | PDFVersion | | ? | Yes | | |
| | | SecurityMethod | | | Yes | | |
| Presentation (Keynote) | Compound document | SlideTitles | | | Yes | | |
| | | SlideCount | | | Yes | | |
| | | SpeakerNotesContent | | | Yes | | |
| Application | Item | Categories | | | Yes | | |
| Message | Item | Recipients | | | Yes | | Address Book |
| | | Priority | | | Yes | | |
| | | AttachmentNames | | | Yes | | |
| | | Authors | No | Yes | Yes | Yes | Address Book |
| | | Comment | No | Yes | Yes | Yes | |
| | | ContentType | | No | Yes | Yes | |
| | | ContentTypes | | No | Yes | Yes | |
| | | CreatedDate | No | No | Yes | Yes | |
| | | DisplayName | Yes | Yes | Yes | Yes | |

-continued

| | | | | | | |
|---|---|---|---|---|---|---|
| | | Keywords | System-provided keywords (if any) | Yes | Yes | Ask | |
| | | Contact Keywords | No | Yes | Yes | Ask | Address Book |
| | | ModifiedDate | No | No | Yes | | |
| | | Rating | n/a | Yes | Yes | | |
| | | RelatedTos | No | Yes | Yes | | |
| | | TextContent | No | No | Yes | | |
| | | UsedDates | No | No | Yes | | |
| Contact | Item | Company | | | Yes | | Address Book |
| | | E-mails | | | Yes | | Mail |
| | | IMs | | | Yes | | iChat |
| | | Phones | | | | | |
| | | Addresses | | | | | |
| | | Authors | No | Yes | Yes | Yes | Address Book |
| | | Comment | No | Yes | Yes | Yes | |
| | | ContentType | | No | Yes | Yes | |
| | | ContentTypes | | No | Yes | Yes | |
| | | CreatedDate | No | No | Yes | Yes | |
| | | DisplayName | Yes | Yes | Yes | Yes | |
| | | Keywords | System-provided keywords (if any) | Yes | Yes | Ask | |
| | | Contact Keywords | No | Yes | Yes | Ask | Address Book |
| | | ModifiedDate | No | No | Yes | | |
| | | Rating | n/a | Yes | Yes | | |
| | | RelatedTos | No | Yes | Yes | | |
| | | TextContent | No | No | Yes | | |
| | | UsedDates | No | No | Yes | | |
| Meeting(TBD) | Item | Body | | | Yes | | |
| | | Description | | | Yes | | |
| | | EventTimes | | | Yes | | |
| | | Duration | | | Yes | | |
| | | Invitees | | | Yes | | Address Book |
| | | Location | | | Yes | | |

One particular field which may be useful in the various metadata formats would be a field which includes an identifier of a plug in or other software element which may be used to capture metadata from a data file and/or export metadata back to the creator application.

Various different software architectures may be used to implement the functions and operations described herein. The following discussion provides one example of such an architecture, but it will be understood that alternative architectures may also be employed to achieve the same or similar results. The software architecture shown in FIG. 4 is an example which is based upon the Macintosh operating system. The architecture 400 includes a metadata processing software 401 and an operating system (OS) kernel 403 which is operatively coupled to the metadata processing software 401 for a notification mechanism which is described below. The metadata processing software 401 is also coupled to other software programs such as a file system graphical user interface software 405 (which may be the Finder), an email software 407, and other applications 409. These applications are coupled to the metadata processing software 401 through client application program interface 411 which provide a method for transferring data and commands between the metadata processing software 401 and the software 405, 407, and 409. These commands and data may include search parameters specified by a user as well as commands to perform searches from the user, which parameters and commands are passed to the metadata processing software 401 through the interface 411. The metadata processing software 401 is also coupled to a collection of importers 413 which extract data from various applications. In particular, in one exemplary embodiment, a text importer is used to extract text and other information from word processing or text processing files created by word processing programs such as Microsoft Word, etc. This extracted information is the metadata for a particular file. Other types of importers extract metadata from other types of files, such as image files or music files. In this particular embodiment, a particular importer is selected based upon the type of file which has been created and modified by an application program. For example, if the data file was created by PhotoShop, then an image importer for PhotoShop may be used to input the metadata from a PhotoShop data file into the metadata database 415 through the metadata processing software 401. On the other hand, if the data file is a word processing document, then an importer designed to extract metadata from a word processing document is called upon to extract the metadata from the word processing data file and place it into the metadata database 415 through the metadata processing software 401. Typically, a plurality of different importers may be required in order to handle the plurality of different application programs which are used in a typical computer system. The importers 413 may optionally include a plurality of exporters which are capable of exporting the extracted metadata for particular types of data files back to property sheets or other data components maintained by certain application programs. For example, certain application programs may maintain some metadata for each data file created by the program, but this metadata is only a subset of the metadata extracted by an importer from this type of data file. In this instance, the exporter may export back additional metadata or may simply insert metadata into blank fields of metadata maintained by the application program.

The software architecture 400 also includes a file system directory 417 for the metadata. This file system directory keeps track of the relationship between the data files and their metadata and keeps track of the location of the metadata object (e.g. a metadata file which corresponds to the data file from which it was extracted) created by each importer. In one exemplary embodiment, the metadata database is maintained as a flat file format as described below, and the file system directory 417 maintains this flat file format. One advantage of a flat file format is that the data is laid out on a storage device as a string of data without references between fields from one metadata file (corresponding to a particular data file) to another metadata file (corresponding to another data file). This arrangement of data will often result in faster retrieval of information from the metadata database 415.

The software architecture 400 of FIG. 4 also includes find by content software 419 which is operatively coupled to a database 421 which includes an index of files. The index of files represents at least a subset of the data files in a storage device and may include all of the data files in a particular storage device (or several storage devices), such as the main hard drive of a computer system. The index of files may be a conventional indexed representation of the content of each document. The find by content software 419 searches for words in that content by searching through the database 421 to see if a particular word exists in any of the data files which have been indexed. The find by content software functionality is available through the metadata processing software 401 which provides the advantage to the user that the user can search concurrently both the index of files in the database 421 (for the content within a file) as well as the metadata for the various data files being searched. The software architecture shown in FIG. 4 may be used to perform the method shown in FIG. 5 or alternative architectures may be used to perform the method of FIG. 5.

The method of FIG. 5 may begin in operation 501 in which a notification of a change for a file is received. This notification may come from the OS kernel 403 which notifies the metadata processing software 401 that a file has been changed. This notification may come from sniffer software elements which detect new or modified files and deletion of files. This change may be the creation of a new file or the modification of an existing file or the deletion of an existing file. The deletion of an existing file causes a special case of the processing method of FIG. 5 and is not shown in FIG. 5. In the case of a deletion, the metadata processing software 401, through the use of the file system directory 417, deletes the metadata file in the metadata database 415 which corresponds to the deleted file. The other types of operations, such as the creation of a new file or the modification of an existing file, causes the processing to proceed from operation 501 to operation 503 in which the type of file which is the subject of the notification is determined. The file may be an Acrobat PDF file or an RTF word processing file or a JPEG image file, etc. In any case, the type of the file is determined in operation 503. This may be performed by receiving from the OS kernel 403 the type of file along with the notification or the metadata processing software 401 may request an identification of the type of file from the file system graphical user interface software 405 or similar software which maintains information about the data file, such as the creator application or parent application of the data file. It will be understood that in one exemplary embodiment, the file system graphical user interface software 405 is the Finder program which operates on the Macintosh operating system. In alternative embodiments, the file system graphical user interface system may be Windows Explorer which operates on Microsoft's Windows operating system. After the type of file has been determined in operation 503, the appropriate capture software (e.g. one of the importers 413) is activated for the determined file type. The importers may be a plug-in for the particular application which created the type of file about which notification is received in operation 501. Once activated, the importer or capture software imports the appropriate metadata (for the particular file type) into the metadata database, such as metadata database 415 as shown in operation 507. Then in operation 509, the metadata is stored in the database. In one exemplary embodiment, it may be stored in a flat file format. Then in operation 511, the metadata processing software 401 receives search parameter inputs and performs a search of the metadata database (and optionally also causes a search of non-metadata sources such as the index of files 421) and causes the results of the search to be displayed in a user interface. This may be performed by exchanging information between one of the applications, such as the software 405 or the software 407 or the other applications 409 and the metadata processing software 401 through the interface 411. For example, the file system software 405 may present a graphical user interface, allowing a user to input search parameters and allowing the user to cause a search to be performed. This information is conveyed through the interface 411 to the metadata processing software 401 which causes a search through the metadata database 415 and also may cause a search through the database 421 of the indexed files in order to search for content within each data file which has been indexed. The results from these searches are provided by the metadata processing software 401 to the requesting application which, in the example given here, was the software 405, but it will be appreciated that other components of software, such as the email software 407, may be used to receive the search inputs and to provide a display of the search results. Various examples of the user interface for inputting search requests and for displaying search results are described herein and shown in the accompanying drawings.

It will be appreciated that the notification, if done through the OS kernel, is a global, system wide notification process such that changes to any file will cause a notification to be sent to the metadata processing software. It will also be appreciated that in alternative embodiments, each application program may itself generate the necessary metadata and provide the metadata directly to a metadata database without the requirement of a notification from an operating system kernel or from the intervention of importers, such as the importers 413. Alternatively, rather than using OS kernel notifications, an embodiment may use software calls from each application to a metadata processing software which receives these calls and then imports the metadata from each file in response to the call.

Figure 6:
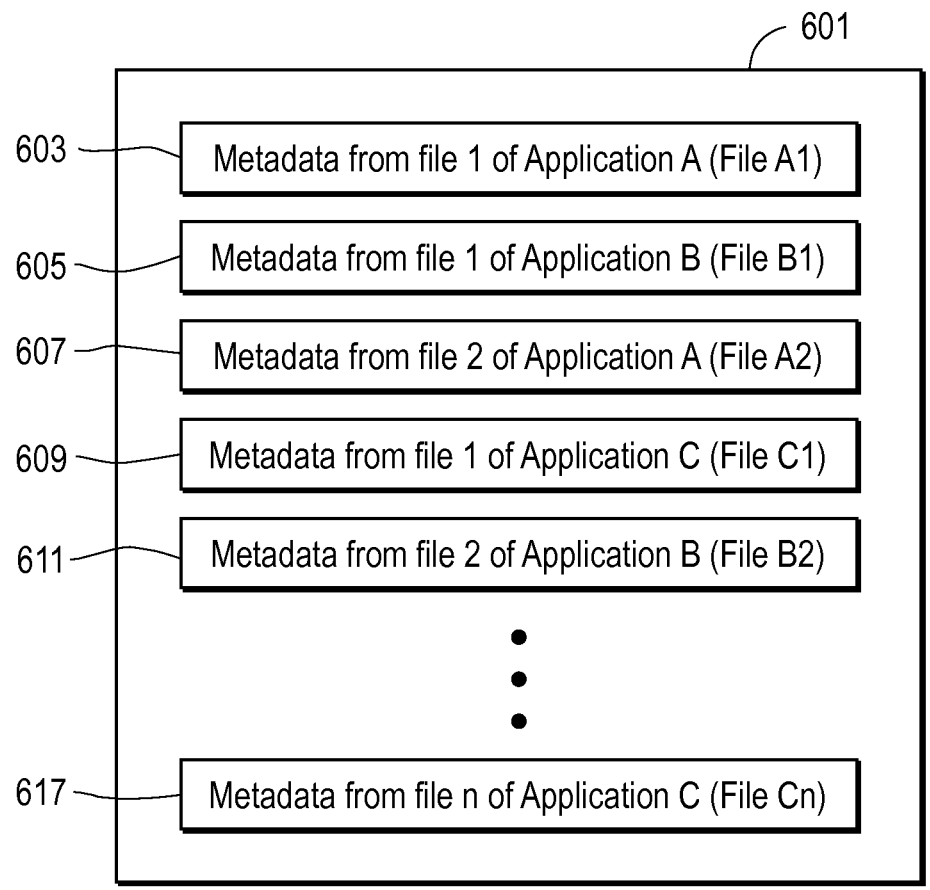
FIG. 6 shows an example of a storage format which utilizes a flat file format for metadata according to one exemplary embodiment of the invention.

As noted above, the metadata database 415 may be stored in a flat file format in order to improve the speed of retrieval of information in most circumstances. The flat file format may be considered to be a non-B tree, non-hash tree format in which data is not attempted to be organized but is rather stored as a stream of data. Each metadata object or metadata file will itself contain fields, such as the fields shown in the examples of FIGS. 3A and 3B. However, there will typically be no relationship or reference or pointer from one field in one metadata file to the corresponding field (or another field) in the next metadata file or in another metadata file of the same file type. FIG. 6 shows an example of the layout in a flat file format of metadata. The format 601 includes a plurality of metadata files for a corresponding plurality of data files. As shown in FIG. 6, metadata file 603 is metadata from file 1 of application A and may be referred to as metadata file A1. Similarly, metadata file 605 is metadata from file 1 of application B and may be referred to as metadata file B1. Each of these metadata files typically would include fields which are not linked to other fields and which do not contain references or pointers to other fields in other metadata files. It can be seen from FIG. 6 that the metadata database of FIG. 6 includes metadata files from a plurality of different applications (applications A, B, and C) and different files created by each of those applications. Metadata files 607, 609, 611, and 617 are additional metadata files created by applications A, B, and C as shown in FIG. 6.

A flexible query language may be used to search the metadata database in the same way that such query languages are used to search other databases. The data within each metadata file may be packed or even compressed if desirable. As noted above, each metadata file, in certain embodiments, will include a persistent identifier which uniquely identifies its corresponding data file. This identifier remains the same even if the name of the file is changed or the file is modified. This allows for the persistent association between the particular data file and its metadata.

User Interface Aspects

Various different examples of user interfaces for inputting search parameters and for displaying search results are provided herein. It will be understood that some features from certain embodiments may be mixed with other embodiments such that hybrid embodiments may result from these combinations. It will be appreciated that certain features may be removed from each of these embodiments and still provide adequate functionality in many instances.

Figure 7A:
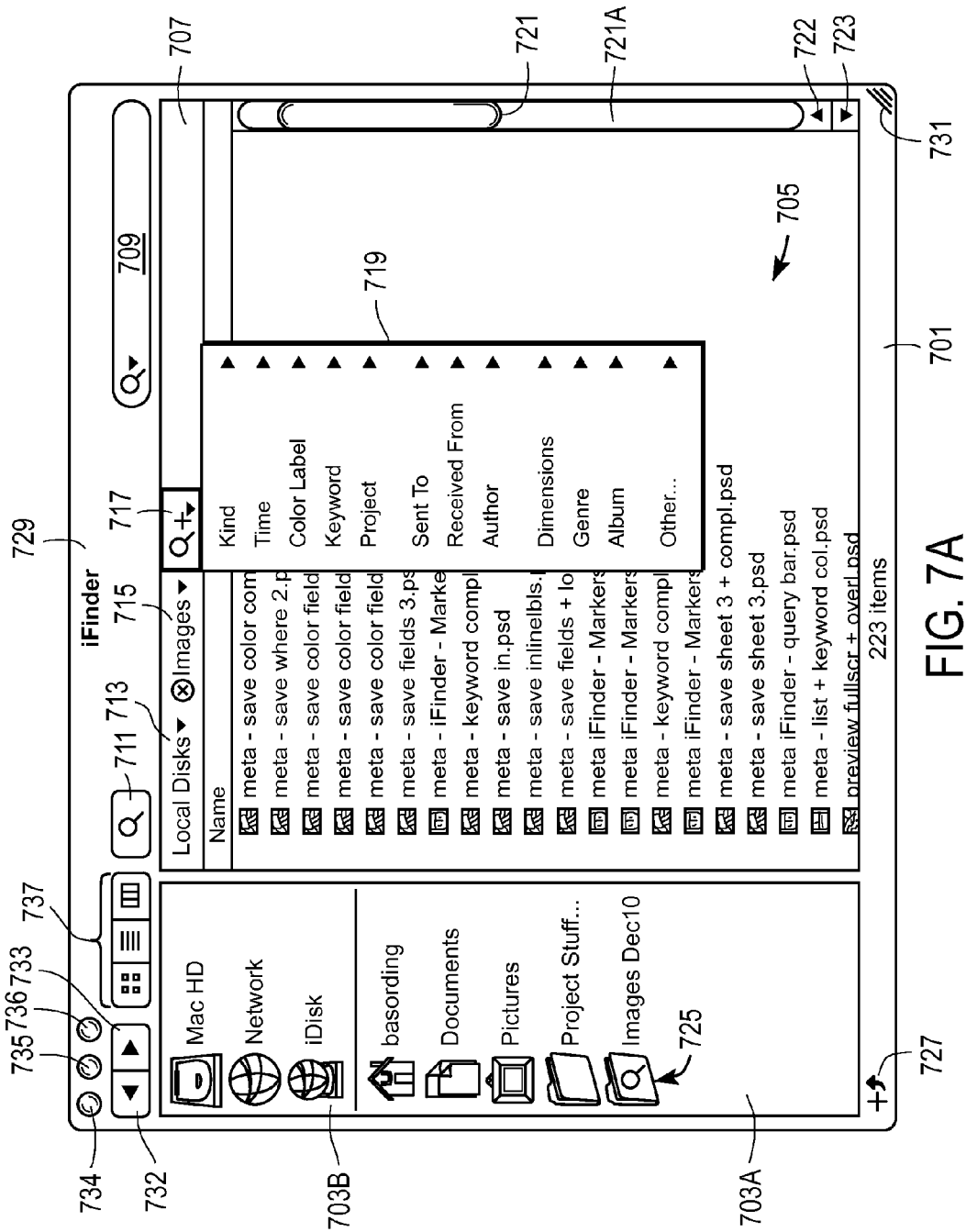
FIGS. 7A-7E show a sequence of graphical user interfaces provided by one exemplary embodiment in order to allow searching of metadata and/or other data in a data processing system.

FIG. 7A shows a graphical user interface which is a window which may be displayed on a display device which is coupled to a data processing system such as a computer system. The window 701 includes a side bar having two regions 703A, which is a user-configurable region, and 703B, which is a region which is specified by the data processing system. Further details in connection with these side bar regions may be found in co-pending U.S. patent application Ser. No. 10/873,661, filed Jun. 21, 2004, and entitled "Methods and Apparatuses for Operating a Data Processing System," by inventors Donald Lindsay and Bas Ording. The window 701 also includes a display region 705 which in this case displays the results of searches requested by the user. The window 701 also includes a search parameter menu bar 707 which includes configurable pull down menus 713, 715, and 717. The window 701 also includes a text entry region 709 which allows a user to enter text as part of the search query or search parameters. The button 711 may be a start search button which a user activates in order to start a search based upon the selected search parameters. Alternatively, the system may perform a search as soon as it receives any search parameter inputs or search queries from the user rather than waiting for a command to begin the search. The window 701 also includes a title bar 729 which may be used in conjunction with a cursor control device to move, in a conventional manner, the window around a desktop which is displayed on a display device. The window 701 also includes a close button 734, a minimize button 735, and a resize button 736 which may be used to close or minimize or resize, respectively, the window. The window 701 also includes a resizing control 731 which allows a user to modify the size of the window on a display device. The window 701 further includes a back button 732 and a forward button 733 which function in a manner which is similar to the back and forward buttons on a web browser, such as Internet Explorer or Safari. The window 701 also includes view controls which include three buttons for selecting three different types of views of the content within the display region 705. When the contents found in a search exceed the available display area of a display region 705, scroll controls, such as scroll controls 721, 722, and 723, appear within the window 701. These may be used in a conventional manner, for example, by dragging the scroll bar 721 within the scroll region 721A using conventional graphical user interface techniques.

The combination of text entry region 709 and the search parameter menu bar allow a user to specify a search query or search parameters. Each of the configurable pull down menus presents a user with a list of options to select from when the user activates the pull down menu. As shown in FIG. 7A, the user has already made a selection from the configurable pull down menu 713 to specify the location of the search, which in this case specifies that the search will occur on the local disks of the computer systems. Configurable pull down menu 715 has also been used by the user to specify the kind of document which is to be searched for, which in this case is an image document as indicated by the configurable pull down menu 715 which indicates "images" as the selected configuration of this menu and hence the search parameter which it specifies. The configurable pull down menu 717, as shown in FIG. 7A, represents an add search parameter pull down menu. This add search parameter pull down menu allows the user to add additional criteria to the search query to further limit the search results. In the embodiment shown in FIG. 7A, each of the search parameters is logically ANDed in a Boolean manner. Thus the current search parameter specified by the user in the state shown in FIG. 7A searches all local disks for all images, and the user is in the middle of the process of selecting another search criteria by having selected the add search criteria pull down menu 717, resulting in the display of the pull down menu 719, which has a plurality of options which may be selected by the user.

Figure 7B:
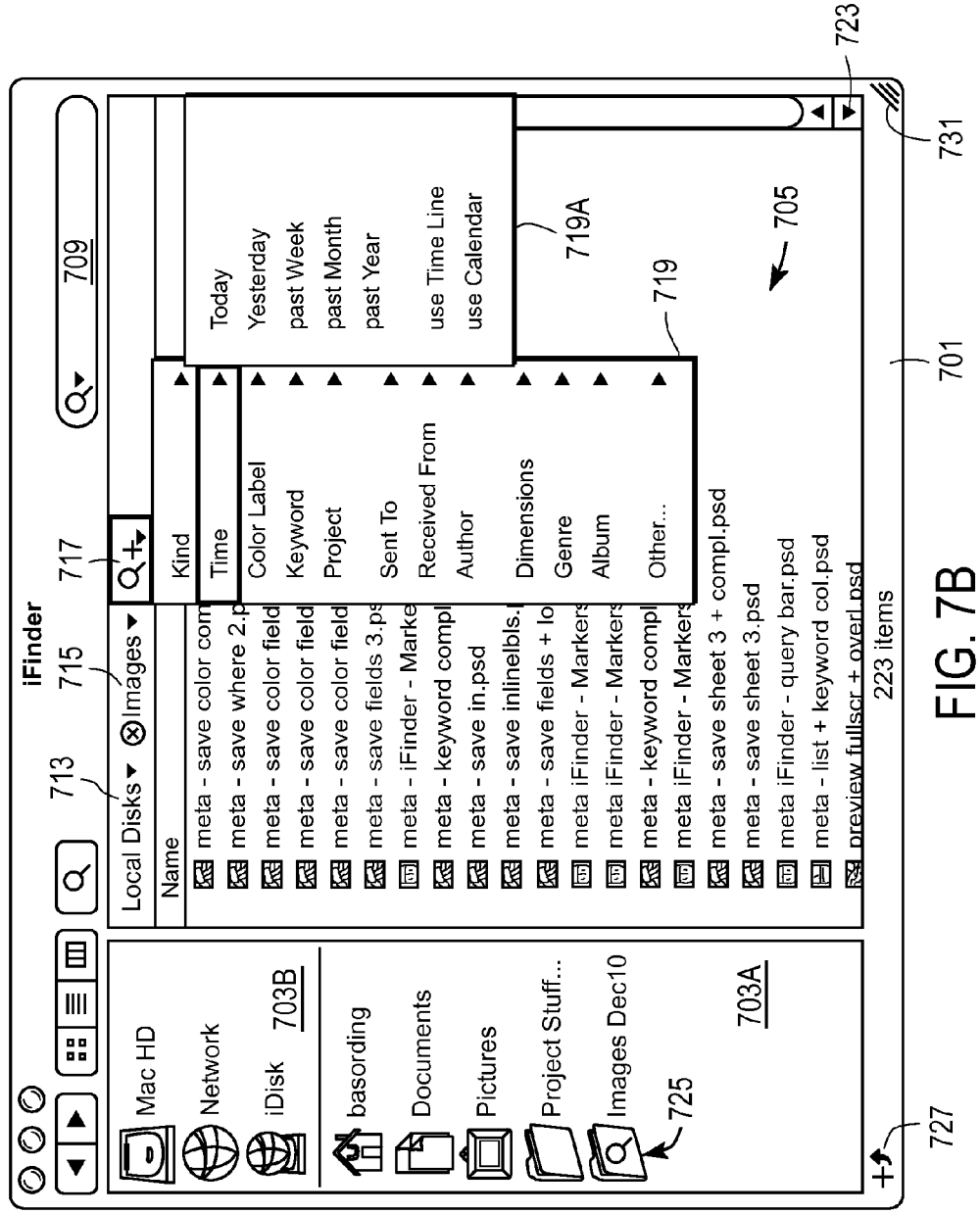

FIG. 7B shows the window 701 after the user has caused the selection of the time option within pull down menu 719, thereby causing the display of a submenu 719A which includes a list of possible times which the user may select from. Thus it appears that the user wants to limit the search to all images on all local disks within a certain period of time which is to be specified by making a selection within the submenu 719A.

Figure 7C:
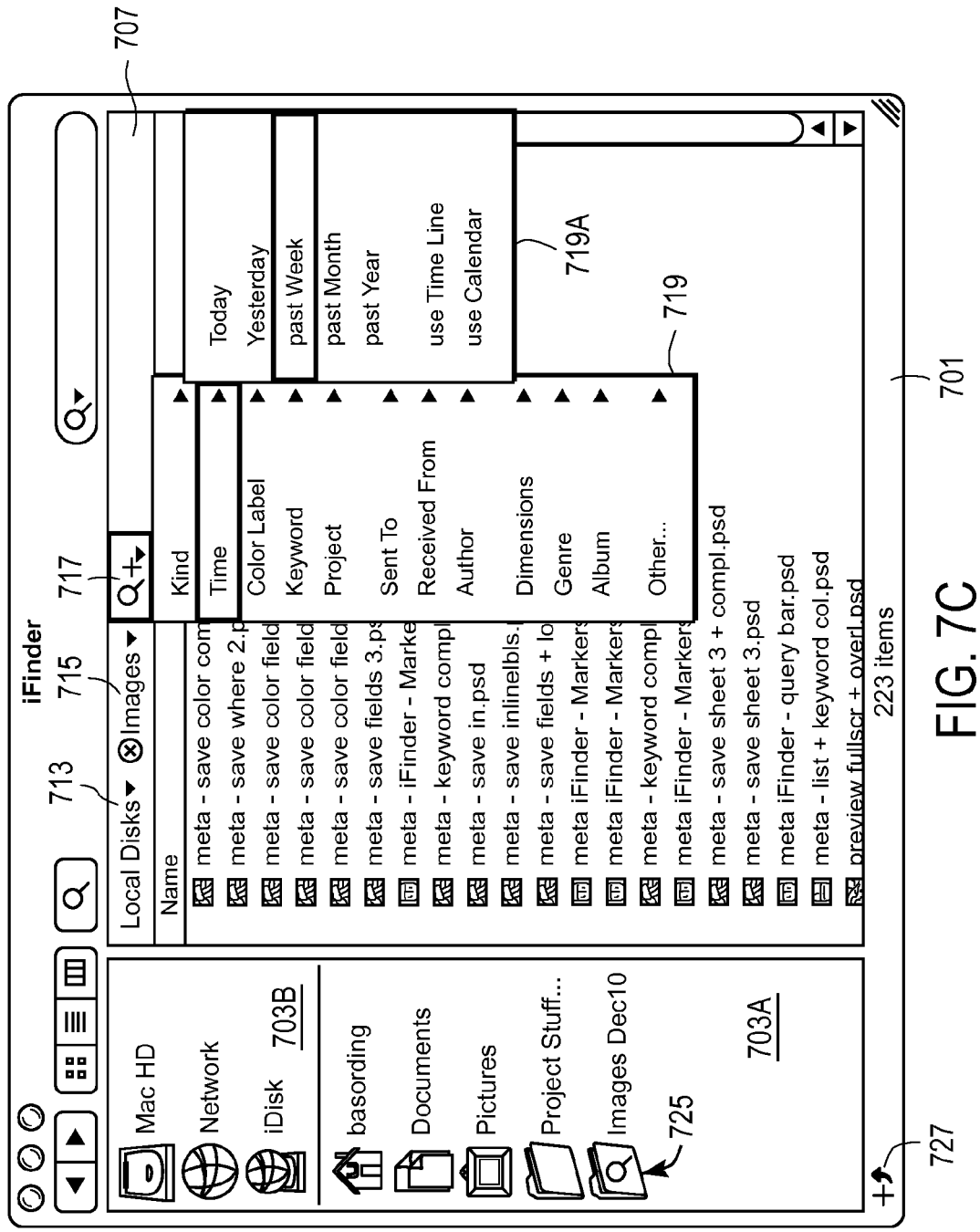
Figure 7D:
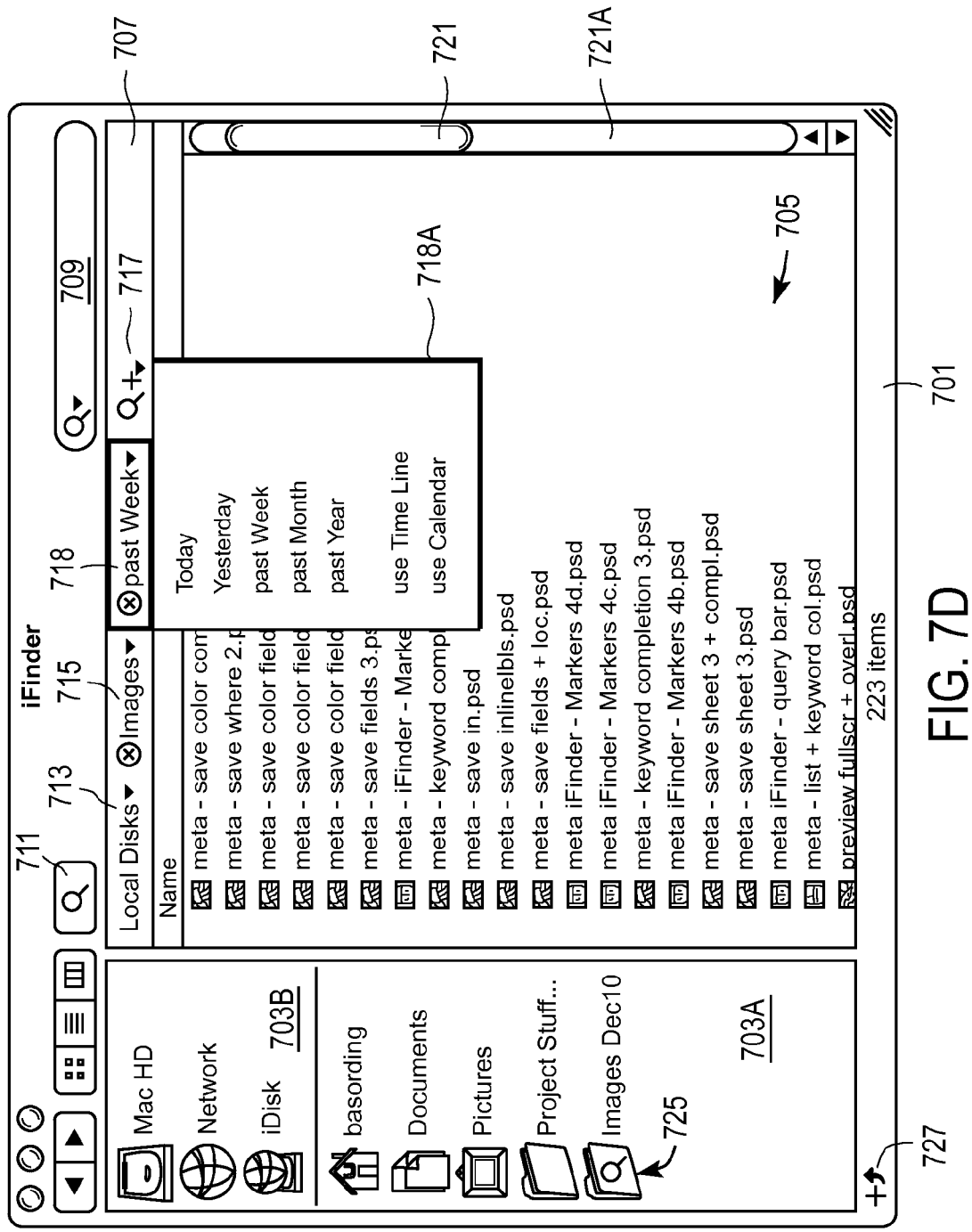
Figure 7E:
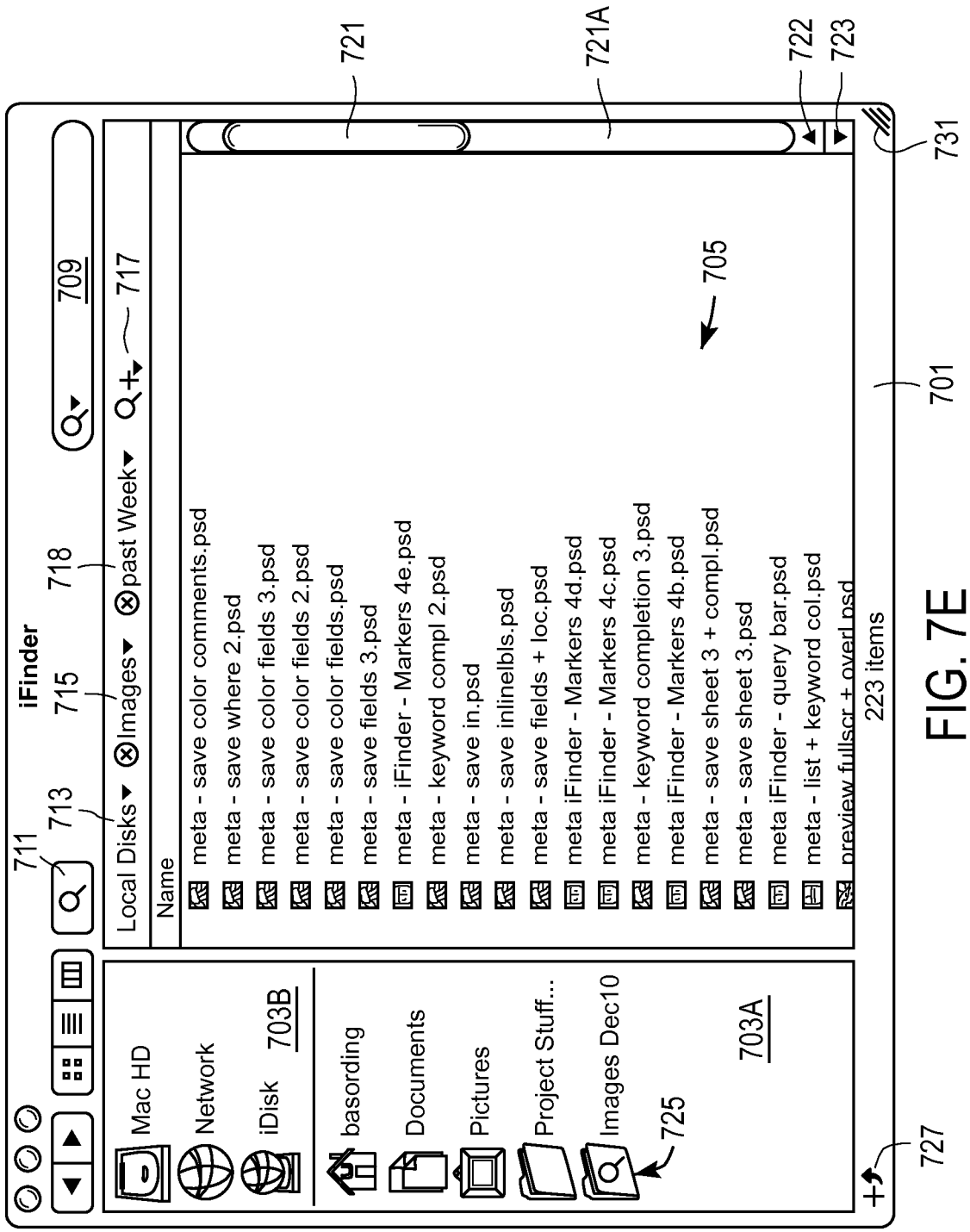

FIG. 7C shows the window 701 on the display of a data processing system after the user has selected a particular option (in this case "past week") from the submenu 719A. If the user accepts this selection, then the display shown in FIG. 7D results in which the configurable pull down menu 718 is displayed showing that the user has selected as part of the search criteria files that have been created or modified in the past week. It can be seen from FIG. 7D that the user can change the particular time selected from this pull down menu 718 by selecting another time period within the pull down menu 718A shown in FIG. 7D. Note that the configurable pull down menu 717, which represents an add search parameter menu, has now moved to the right of the configurable pull down menu 718. The user may add further search parameters by pressing or otherwise activating the configurable pull down menu 717 from the search parameter menu bar 707. If the user decides that the past week is the proper search criteria in the time category, then the user may release the pull down menu 718A from being displayed in a variety of different ways (e.g. the user may release the mouse button which was being depressed to keep the pull down menu 718A on the display). Upon releasing or otherwise dismissing the pull down menu 718A, the resulting window 701 shown in FIG. 7E then appears. There are several aspects of this user interface shown in FIG. 7A-7E which are worthy of being noted. The search parameters or search query is specified within the same window as the display of the search results. This allows the user to look at a single location or window to understand the search parameters and how they affected the displayed search results, and may make it easier for a user to alter or improve the search parameters in order to find one or more files. The configurable pull down menus, such as the add search parameter pull down menu, includes hierarchical pull down menus. An example of this is shown in FIG. 7B in which the selection of the time criteria from the pull down menu 717 results in the display of another menu, in this case a submenu 719A which may be selected from by the user. This allows for a compact presentation of the various search parameters while keeping the initial complexity (e.g. without submenus being displayed) at a lower level. Another useful aspect of the user interface shown in FIG. 7A-7E is the ability to reconfigure pull down menus which have previously been configured. Thus, for example, the configurable pull down menu 713 currently specifies the location of the search (in this case, all local disks), however, this may be modified by selecting the pull down region associated with the configurable pull down menu 713, causing the display of a menu of options indicating alternative locations which may be selected by the user. This can also be seen in FIG. 7D in which the past week option has been selected by the user (as indicated by "past week" being in the search parameter menu bar 707), but a menu of options shown in the pull down menu 718A allows the user to change the selected time from the "past week" to some other time criteria. Another useful aspect of this user interface is the ability to continue adding various search criteria by using the add search criteria pull down menu 717 and selecting a new criteria.

It will also be appreciated that the various options in the pull down menus may depend upon the fields within a particular type of metadata file. For example, the selection of "images" to be searched may cause the various fields present in the metadata for an image type file to appear in one or more pull down menus, allowing the user to search within one or more of those fields for that particular type of file. Other fields which do not apply to "images" types of files may not appear in these menus in order reduce the complexity of the menus and to prevent user confusion.

Another feature of the present invention is shown in FIGS. 7A-7E. In particular, the side bar region 703A, which is the user-configurable portion of the side bar, includes a representation of a folder 725 which represents the search results obtained from a particular search, which search results may be static or they may be dynamic in that, in certain instances, the search can be performed again to obtain results based on the current files in the system. The folder 725 in the example shown in FIGS. 7A-7E represents a search on a local disk for all images done on December 10$^{th}$. By selecting this folder in the side bar region 703A, the user may cause the display in the display region 705 of the results of that search. In this way, a user may retrieve a search result automatically by saving the search result into the side bar region 703A. One mechanism for causing a search result or a search query to be saved into the side bar region 703A is to select the add folder button 727 which appears in the bottom portion of the window 701. By selecting this button, the current search result or search query is saved as a list of files and other objects retrieved in the current search result. In the case where the search query is saved for later use rather than the saving of a search result, then the current search query is saved for re-use at a later time in order to find files which match the search query at that later time. The user may select between these two functionalities (saving a search result or saving a search query) by the selection of a command which is not shown.

FIGS. 8A and 8B show another aspect of a user interface feature which may be used with certain embodiments of the present invention. The window 801 of FIG. 8A represents a display of the search results which may be obtained as a result of using one of the various different embodiments of the present invention. The search results are separated into categories which are separated by headers 805, 807, 809, and 811 which in this case represent periods of time. This particular segmentation with headers was selected by the user's selecting the heading "date modified" using the date modified button 803 at the top of the window 801. An alternative selection of the kind category by selecting the button 802 at the top of the window 801A shown in FIG. 8B results in a different formatting of the search results which are now categorized by headers which indicate the types of files which were retrieved in the search and are separated by the headings 815, 817, 819, and 821 as shown in FIG. 8B. The use of these headings in the search results display allows the user to quickly scan through the search results in order to find the file.

Figure 9:
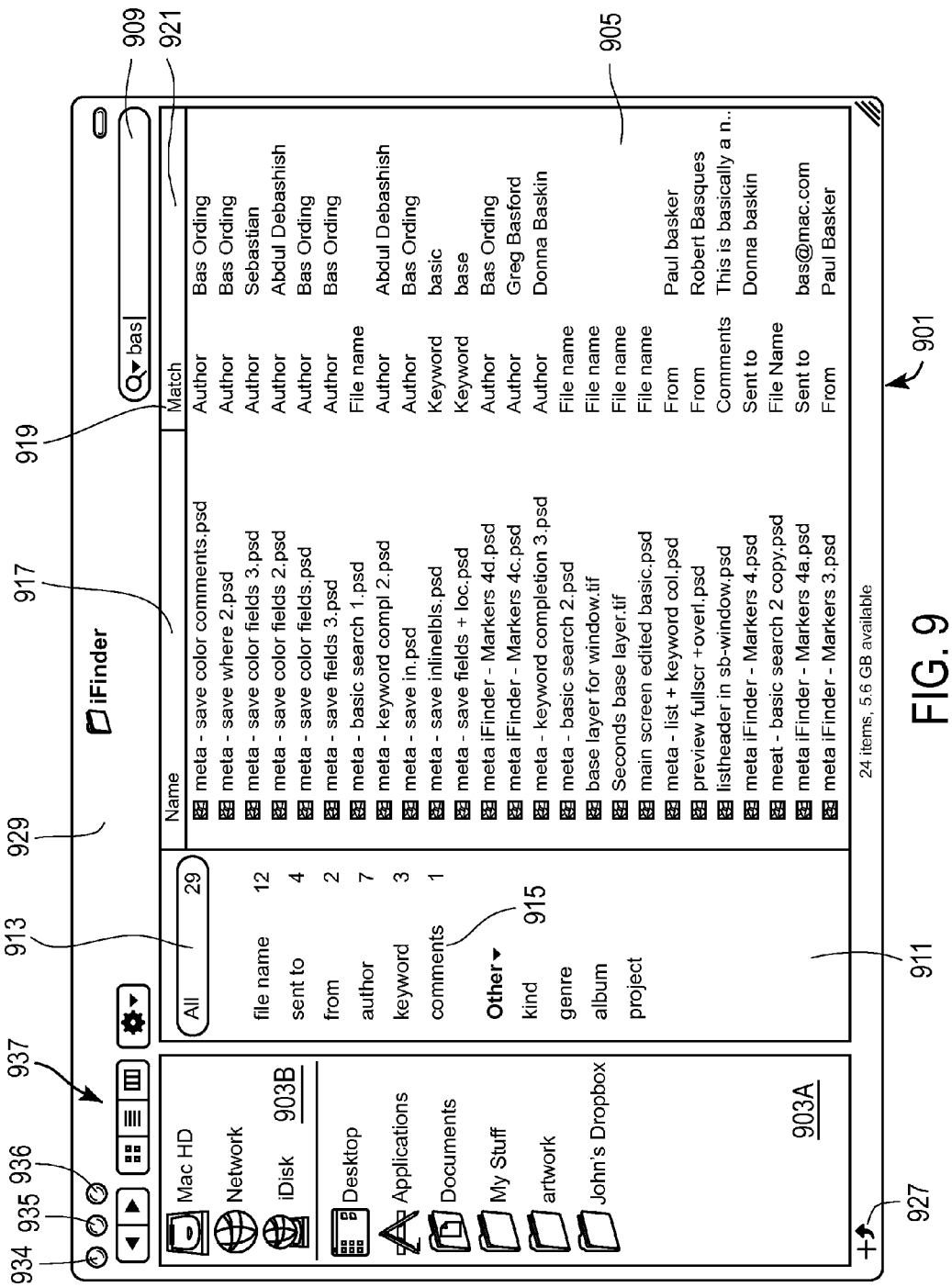
FIG. 9 shows another exemplary user interface of the present invention.

FIG. 9 shows another aspect of the present invention that is illustrated as part of the window 901 shown in FIG. 9. This window includes a display region 905 which shows the results of the search and the window also includes two side bar regions 903A and 903B, where the side bar region 903A is the user-configurable portion and the side bar region 903B is the system controlled portion. A folder add button 927 may be selected by the user to cause the addition of a search result or a search query to be added to the user-configurable portion of the side bar. The window 901 also includes conventional window controls such as a title bar or region 929 which may be used to move the window around a display and view select buttons 937 and maximize, minimize and resize buttons 934, 935, and 936 respectively. The window 901 shows a particular manner in which the results of a text-based search may be displayed. A text entry region 909 is used to enter text for searching. This text may be used to search through the metadata files or the indexed files or a combination of both. The display region 905 shows the results of a search for text and includes at least two columns, 917 and 919, which provide the name of the file that was found and the basis for the match. As shown in column 919, the basis for the match may be the author field or a file name or a key word or comments or other data fields contained in metadata that was searched. The column 921 shows the text that was found which matches the search parameter typed into the text entry field 909. Another column 911 provides additional information with respect to the search results. In particular, this column includes the number of matches for each particular type of category or field as well as the total number of matches indicated in the entry 913. Thus, for example, the total number of matches found for the comments field is only 1, while other fields have a higher number of matches.

Figure 10:
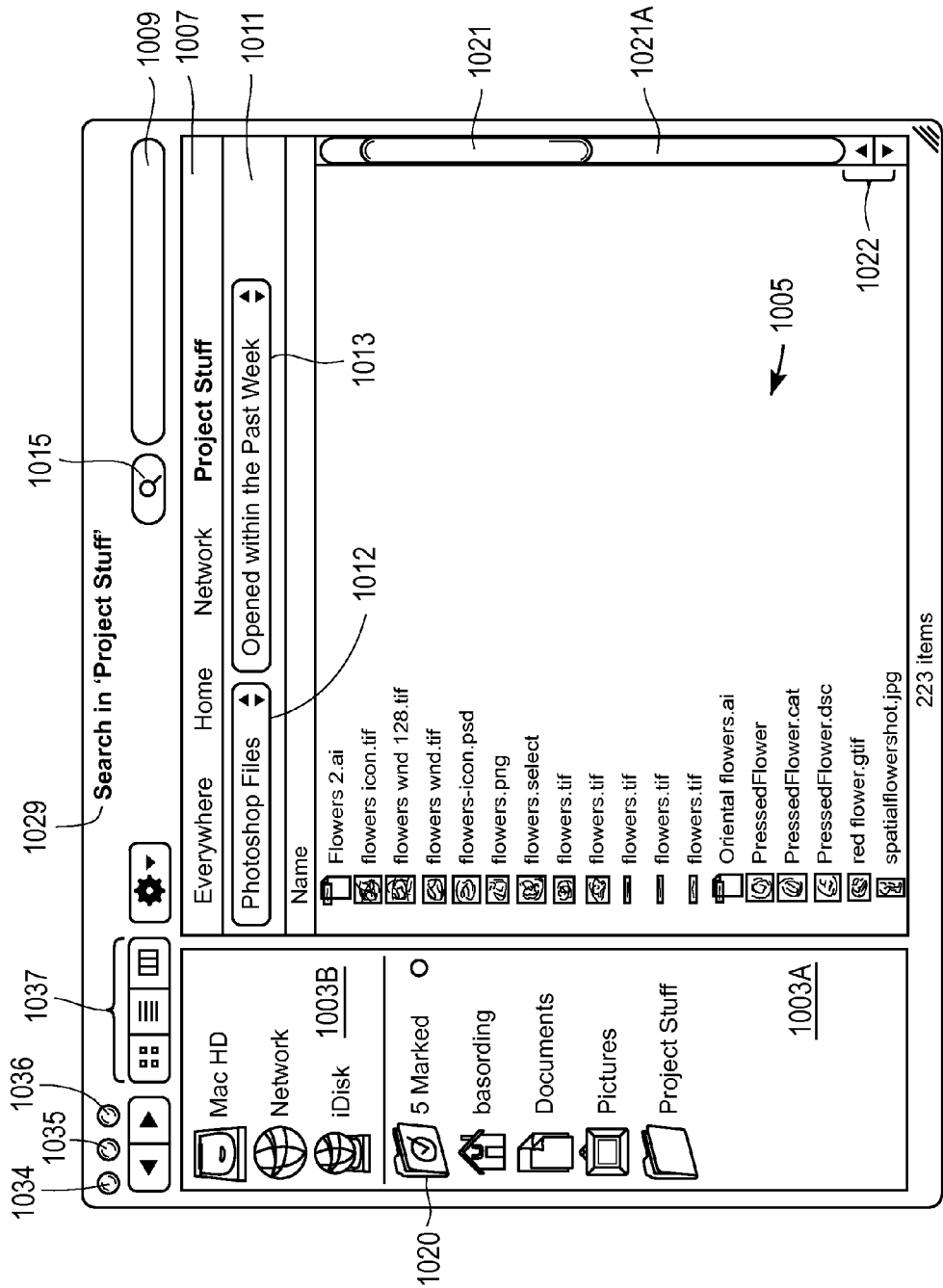
FIG. 10 shows another exemplary user interface of the present invention.

FIG. 10 shows certain other aspects of some embodiments of the present invention. Window 1001 is another search result window which includes various fields and menus for a user to select various search parameters or form a search query. The window 1001 includes a display region 1005 which may be used to display the results of a search and a user-configurable side bar portion 1003A and a system specified side bar portion 1003B. In addition, the window 1001 includes conventional scrolling controls such as controls 1021 and 1022 and 1021A. The window further includes conventional controls such as a title bar 1029 which may be used to move the window and view control buttons 1037 and maximize, minimize, and resize buttons 1034, 1035, and 1036. A start search button 1015 is near a text entry region 1009. A first search parameter menu bar 1007 is displayed adjacent to a second search parameter bar 1011. The first search parameter search bar 1007 allows a user to specify the location for a particular search while two menu pull down controls in the second search parameter menu bar 1011 allow the user to specify the type of file using the pull down menu 1012 and the time the file was created or last modified using the menu 1013.

The window 1001 includes an additional feature which may be very useful while analyzing a search result. A user may select individual files from within the display region 1005 and associate them together as one collection. Each file may be individually marked using a specific command (e.g. pressing the right button on a mouse and selecting a command from a menu which appears on the screen, which command may be "add selection to current group") or similar such commands. By individually selecting such files or by selecting a group of files at once, the user may associate this group of files into a selected group or a "marked" group and this association may be used to perform a common action on all of the files in the group (e.g. print each file or view each file in a viewer window or move each file to a new or existing folder, etc.). A representation of this marked group appears as a folder in the user-configurable portion 1003A. An example of such a folder is the folder 1020 shown in the user-configurable portion 1003A. By selecting this folder (e.g. by positioning a cursor over the folder 1020 and pressing and releasing a mouse button or by pressing another button) the user, as a result of this selection, will cause the display within the display region 1005 of the files which have been grouped together or marked. Alternatively, a separate window may appear showing only the items which have been marked or grouped. This association or grouping may be merely temporary or it may be made permanent by retaining a list of all the files which have been grouped and by keeping a folder 1020 or other representations of the grouping within the user-configurable side bar, such as the side bar 1003A. Certain embodiments may allow multiple, different groupings to exist at the same time, and each of these groupings or associations may be merely temporary (e.g. they exist only while the search results window is displayed), or they may be made permanent by retaining a list of all the files which have been grouped within each separate group. It will be appreciated that the files within each group may have been created from different applications. As noted above, one of the groupings may be selected and then a user may select a command which performs a common action (e.g. print or view or move or delete) on all of the files within the selected group.

Figure 11A:
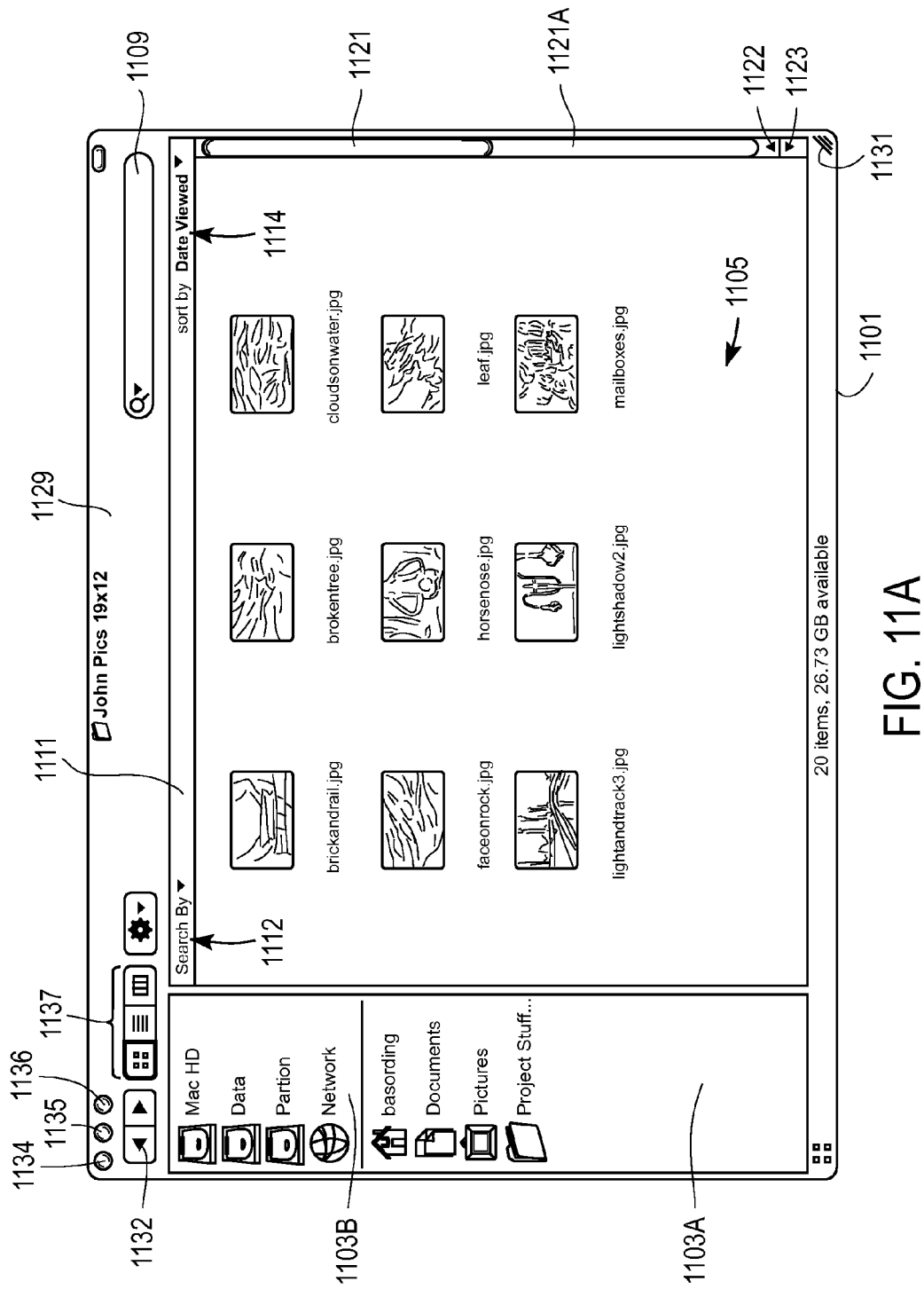
FIGS. 11A-11D show, in sequence, another exemplary user interface according to the present invention.
Figure 11B:
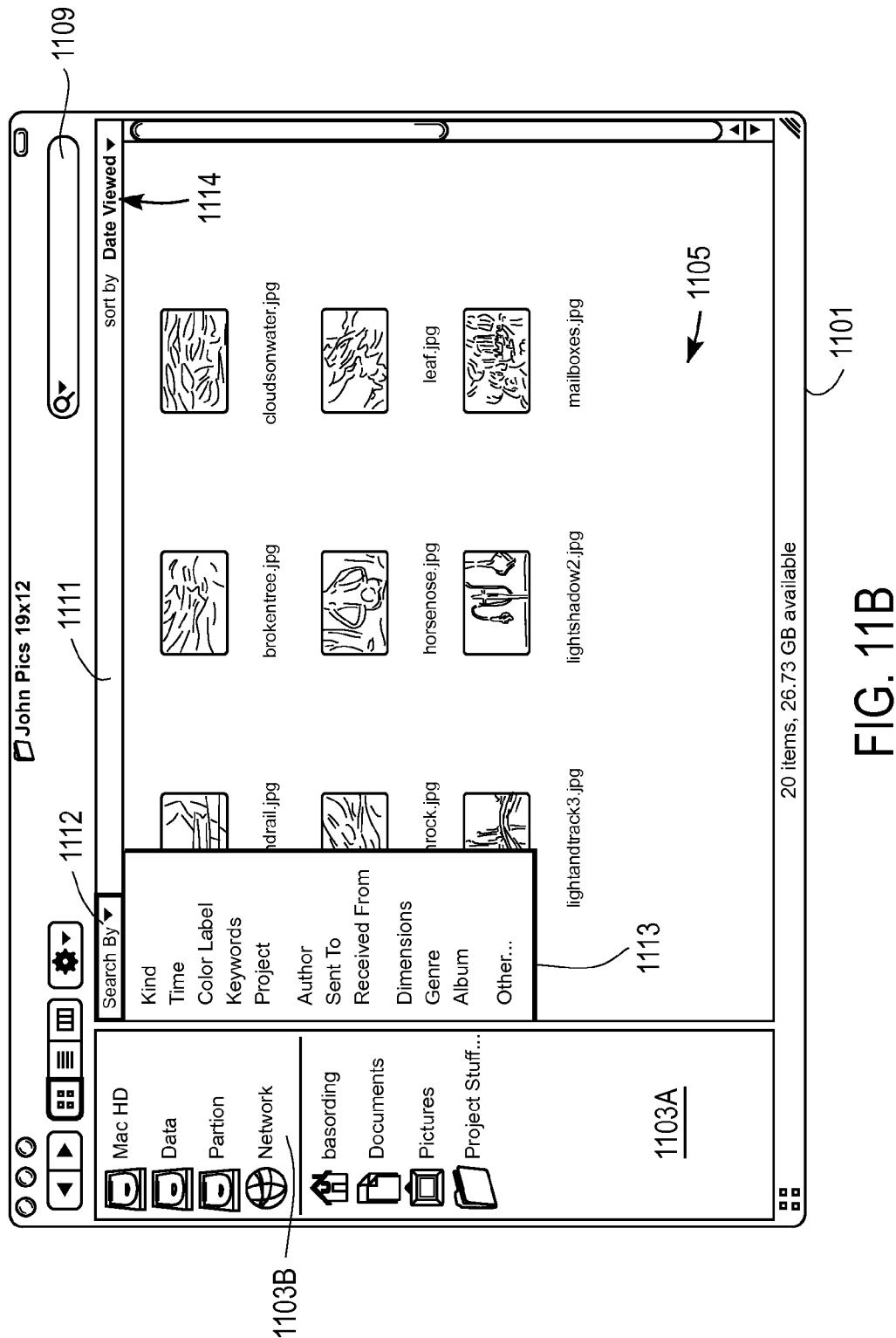

FIGS. 11A, 11B, 11C, and 11D show an alternative user interface for allowing a user to input search queries or search parameters. The user interface shown in these figures appears within the window 1101 which includes a user-configurable side bar region 1103A and a system specified side bar region 1103B. The window 1101 also includes traditional window controls such as a window resizing control 1131 which may be dragged in a conventional graphical user interface manner to resize the window, and the window further includes scrolling controls such as controls 1121, 1122, and 1123. The scrolling control 1121 may, for example, be dragged within the scrolling region 1121A or a scroll wheel on a mouse or other input device may be used to cause scrolling within a display region 1105. Further, traditional window controls include the title bar 1129 which may be used to move the window around a desktop which is displayed on a display device of a computer system and the window also includes view buttons 1137 as well as close, minimize, and resize buttons 1134, 1135 and 1136. A back and forward button, such as the back button 1132, are also provided to allow the user to move back and forth in a manner which is similar to the back and forth commands in a web browser. The window 1101 includes a search parameter menu bar 1111 which includes a "search by" pull down menu 1112 and a "sort by" pull down menu 1114. The "search by" pull down menu 1112 allows a user to specify the particular search parameter by selecting from the options which appear in the pull down menu once it is activated as shown in FIG. 11B. In particular, the pull down menu 1113 shows one example of a pull down menu when the "search by" pull down menu 1112 has been activated. The "sort by" pull down menu 1114 allows a user to specify how the search results are displayed within a display region 1105. In the example shown in FIGS. 11A-11D a user has used the "sort by" pull down menu 1114 to select the "date viewed" criteria to sort the search results by. It should also be noted that the user may change the type of view of the search results by selecting one of the three view buttons 1137. For example, a user may select an icon view which is the currently selected button among the view buttons 1137, or the user may select a list view or a column view.

Figure 11C:
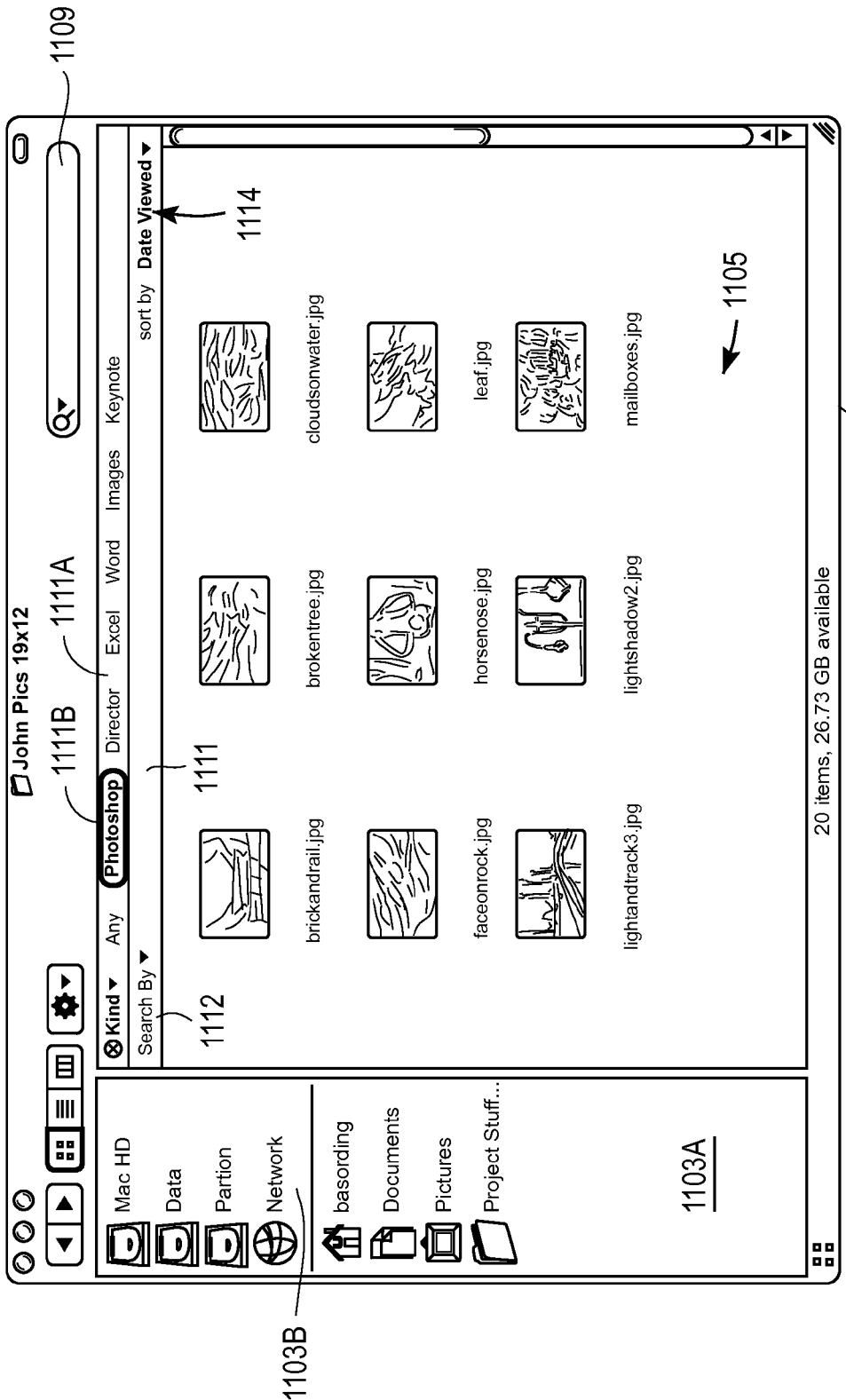
Figure 11D:
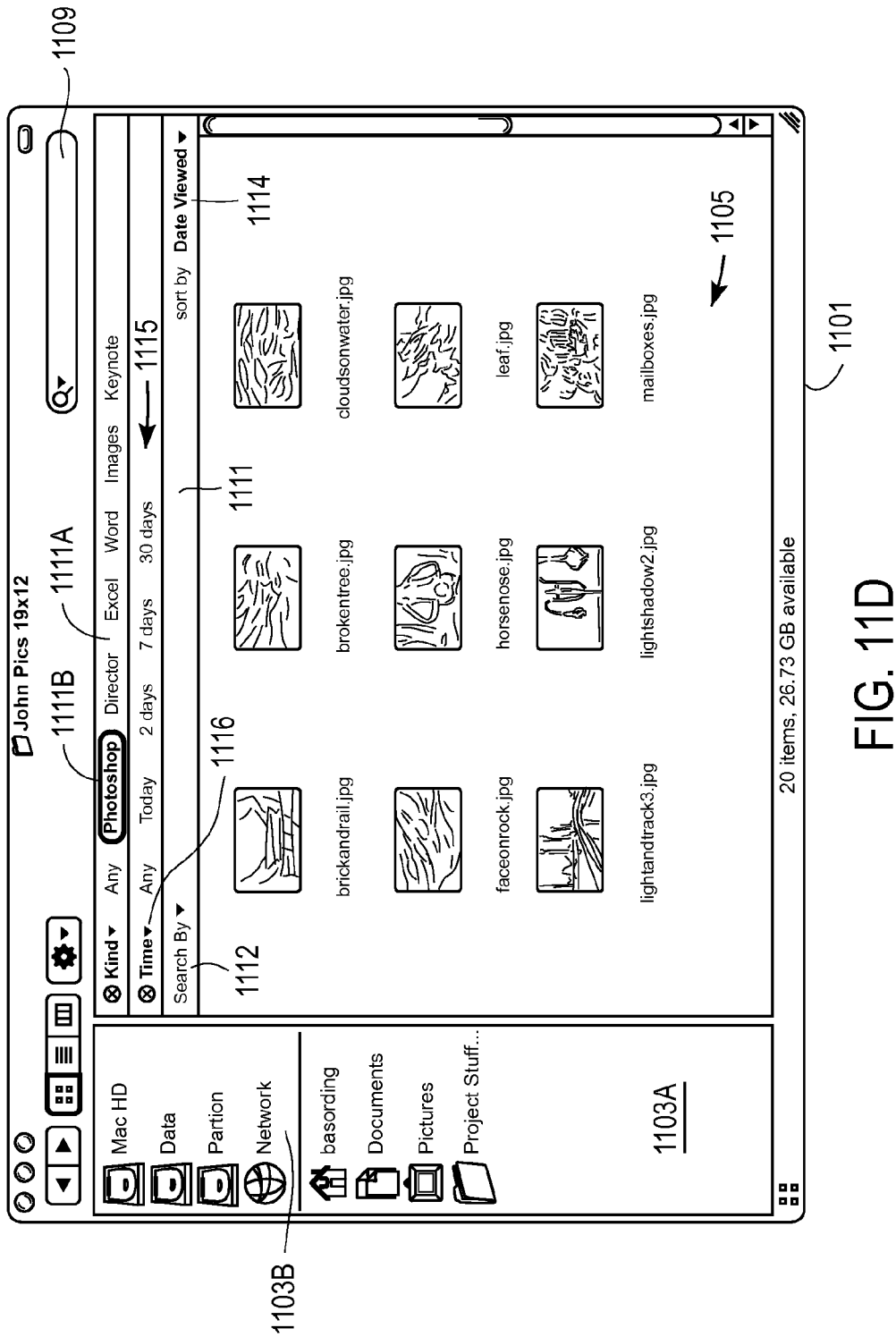

FIG. 11B shows the result of the user's activation of a "search by" pull down menu 1112 which causes the display of the menu 1113 which includes a plurality of options from which the user may choose to perform a search by. It will be appreciated that there are a number of different ways for a user to activate the "search by" pull down menu 1112. One way includes the use of a cursor, such as a pointer on a display which is controlled by a cursor control device, such as a mouse. The cursor is positioned over the region associated with the "search by" menu title (which is the portion within the search parameter menu bar 1111 which contains the words "search by") and then the user indicates the selection of the menu title by pressing a button, such as a mouse's button, to cause the pull down menu to appear, which in this case is the menu 1113 shown in FIG. 11B. At this point, the user may continue to move the cursor to point to a particular option within the menu, such as the "time" option. This may result in the display of a submenu to the left or to the right of the menu 1113. This submenu may be similar to the submenu 719A or to the menu 1214 shown in FIG. 12A. If the "kind" option is selected in the menu 1113, the submenu may include a generic list of the different kinds of documents, such as images, photos, movies, text, music, PDF documents, email documents, etc. or the list may include references to specific program names such as PhotoShop, Director, Excel, Word, etc. or it may include a combination of generic names and specific names. FIG. 11C shows the result of the user having selected PhotoShop type of documents from a submenu of the "kind" option shown in menu 1113. This results in the display of the search parameter menu bar 1111A shown in FIG. 11C which includes a highlighted selection 1111B which indicates that the PhotoShop type of documents will be searched for. The search parameter menu bar 1111 appears below the search parameter menu bar 1111A as shown in FIG. 11C. The user may then specify additional search parameters by again using the "search by" pull down menu 1112 or by typing text into the text entry field 1109. For example, from the state of the window 1101 shown in FIG. 11C, the user may select the "search by" pull down menu 1112 causing the display of a menu containing a plurality of options, such as the options shown within the menu 1113 or alternative options such as those which relate to PhotoShop documents (e.g. the various fields in the metadata for PhotoShop type of documents). A combination of such fields contained within metadata for PhotoShop type documents and other generic fields (e.g. time, file size, and other parameters) may appear in a menu, such as the menu 1113 which is activated by selecting the "search by" pull down menu. The user may then select another criteria such as the time criteria. In this case, the window 1101 displays a new search parameter menu bar 1115 which allows a user to specify a particular time. The user may select one of the times on the menu bar 1115 or may activate a pull down menu by selecting the menu title "time," which is shown as the menu title 1116. The state of the window 1101 shown in FIG. 11D would then search for all PhotoShop documents created in the last 30 days or 7 days or 2 days or today or at any time, depending on the particular time period selected by the user.

FIGS. 12A, 12B, 12C and 12D show another example of a user interface for allowing the creation of search queries for searching metadata and other data and for displaying the results of the search performed using a search query. The different implementation shown in FIGS. 12A-12D shows a user interface presentation in a column mode; this can be seen by noting the selection of the column button, which is the rightmost button in the view buttons 1237 shown in FIG. 12A. The window 1201 has two columns 1211 and the display region 1205, while the window 1251 of FIG. 12C has three columns which are columns 1257, 1259, and the display region 1255, and the window 1271 has three columns which are columns 1277, 1279, and the display region 1275.

Figure 12A:
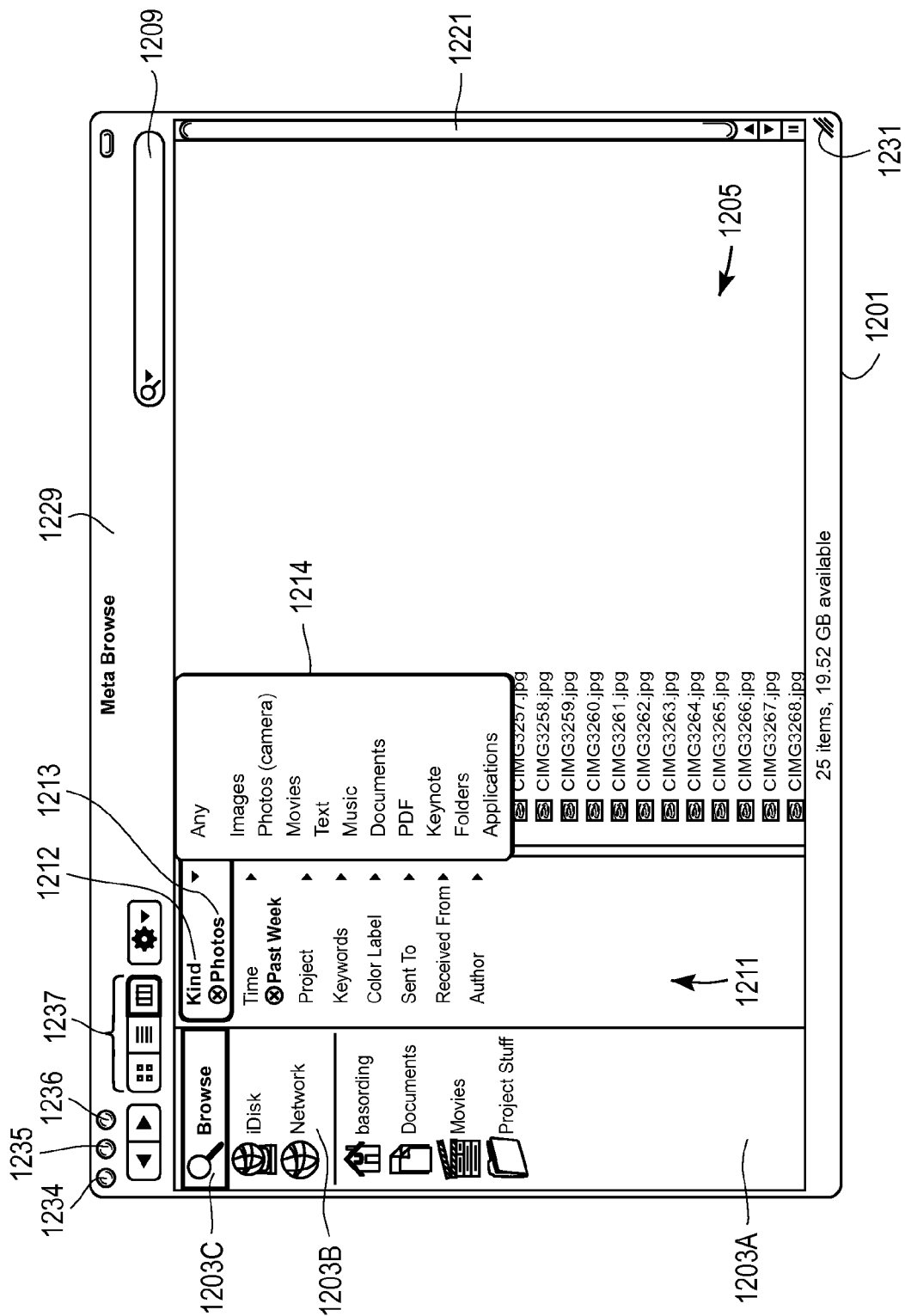
FIGS. 12A-12D show alternative embodiments of user interfaces according to the present invention.
Figure 12B:
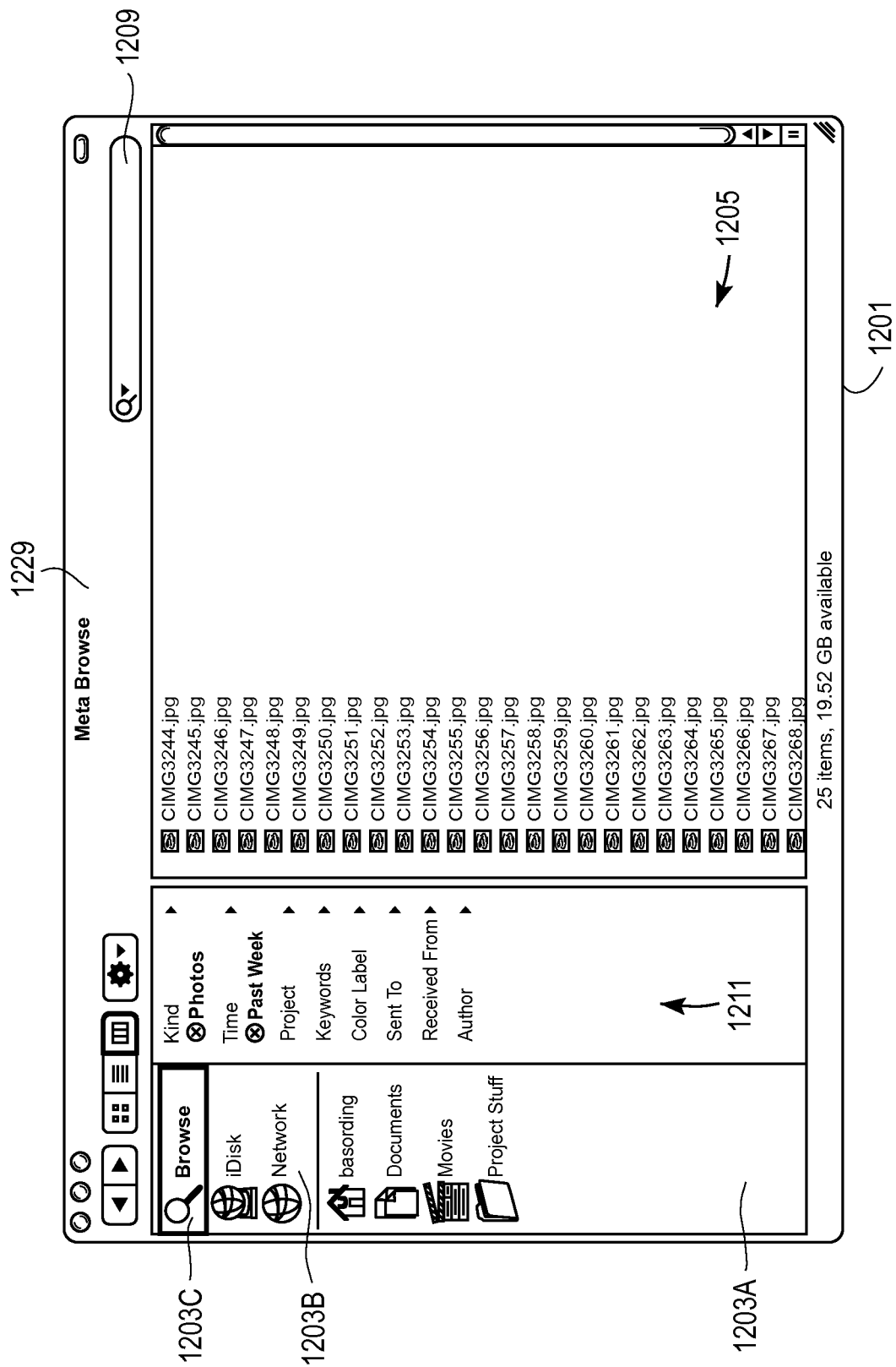

The window 1201 shown in FIGS. 12A and 12B includes a display region 1205 which shows the results of a search; these results may be shown dynamically as the user enters search parameters or the results may be shown only after the user has instructed the system to perform the search (e.g. by selecting a "perform search" command). The window 1201 includes conventional window controls, such as a resizing control 1231, a scrolling control 1221, a title bar 1229 which may be used to move the window, a window close button, a window minimize button, and a window resize button 1234, 1235, and 1236, respectively. The window 1201 also includes a user-configurable side bar region 1203A and a system specified side bar region 1203B. It can be seen from FIG. 12A that a browse mode has been selected as indicated by the highlighted "browse" icon 1203C in the system specified side bar region 1203B. The window 1201 also includes a text entry region 1209, which a user may use to enter text for a search, and the window 1201 also includes view selector buttons 1237.

A column 1211 of window 1201 allows a user to select various search parameters by selecting one of the options which in turn causes the display of a submenu that corresponds to the selected option. In the case of FIG. 12A, the user has selected the "kind" option 1212 and then has used the submenu 1214 to select the "photos" option from the submenu, resulting in an indicator 1213 (photos) to appear in the column 1211 under the "kind" option as shown in FIG. 12A. It can also be seen that the user has previously selected the "time" option in the column 1211 and has selected from a submenu brought up when the "time" option was selected the "past week" search parameter. When the user has finished making selections of the various options and suboptions from both the column 1211 and any of the corresponding submenus which appear, then the display showed in FIG. 12B appears. Note that the submenus are no longer present and that the user has completed the selection of the various options and suboptions which specify the search parameters. Column 1211 in FIG. 12B provides feedback to the user indicating the exact nature of the search query (in this case a search for all photos dated in the past week), and the results which match the search query are shown in the display region 1205.

Figure 12C:
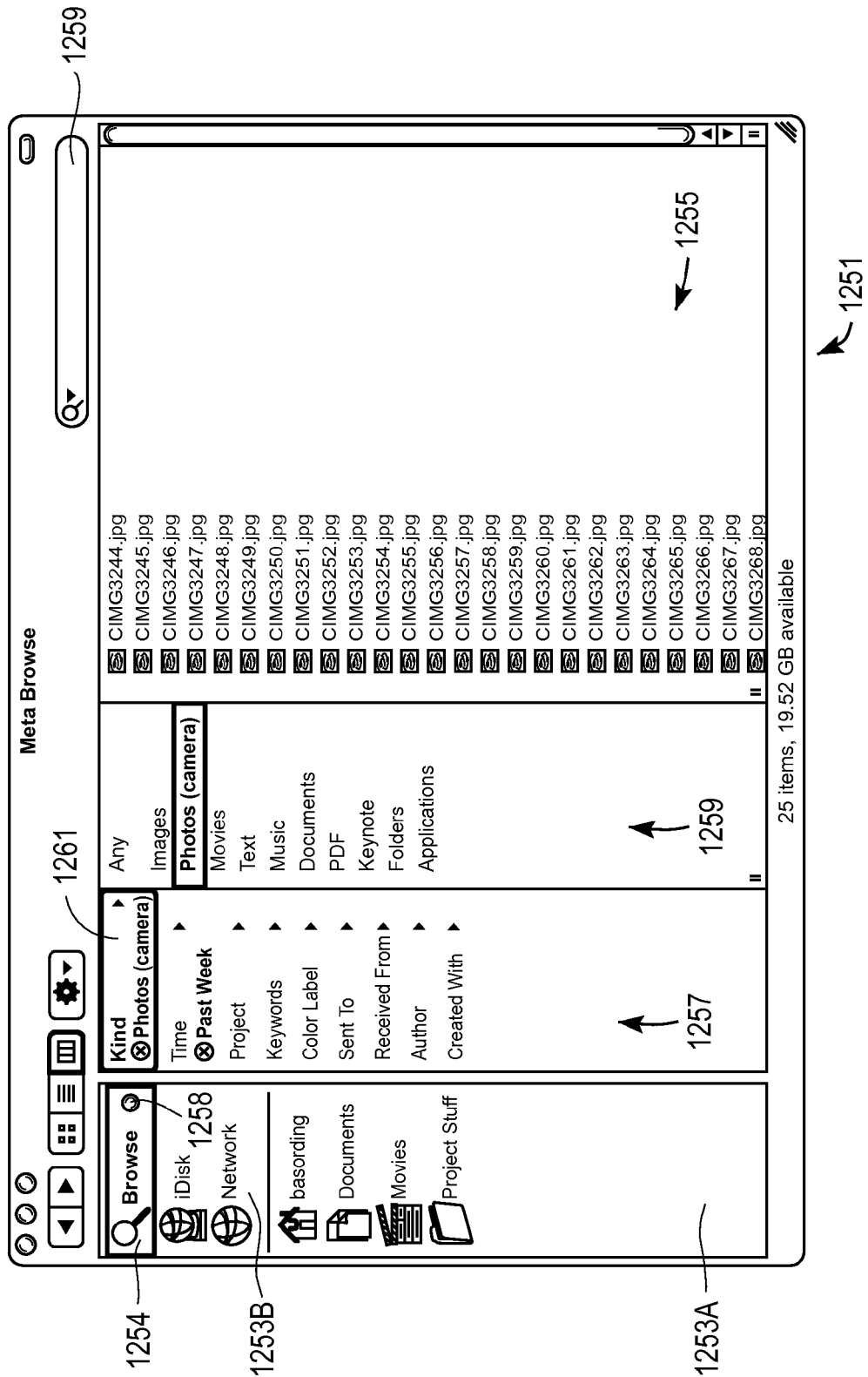
Figure 12D:
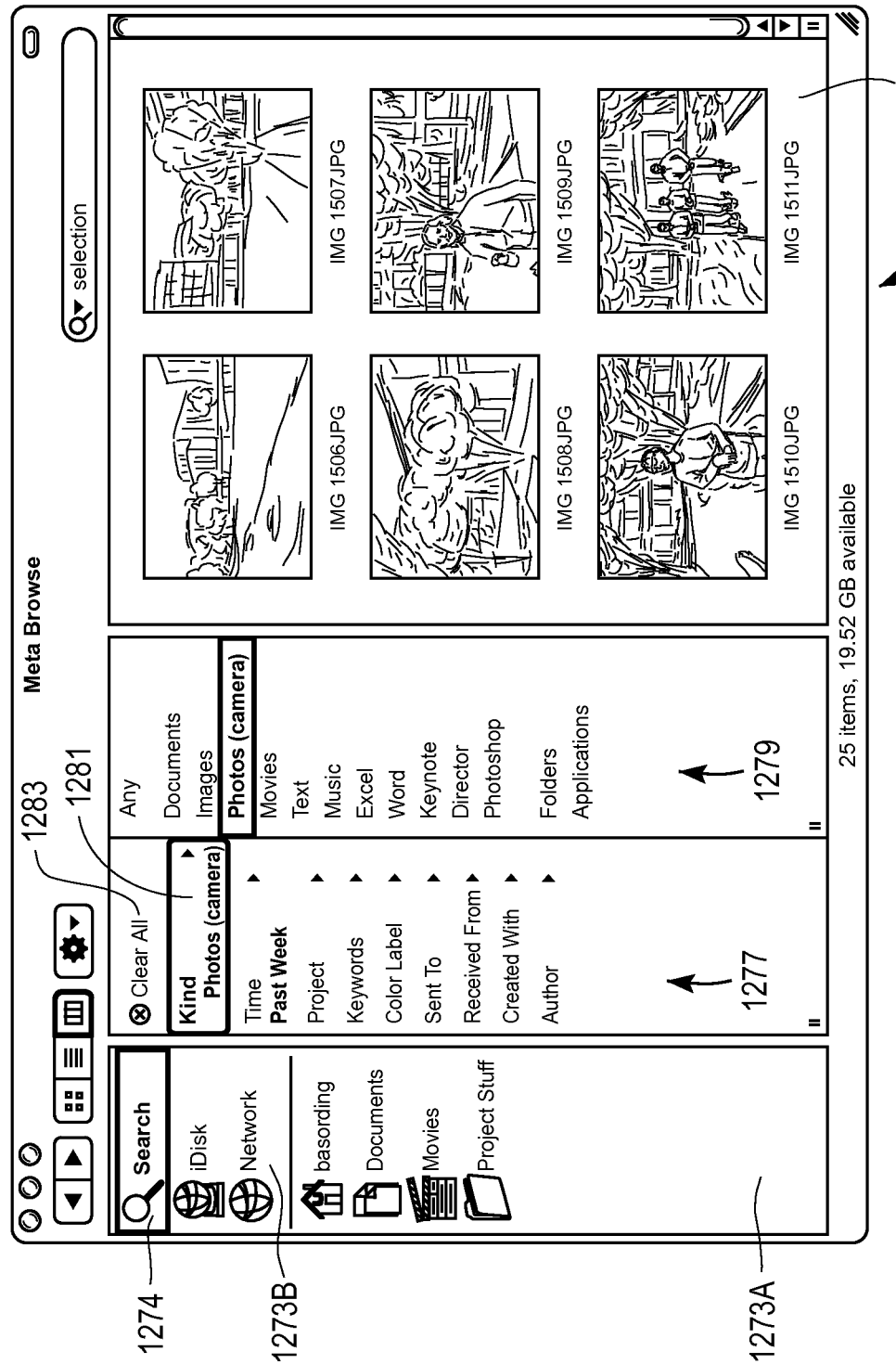

FIGS. 12C and 12D show an alternative embodiment in which the submenus which appear on a temporary basis in the embodiment of FIGS. 12A and 12B are replaced by an additional column which does not disappear after a selection is made. In particular, the column 1259 of the window 1251 functions in the same manner as the submenu 1214 except that it remains within the window 1251 after a selection is made (wherein the submenu 1214 is removed from the window after the user makes the selection from the submenu). The column 1279 of window 1271 of FIG. 12D is similar to the column 1259. The window 1251 includes a side bar which has a user-configurable side bar region 1253A and a system defined side bar region 1253B. The system specified side bar region 1253B includes a "browse" selection region 1254 which has a clear button 1258 which the user may select to clear the current search query. The window 1271 of FIG. 12D provides an alternative interface for clearing the search query. The window 1271 also includes a user configurable side bar region 1273A and a system specified side bar region 1273B, but the clear button, rather than being with the "search" region 1274 is at the top of the column 1277. The user may clear the current search parameter by selecting the button 1283 as shown in FIG. 12D.

Figure 13A:
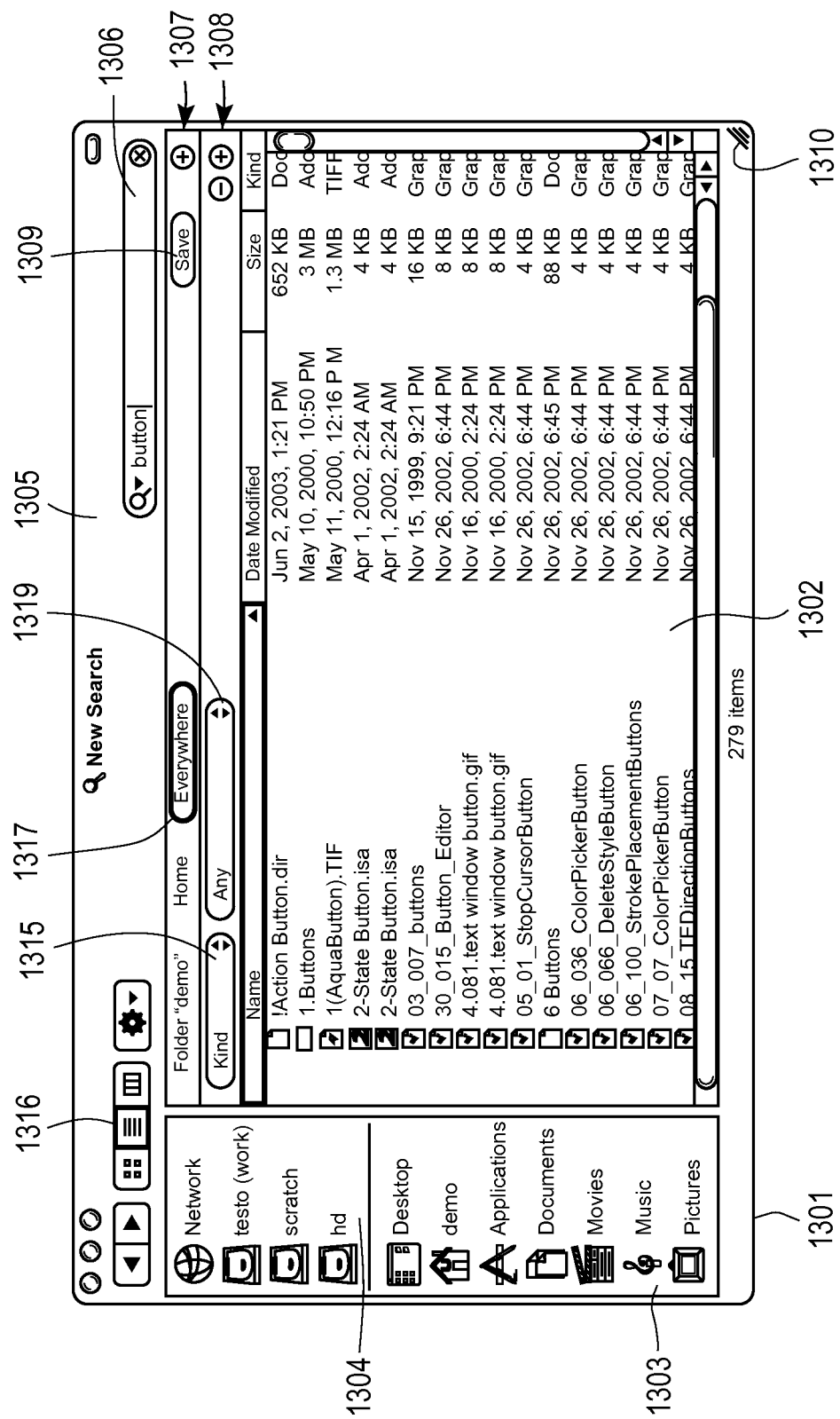
FIGS. 13A and 13B show further alternative embodiments of user interfaces according to the present invention.
Figure 13B:
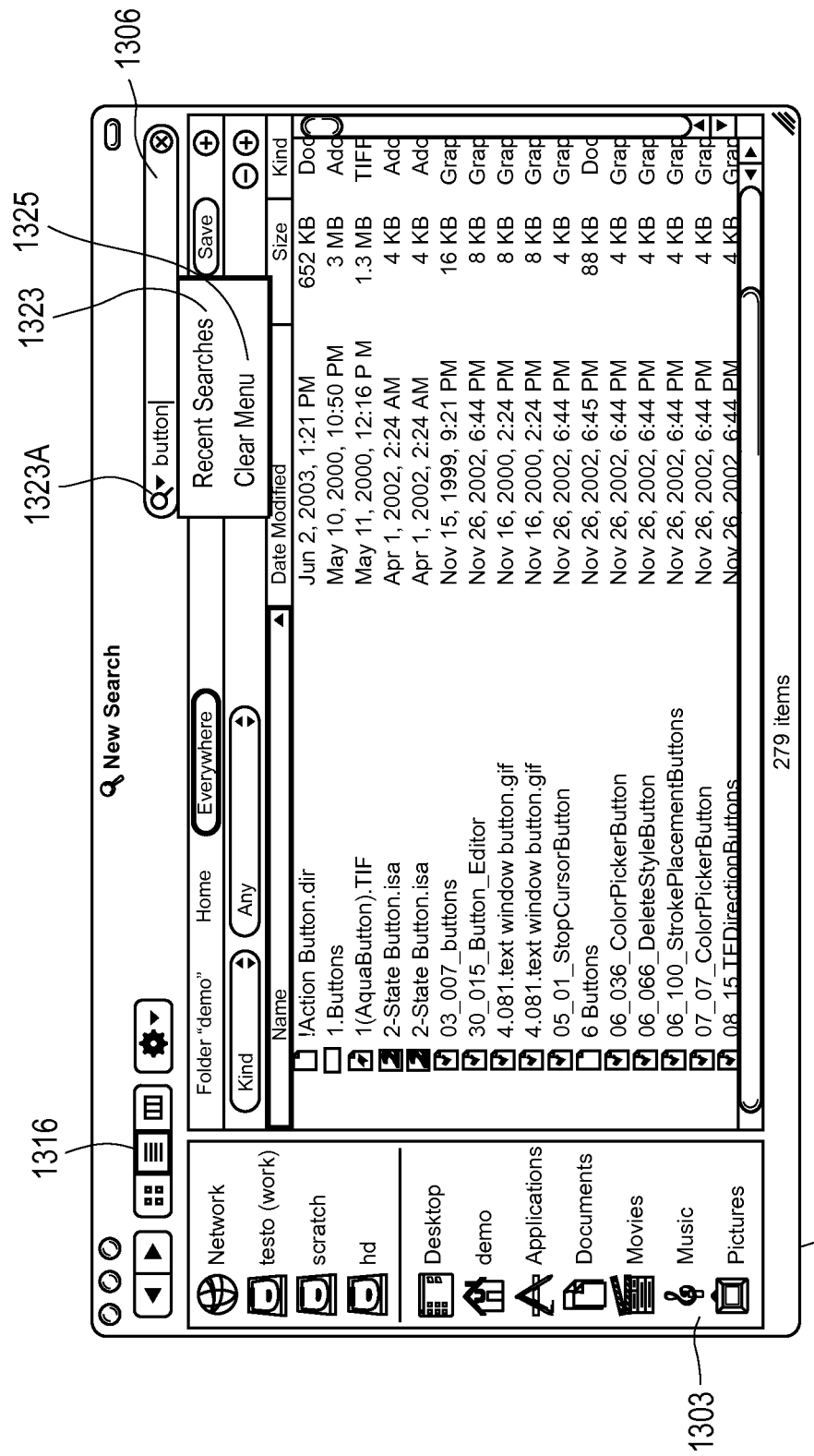

FIG. 13A shows another embodiment of a window 1301 which displays search results within a display region 1302. The window 1301 may be a closeable, minimizeable, resizeable, and moveable window having a resizing control 1310, a title bar 1305 which may be used to move the window, a text entry region 1306 and a user configurable portion 1303, and a system specified portion 1304. The window 1301 further includes buttons for selecting various views, including an icon view, a list view, and a column view. Currently, the list view button 1316 has been selected, causing the display of the search results in a list view manner within the display region 1302. It can be seen that the text ("button") has been entered into the text entry region 1306 and this has caused the system to respond with the search results shown in the display region 1302. The user has specified a search in every location by selecting "everywhere" button 1317. Further, the user has searched for any kind of document by selecting the "kind" option from the pull down menu 1315 and by selecting the "any" option in the pull down menu 1319. The where or location slice 1307 includes a "+" button which may be used to add further search parameters, and similarly, the slice 1308 includes a "+" and a "−" button for adding or deleting search parameters, respectively. The slice 1307 further includes a "save" button 1309 which causes the current search query to be saved in the form of a folder which is added to the user configurable portion 1303 for use later. This is described further below and may be referred to as a "smart folder." The search input user interface shown in FIGS. 13A and 13B is available within, in certain embodiments, each and every window controlled by a graphical user interface file management system, such as a Finder program which runs on the Macintosh or Windows Explorer which runs on Microsoft Windows. This interface includes the text entry region 1306 as well as the slices 1307 and 1308.

The window 1301 shown in FIG. 13B shows the activation of a menu by selecting the search button 1323A, causing a display of a menu having two entries 1323 and 1325. Entry 1323 displays recently performed searches so that a user may merely recall a prior search by selecting the prior search and cause the prior search to be run again. The menu selection 1325 allows the user to clear the list of recent searches in the menu.

Figure 14A:
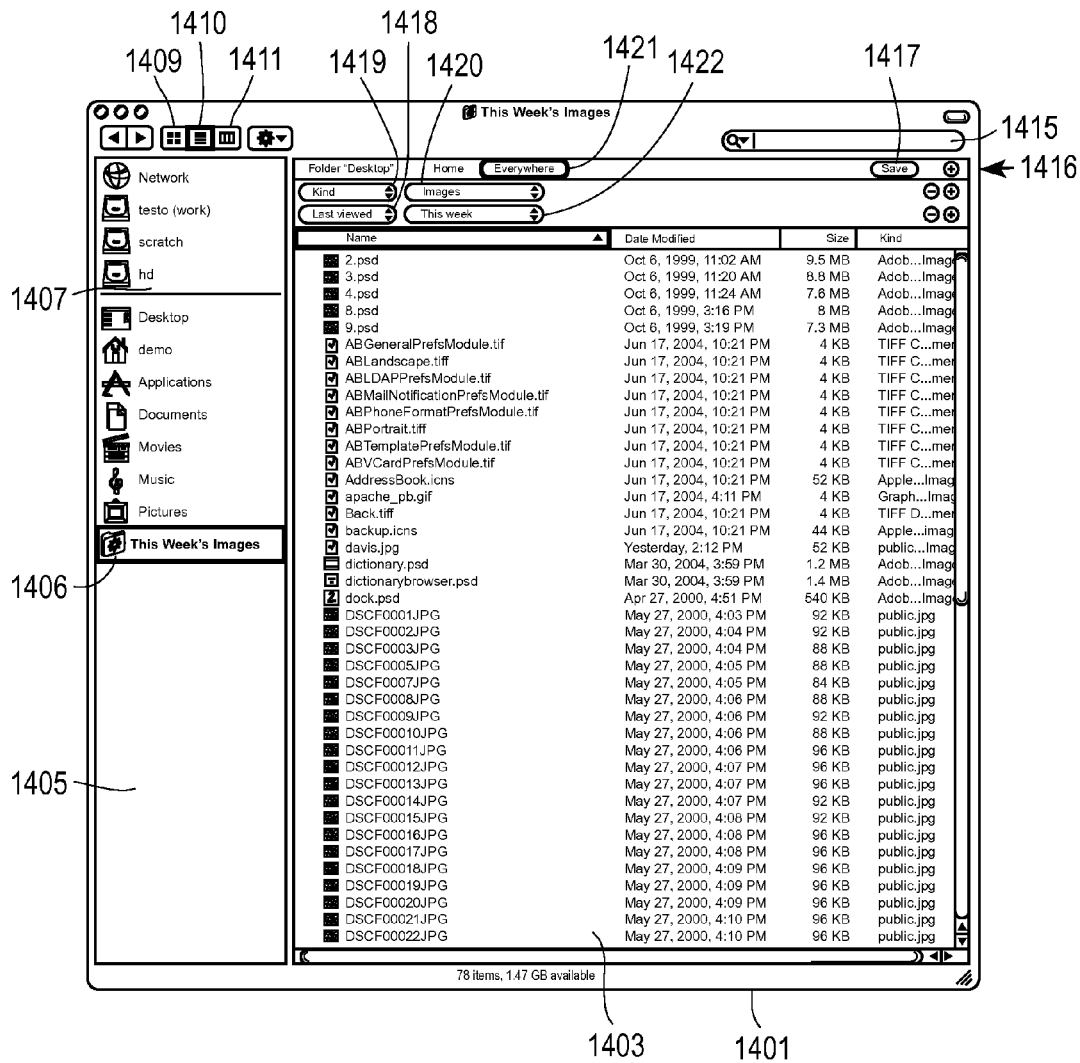
FIGS. 14A, 14B, 14C, and 14D show further alternative embodiments of user interfaces according to the present invention.
Figure 14B:
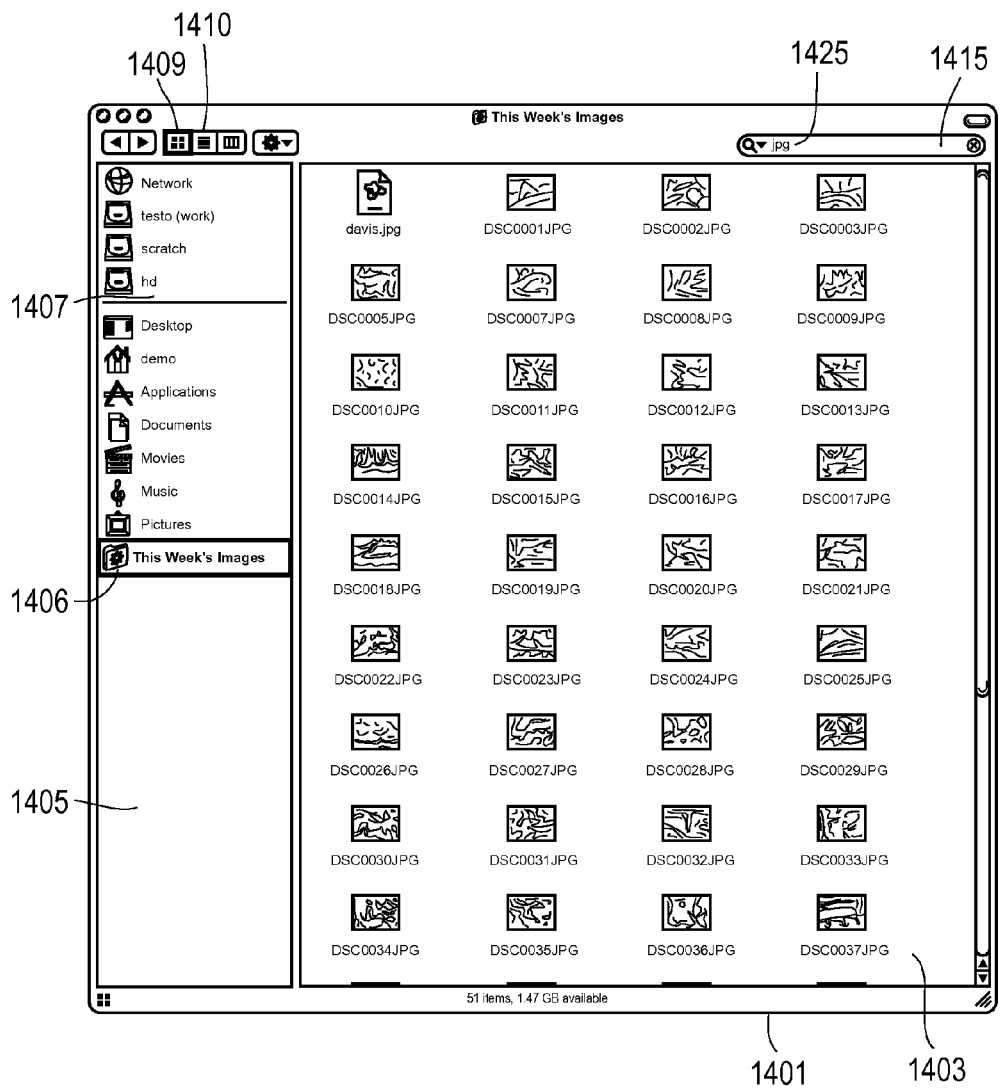
Figure 14C:
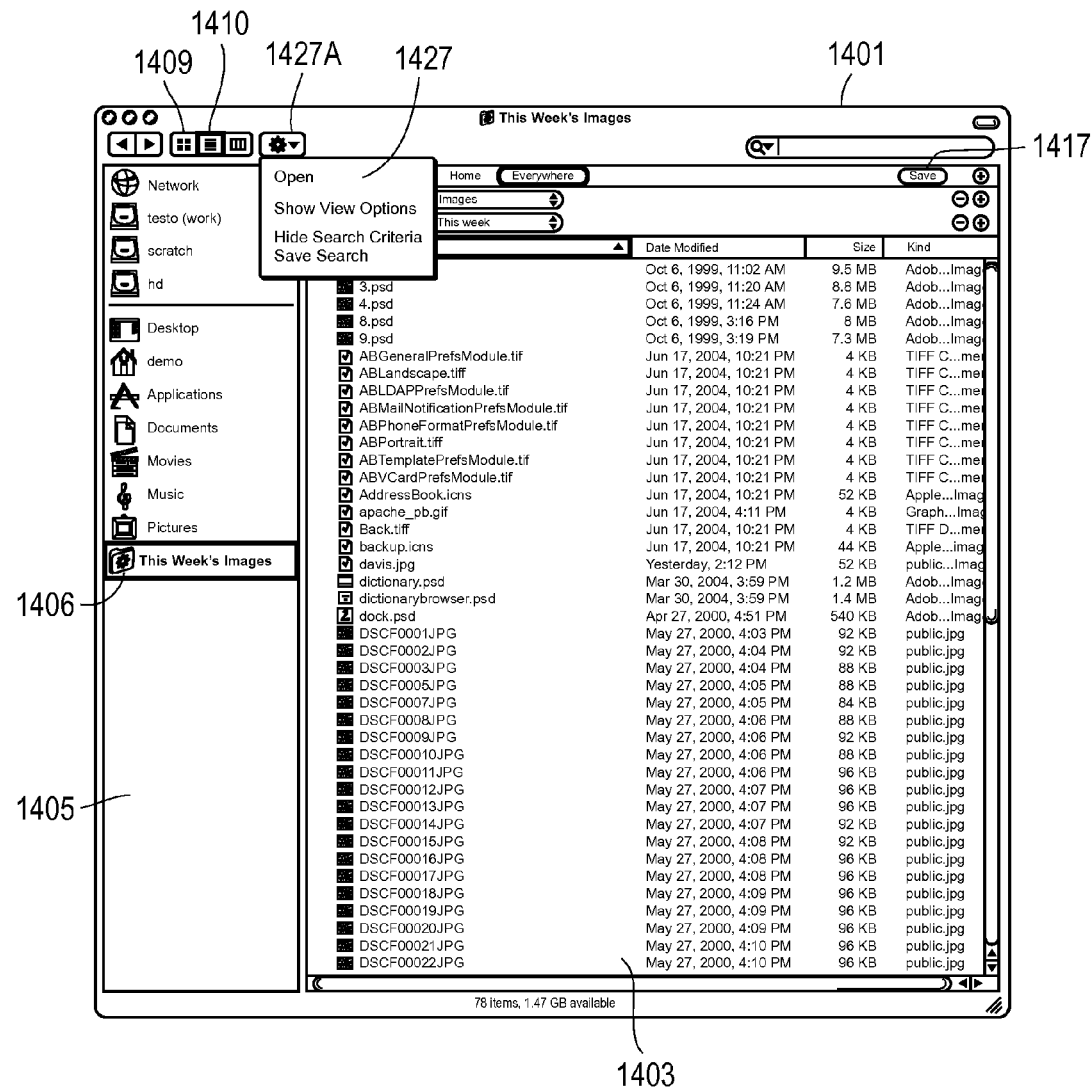

FIGS. 14A, 14B, and 14C show examples of another window in a graphical user interface file system, such as the Finder which runs on the Macintosh operating system. These windows show the results of a particular search and also the ability to save and use a smart folder which saves a prior search. The window 1401 shown in FIG. 14A includes a display region 1403, a user configurable region 1405, a smart folder 1406, a system specified region 1407, an icon view button 1409, a list view button 1410, and a column view button 1411. The window 1401 also includes a text entry region 1415 and a location slice 1416 which may be used to specify the location for the search, which slice also includes a save button 1417. Additional slices below the slice 1416 allow the user to specify further details with respect to the search, in this case specifying types of documents which are images which were last viewed this week. The user has set the search parameters in this manner by selecting the "kind" option from the pull down menu 1419 and by selecting the "images" type from the pull down menu 1420 and by selecting the "last viewed" option from pull down menu 1418 and by selecting "this week" from the pull down menu 1422. The user has also selected "everywhere" by selecting the button 1421 so that the search will be performed on all disks and storage devices connected to this system. The results are shown within the display region 1403. The user can then save the search query by selecting the "save" button 1417 and may name the saved search query as "this week's images" to produce the smart folder 1406 as shown in the user configurable portion 1405. This allows the user to repeat this search at a later time by merely selecting the smart folder 1406 which causes the system to perform a new search again, and all data which matches the search criteria will be displayed within the display region 1403. Thus, after several weeks, a repeating of this search by selecting the smart folder 1406 will produce an entirely different list if none of the files displayed in the display region 1403 of FIG. 14A are viewed in the last week from the time in which the next search is performed by selecting the smart folder 1406.

FIG. 14B shows a way in which a user may sort or further search within the search results specified by a saved search, such as a smart folder. In the case of FIG. 14B, the user has selected the smart folder 1406 and has then entered text "jpg" 1425 in the text entry region 1415. This has caused the system to filter or further limit the search results obtained from the search query saved as the smart folder 1406. Thus, PhotoShop files and other files such as TIF files and GIF files are excluded from the search results displayed within the display region 1403 of FIG. 14B because the user has excluded those files by adding an additional search criteria specified by the text 1425 in the text entry region 1415. It can be seen that the "jpg" text entry is ANDed logically with the other search parameters to achieve the search results displayed in the display region 1403. It can also be seen that the user has selected the icon view by selecting the icon view button 1409. Thus, it is possible for a user to save a search query and use it later and to further limit the results of the search query by performing a search on the results of the search query to further limit the search results.

FIG. 14C shows the window 1401 and shows the search results displayed within the display region 1403, where the results are based upon the saved search specified by the smart folder 1406. The user has caused a pull down menu 1427 to appear by selecting the pull down region 1427A. The pull down region 1427 includes several options which a user may select. These options include hiding the search criteria or saving the search (which is similar to selecting the button 1417) or showing view options or opening the selected file. This allows the user, for example, to hide the search criteria, thereby causing the slice 1416 and the other search parameters to be removed from the window 1401 which is a moveable, resizeable, minimizeable, and closeable window.

Figure 14D:
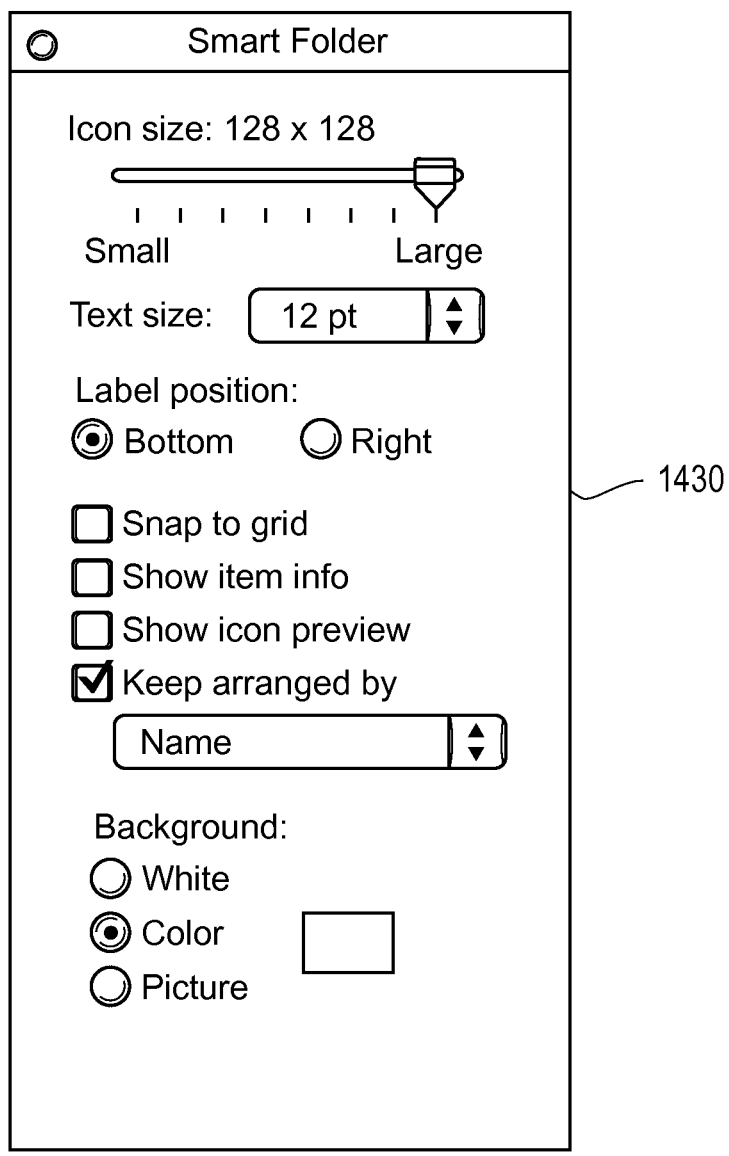

FIG. 14D shows an example of a user interface which allows the user to specify the appearance of a smart folder, such as the smart folder 1406.

Figure 15A:
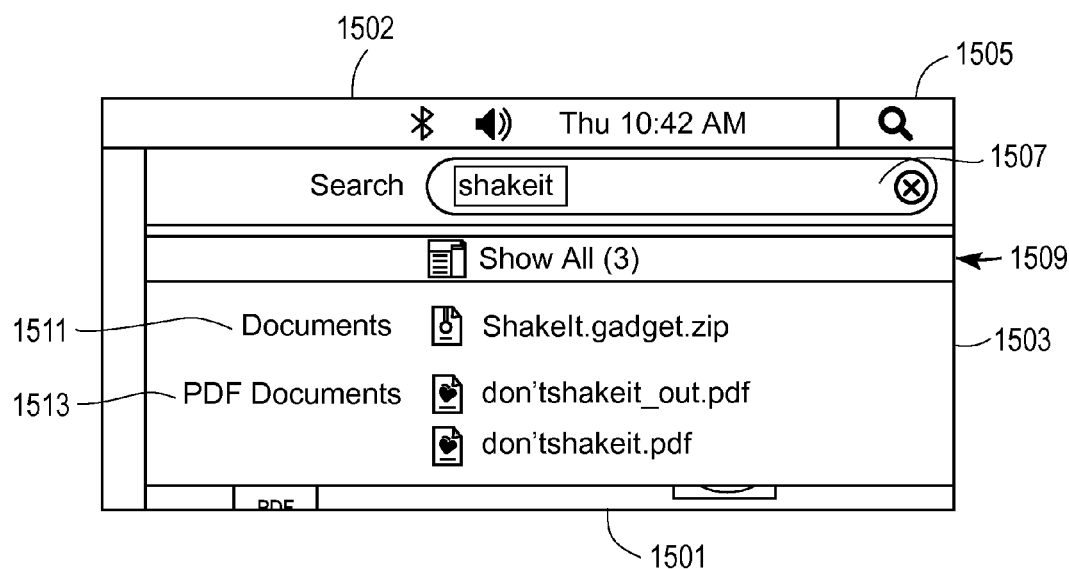
FIGS. 15A, 15B, 15C and 15D show another alternative embodiment of user interfaces according to the present invention.
Figure 15B:
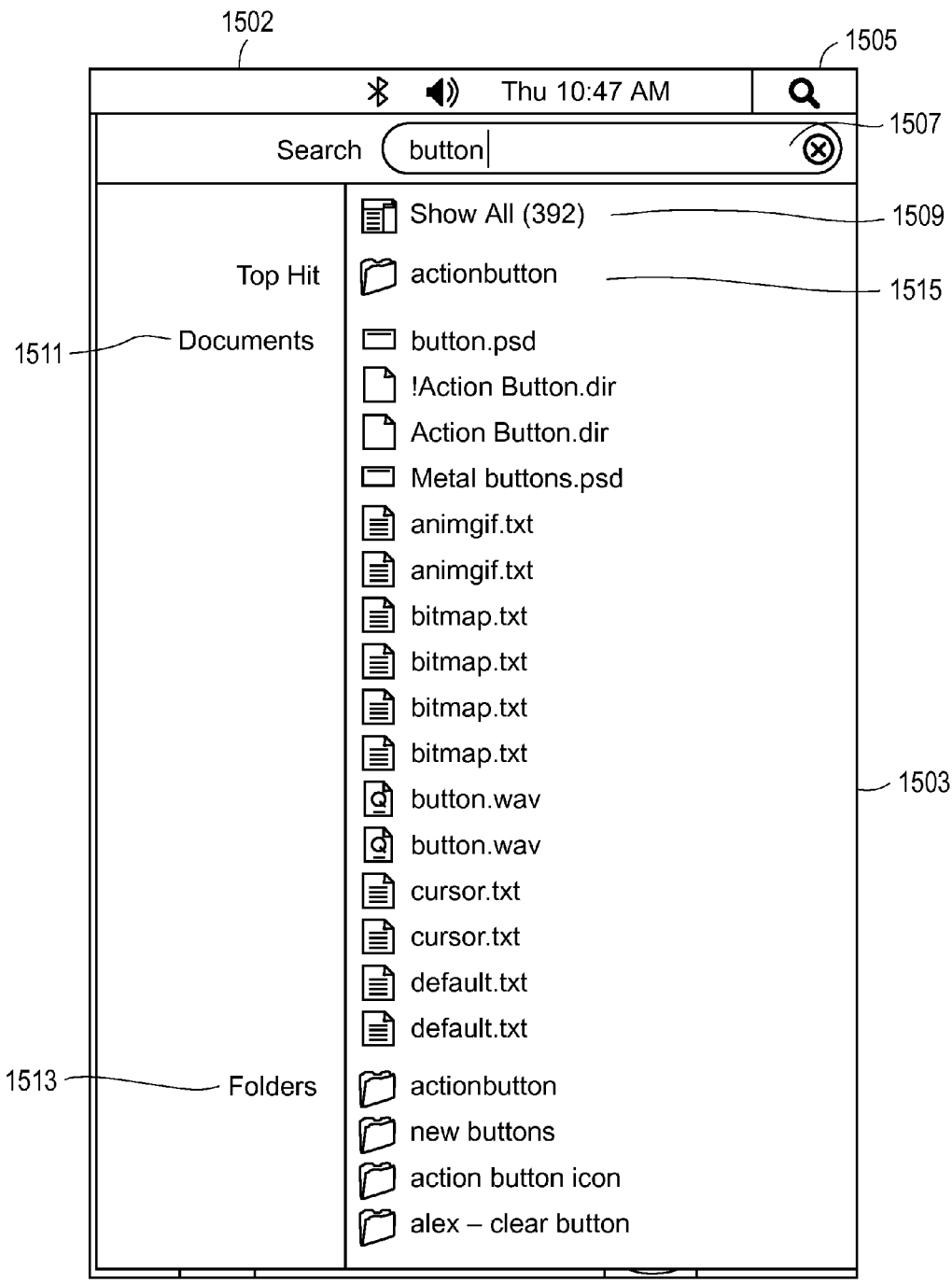
Figure 15C:
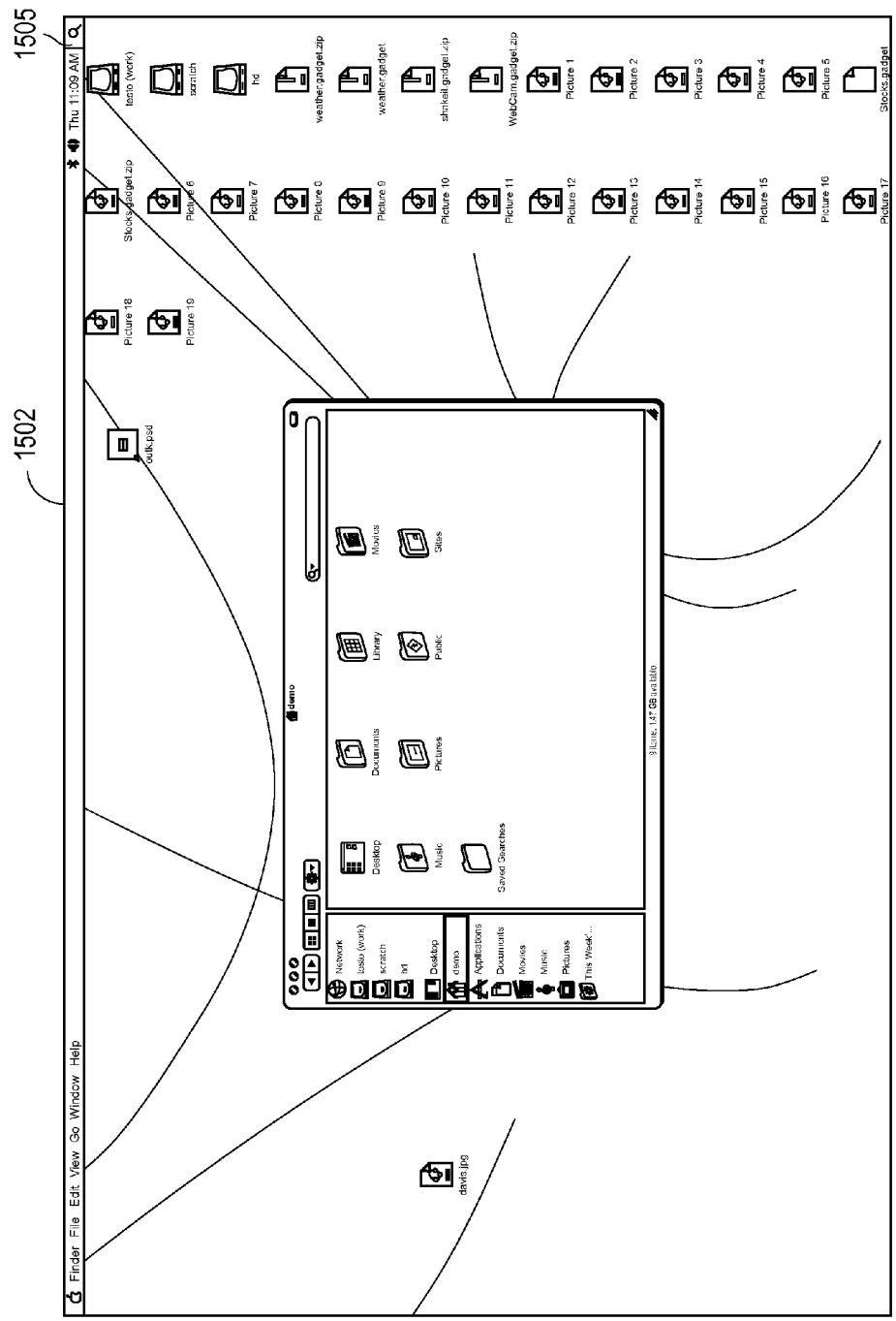
Figure 15D:
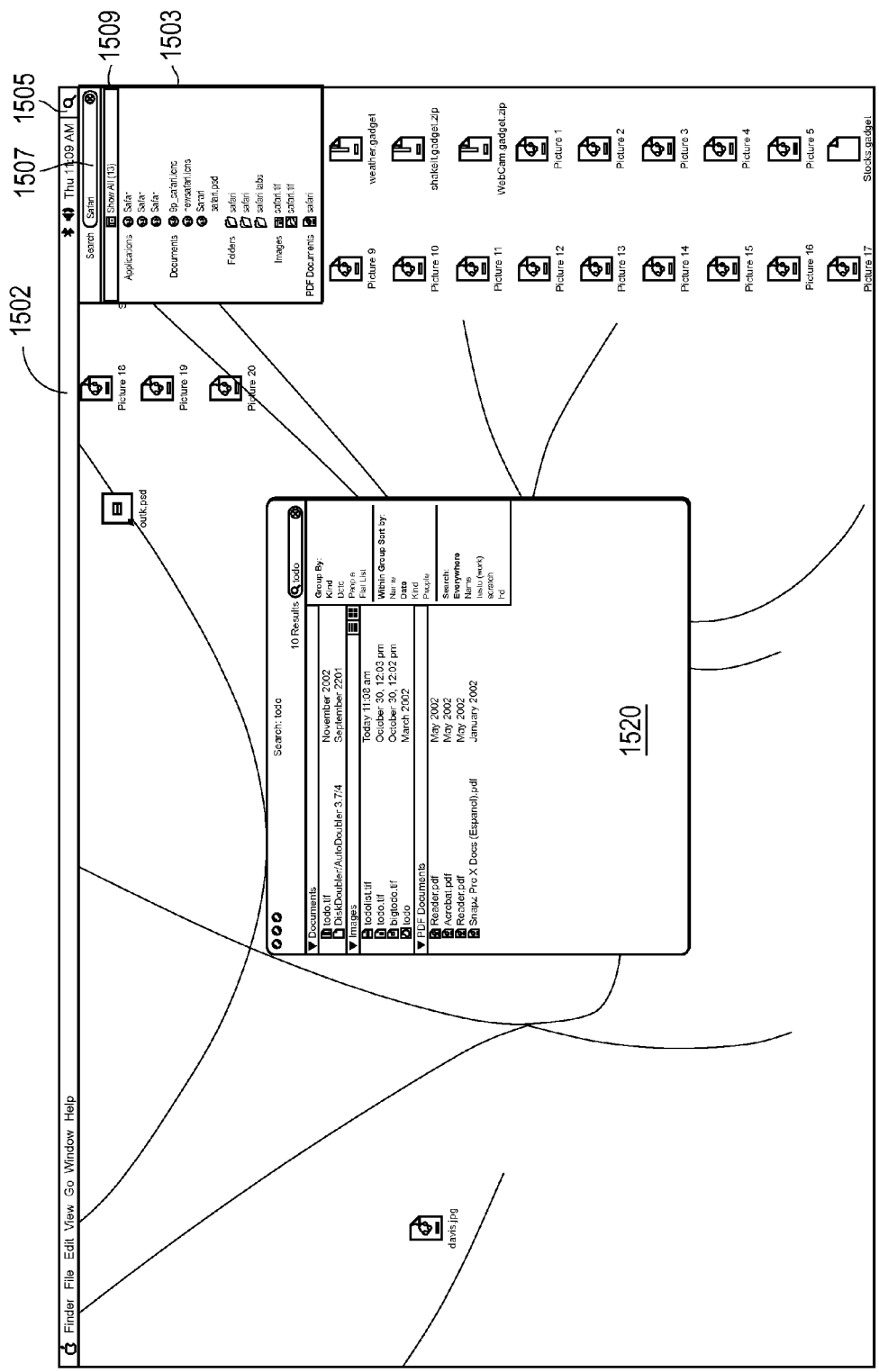

FIGS. 15A, 15B, 15C, and 15D show an example of a system wide search input user interface and search result user interface. In one particular exemplary embodiment, these user interfaces are available on the entire system for all applications which run on the system and all files and metadata, and even address book entries within an address book program, such as a personal information manager, and calendar entries within a calendar program, and emails within an email program, etc. In one exemplary embodiment, the system begins performing the search and begins displaying the results of the search as the user types text into a text entry field, such as the text entry field 1507. The search results are organized by categories and are displayed as a short list which is intentionally abbreviated in order to present only a selected number of the most relevant (scored) matches or hits to the search query. The user can ask for the display of all the hits by selecting a command, such as the "show all" command 1509. FIG. 15A shows a portion of a display controlled by a data processing system. This portion includes a menu bar 1502 which has at its far end a search menu command 1505. The user can select the search menu command by positioning a cursor, using a mouse, for example, over the search menu command 1505 and by pressing a button or by otherwise activating or selecting a command. This causes a display of a text entry region 1507 into which a user can enter text. In the example shown in FIG. 15A, which is a portion of the display, the user has entered the text "shakeit" causing the display of a search result region immediately below a "show all" command region 1509 which is itself immediately below the text entry region 1507. It can be seen that the hits or matches are grouped into categories ("documents" and "PDF documents") shown by categories 1511 and 1513 within the search result region 1503. FIG. 15B shows another example of a search. In this case, a large number of hits was obtained (392 hits), only a few of which are shown in the search result region 1503. Again, the hits are organized by categories 1511 and 1513. Each category may be restricted in terms of the number of items displayed within the search result region 1503 in order to permit the display of multiple categories at the same time within the search result region. For example, the number of hits in the documents category may greatly exceed the available display space within the search result region 1503, but the hits for this category are limited to a predetermined or dynamically determinable number of entries within the search result region 1503 for the category 1511. An additional category, "top hit" is selected based on a scoring or relevancy using techniques which are known in the art. The user may select the "show all" command 1509 causing the display of a window, such as window 1601 shown in FIG. 16A. FIG. 15C shows a display of a graphical user interface of one embodiment of the invention which includes the menu bar 1502 and the search menu command 1505 on the menu bar 1502. FIG. 15D shows another example of the search result region 1503 which appeared after a search of the term "safari" was entered into the text entry region 1507. It can be seen from the search result region 1503 of FIG. 15D that the search results are again grouped into categories. Another search result window 1520 is also shown in the user interface of FIG. 15D. It can be seen that application programs are retrieved as part of the search results, and a user may launch any one of these application programs by selecting it from the search result region, thereby causing the program to be launched.

Figure 16A:
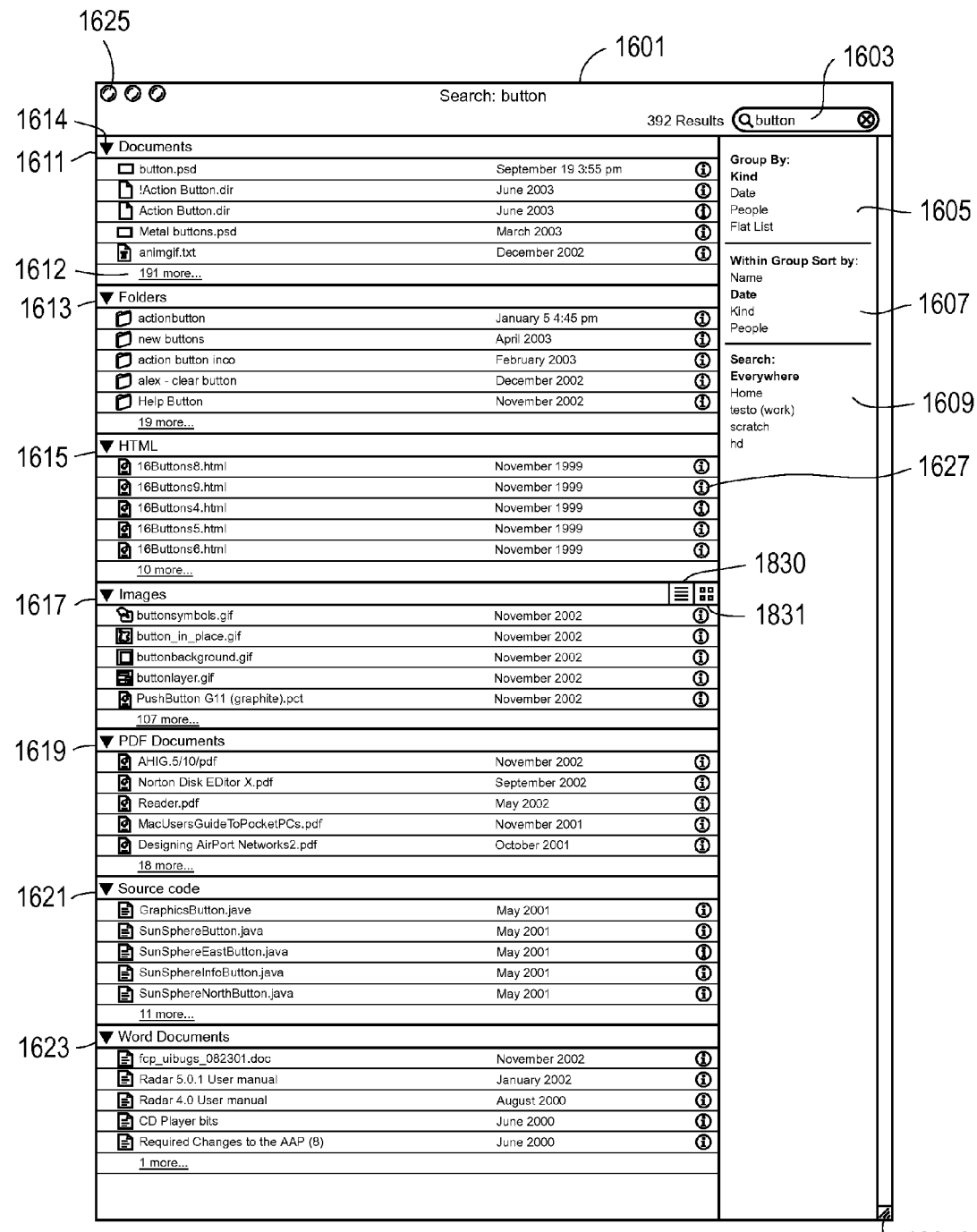
FIGS. 16A and 16B show certain aspects of embodiments of user interfaces according to the present invention.
Figure 16B:
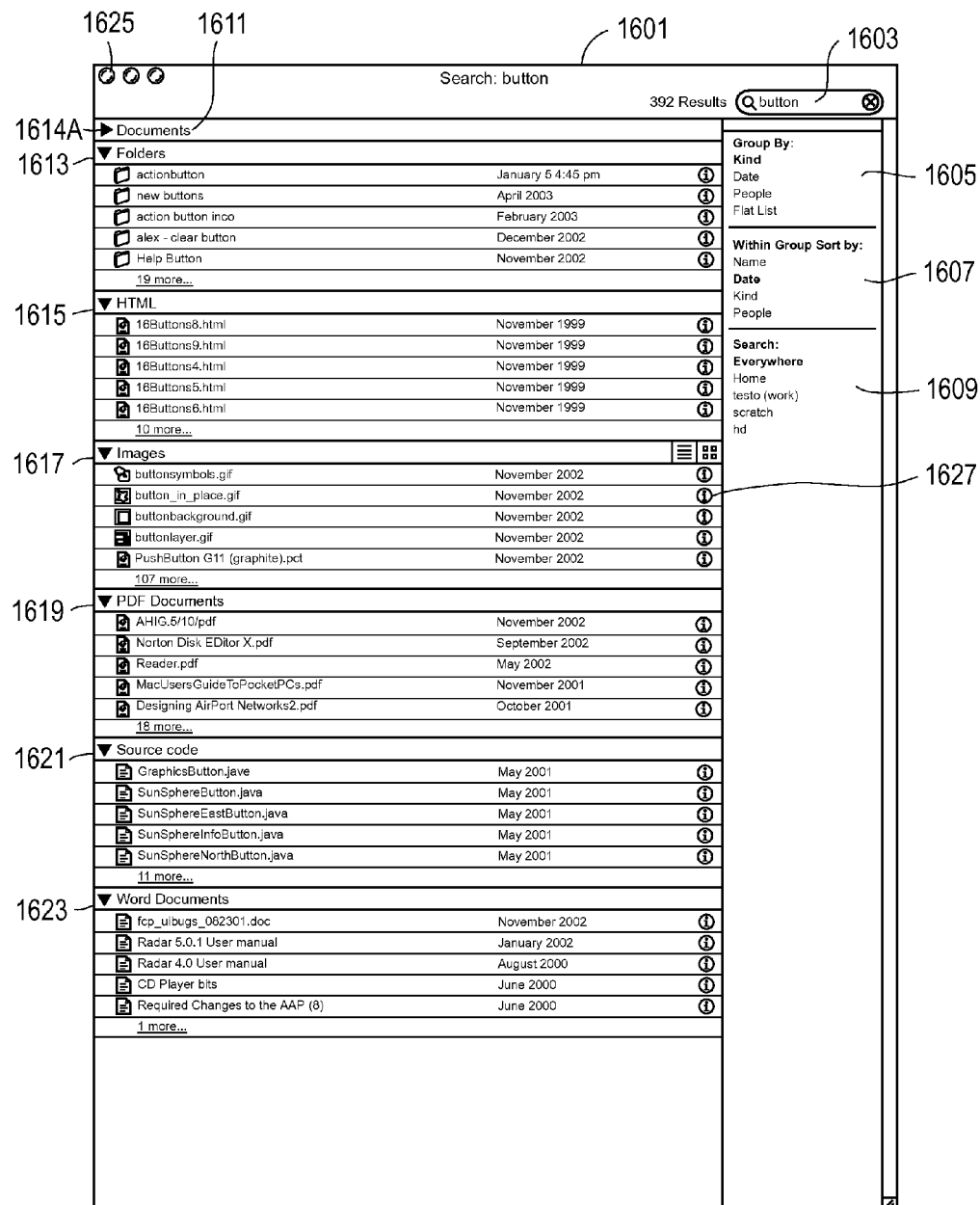
Figure 17:
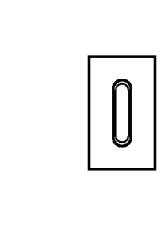
FIG. 17 shows an aspect of certain embodiments of user interfaces according to the present invention.

FIGS. 16A and 16B show examples of search result windows which may be caused to appear by selecting the "show all" command 1509 in FIG. 15A or 15B. Alternatively, these windows may appear as a result of the user having selected a "find" command or a some other command indicating that a search is desired. Moreover, the window 1601 shown in FIGS. 16A and 16B may appear in response to either of the selection of a show all command or the selection of a find command. The window 1601 includes a text entry region 1603, a group by menu selection region 1605, a sort by menu selection region 1607, and a where menu selection region 1609. The group by selection region 1605 allows a user to specify the manner in which the items in the search results are grouped. In the example shown in FIG. 16A, the user has selected the "kind" option from the group by menu selection region 1605, causing the search results to be grouped or sorted according to the kind or type of document or file. It can be seen that the type of file includes "html" files, image files, PDF files, source code files, and other types of files as shown in FIG. 16A. Each type or kind of document is separated from the other documents by being grouped within a section and separated by headers from the other sections. Thus, headers 1611, 1613, 1615, 1617, 1619, 1621, and 1623 designate each of the groups and separate one group from the other groups. This allows a user to focus on evaluating the search results according to certain types of documents. Within each group, such as the document groups or the folder groups, the user has specified that the items are to be sorted by date, because the user has selected the date option within the sort by menu region 1607. The user has also specified that all storage locations are to be searched by selecting "everywhere" from the where menu selection region 1609. Each item in the search result list includes an information button 1627, which may be selected to produce the display of additional information, which may be available from the system. An example of such additional information is shown in FIG. 17 in which a user has selected the information button 1627 for item 1635, resulting in the display of an image 1636 corresponding to the item as well as additional information 1637. Similarly, the user has selected the information button for another item 1630 to produce the display of an image of the item 1631 as well as additional information 1632. The user may remove this additional information from the display by selecting the close button 1628 which causes the display of the information for item 1635 to revert to the appearance for that item shown in FIG. 16A. The user may collapse an entire group to hide the entries or search results from that group by selecting the collapse button 1614 shown in FIG. 16A, thereby causing the disappearance of the entries in this group as shown in FIG. 16B. The user may cause these items to reappear by selecting the expand button 1614A as shown in FIG. 16B to thereby revert to the display of the items as shown in FIG. 16A.

The search results user interface shown in FIGS. 16A and 16B presents only a limited number of matches or hits within each category. In the particular example of these figures, only the five top (most relevant or most highly sorted) hits are displayed. This can be seen by noticing the entry at the bottom of each list within a group which specifies how many more hits are within that group; these hits can be examined by selecting this indicator, such as indicator 1612, which causes the display of all of the items in the documents category or kind for the search for "button" which was entered into the text entry region 1603. Further examples of this behavior are described below and are shown in conjunction with FIGS. 18A and 18B. It will be appreciated that window 1601 is a closeable and resizable and moveable window and includes a close button and a resizing control 1625A.

Figure 18A:
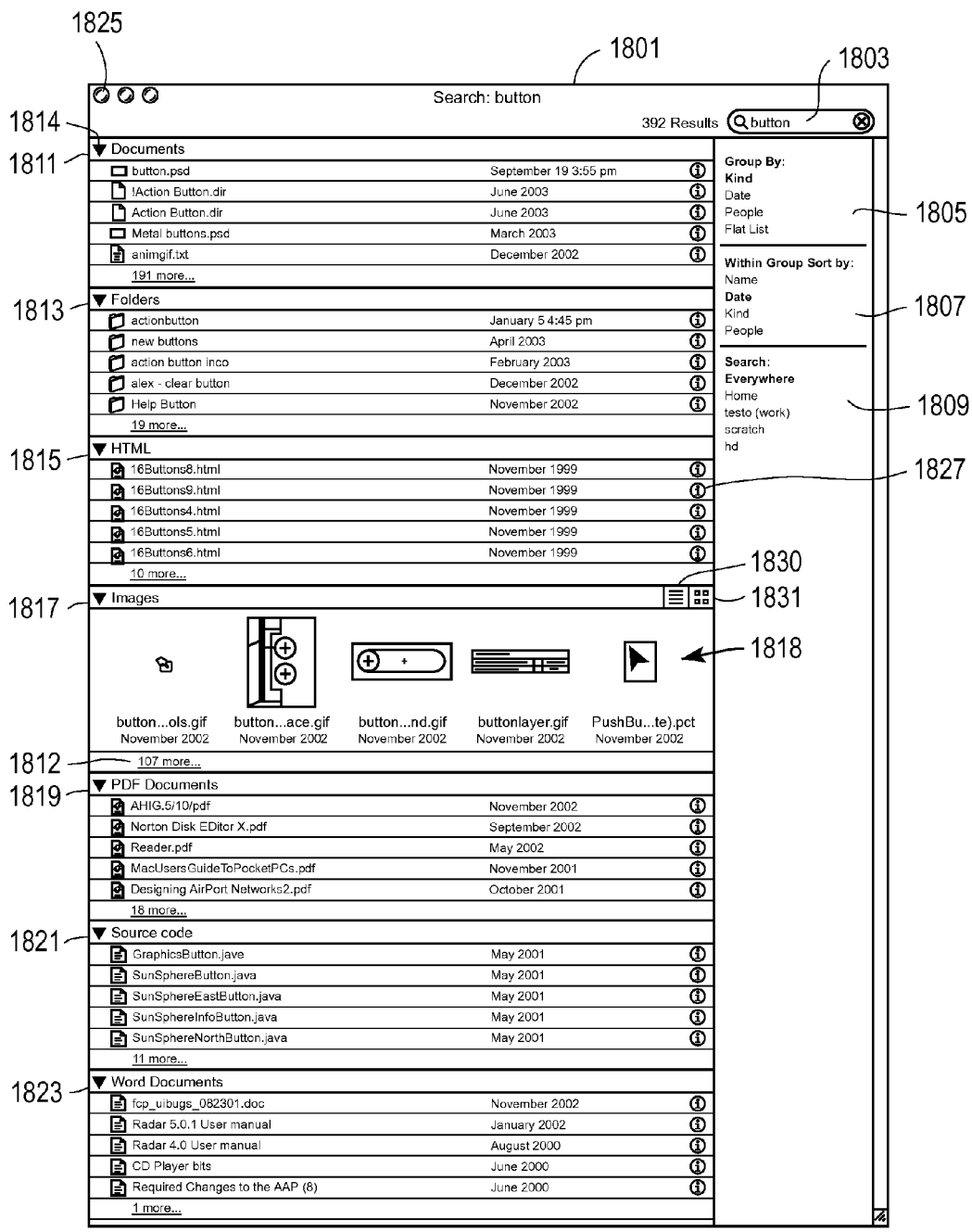
FIGS. 18A and 18B show further aspects of certain embodiments of user interfaces according to the present invention.
Figure 18B:
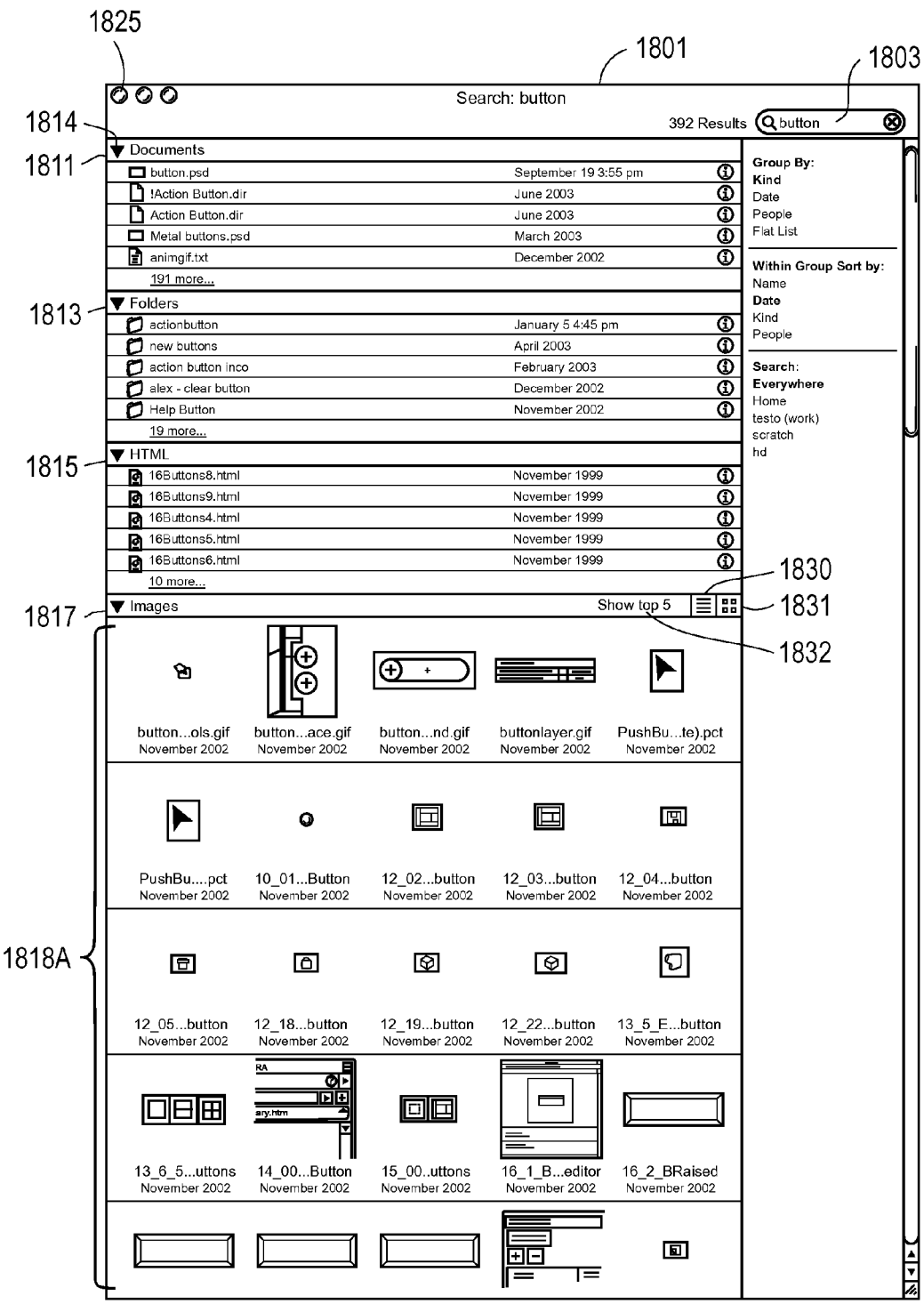

FIGS. 18A and 18B illustrate another window 1801 which is very similar to the window 1601. The window 1801 includes a text entry region 1803, a group by menu selection region 1805, a sort by menu selection region 1807, and a where menu selection region 1809, each of which function in a manner which is similar to the regions 1605, 1607, and 1609 respectively of FIG. 16A. Each item in a list view within the window 1801 includes an information button 1827, allowing a user to obtain additional information beyond that listed for each item shown in the window 1801. The window 1801 further includes headers 1811, 1813, 1815, 1817, 1819, 1821, and 1823 which separate each group of items, grouped by the type or kind of document, and sorted within each group by date, from the other groups. A collapse button 1814 is available for each of the headers. The embodiment shown in FIGS. 18A and 18B shows the ability to switch between several modes of viewing the information. For example, the user may display all of the hits within a particular group by selecting the indicator 1812 shown in FIG. 18A which results in the display of all of the images files within the window 1801 within the region 1818A. The window is scrollable, thereby allowing the user to scroll through all the images. The user can revert back to the listing of only five of the most relevant images by selecting the "show top 5" button 1832 shown in FIG. 18B. Further, the user can select between a list view or an icon view for the images portion shown in FIGS. 18A and 18B. The user may select the list view by selecting the list view button 1830 or may select the icon view by selecting the icon view button 1831. The list view for the images group is shown in FIG. 16A and the icon view for the images group is shown in FIGS. 18A and 18B. It can be seen that within a single, moveable, resizable, closeable search result window, that there are two different views (e.g. a list view and an icon view) which are concurrently shown within the window. For example, the PDF documents under the header 1819 are displayed in a list view while the images under the header 1817 are displayed in an icon view in FIGS. 18A and 18B. It can also be seen from FIGS. 18A and 18B that each image is shown with a preview which may be capable of live resizing as described in a patent application entitled "Live Content Resizing" by inventors Steve Jobs, Steve Lemay, Jessica Kahn, Sarah Wilkin, David Hyatt, Jens Alfke, Wayne Loofbourrow, and Bertrand Serlet, filed on the same date as this application, and being assigned to the assignee of the present inventions described herein, and which is hereby incorporated herein by reference.

Figure 19A:
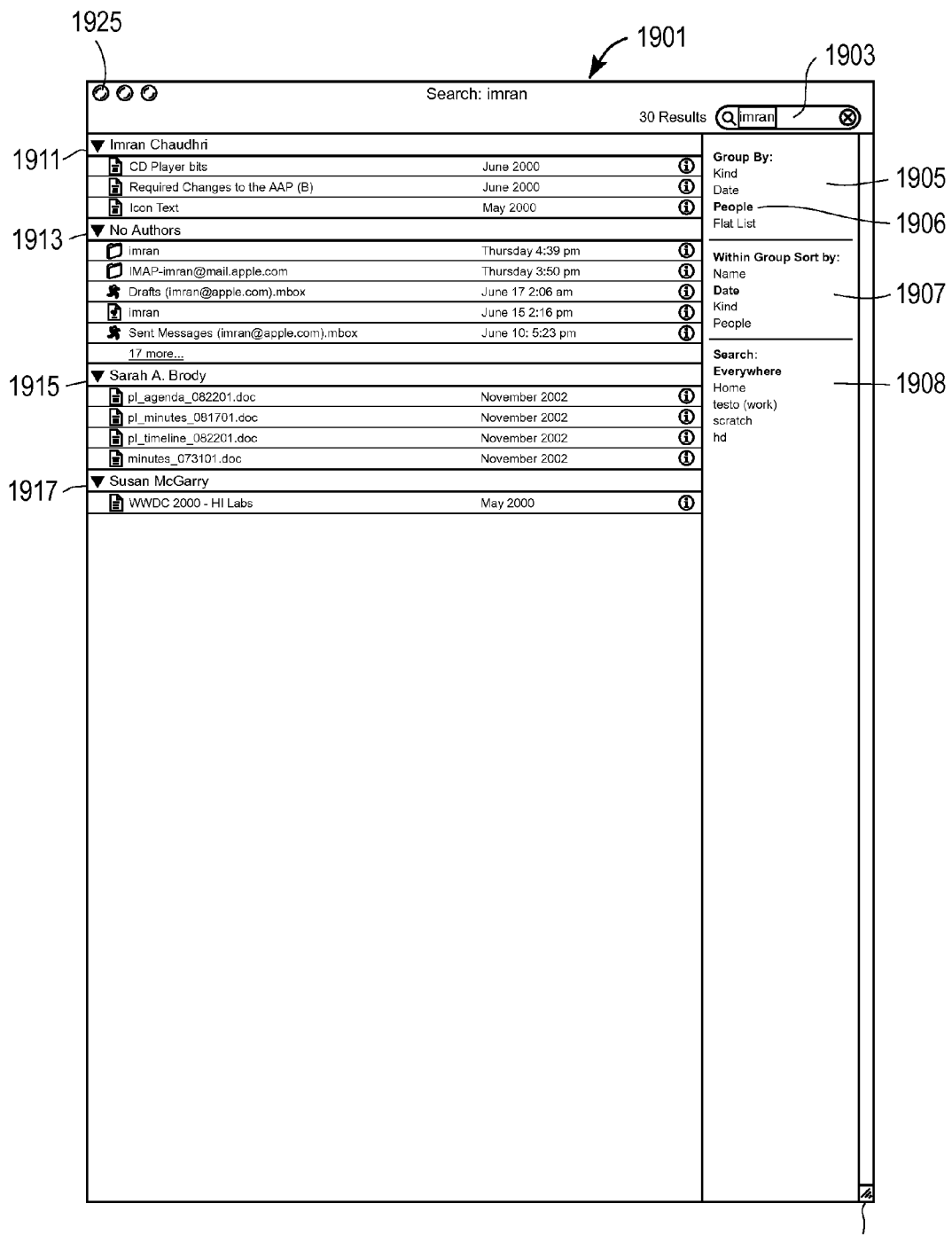
Figure 19B:
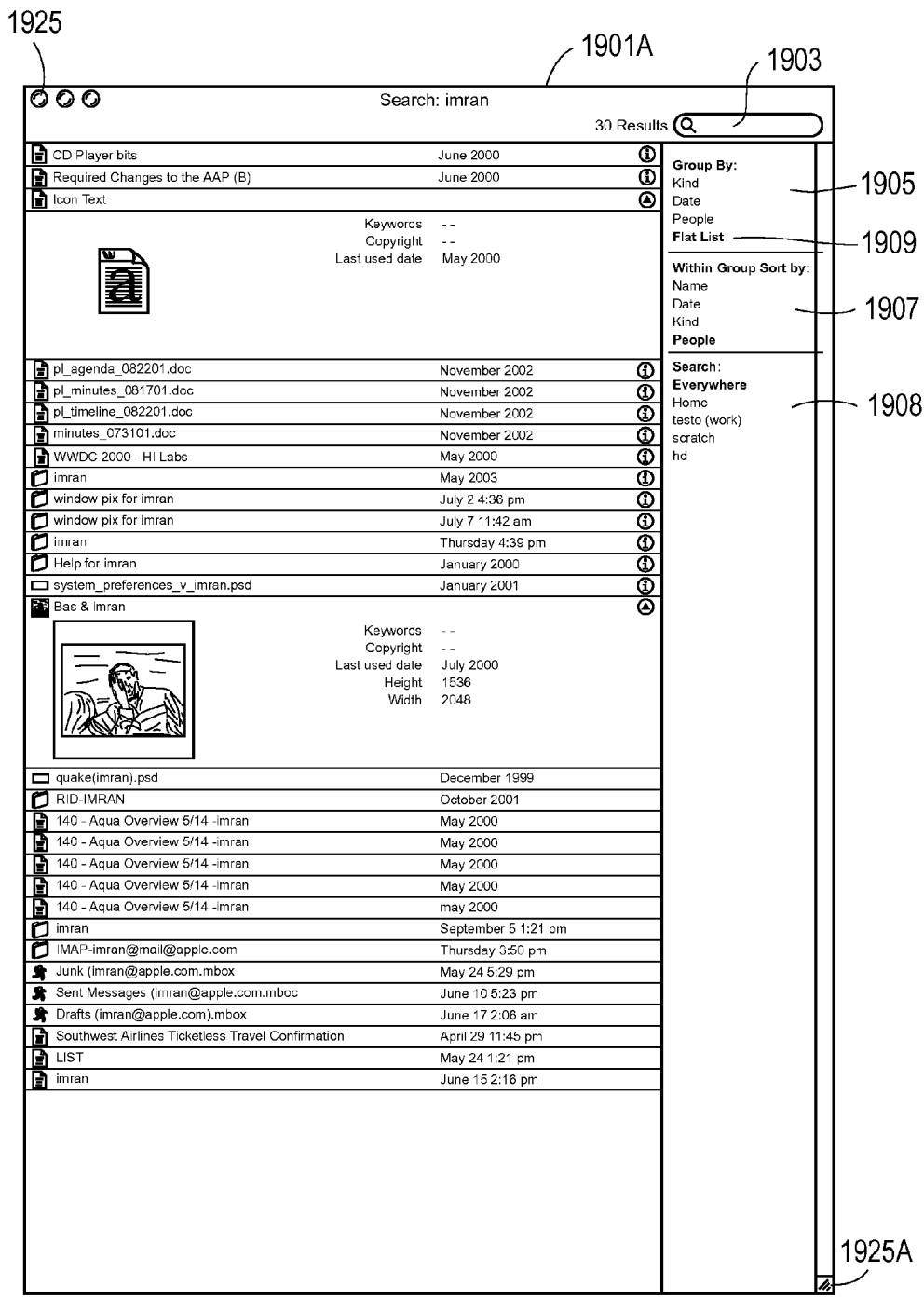

FIG. 19A shows another example of a search result window which is similar to the window 1601. The window 1901 shown in FIG. 19A includes a text entry region 1903 and a group by menu selection region 1905 and a sort by menu selection region 1907 and a where menu selection region 1908. Further, the window includes a close button 1925 and a resizing control 1925A. Text has been entered into the text entry region 1903 to produce the search results shown in the window 1901. The search results again are grouped by a category selected by a user which in this case is the people options 1906. This causes the headers 1911, 1913, 1915, and 1917 to show the separation of the groups according to names of people. Within each group, the user has selected to sort by the date of the particular file or document. The user interface shown in FIG. 19A allows a user to specify an individual's name and to group by people to look for communications between two people, for example. FIG. 19B shows another way in which a user can group a text search ("imran") in a manner which is different from that shown in FIG. 19A. In the case of FIG. 19B, the user has selected a flat list from the group by menu selection region 1905 and has selected "people" from the sort by menu region 1907. The resulting display in window 1901A is without headers and thus it appears as a flat list.

Figure 19C:
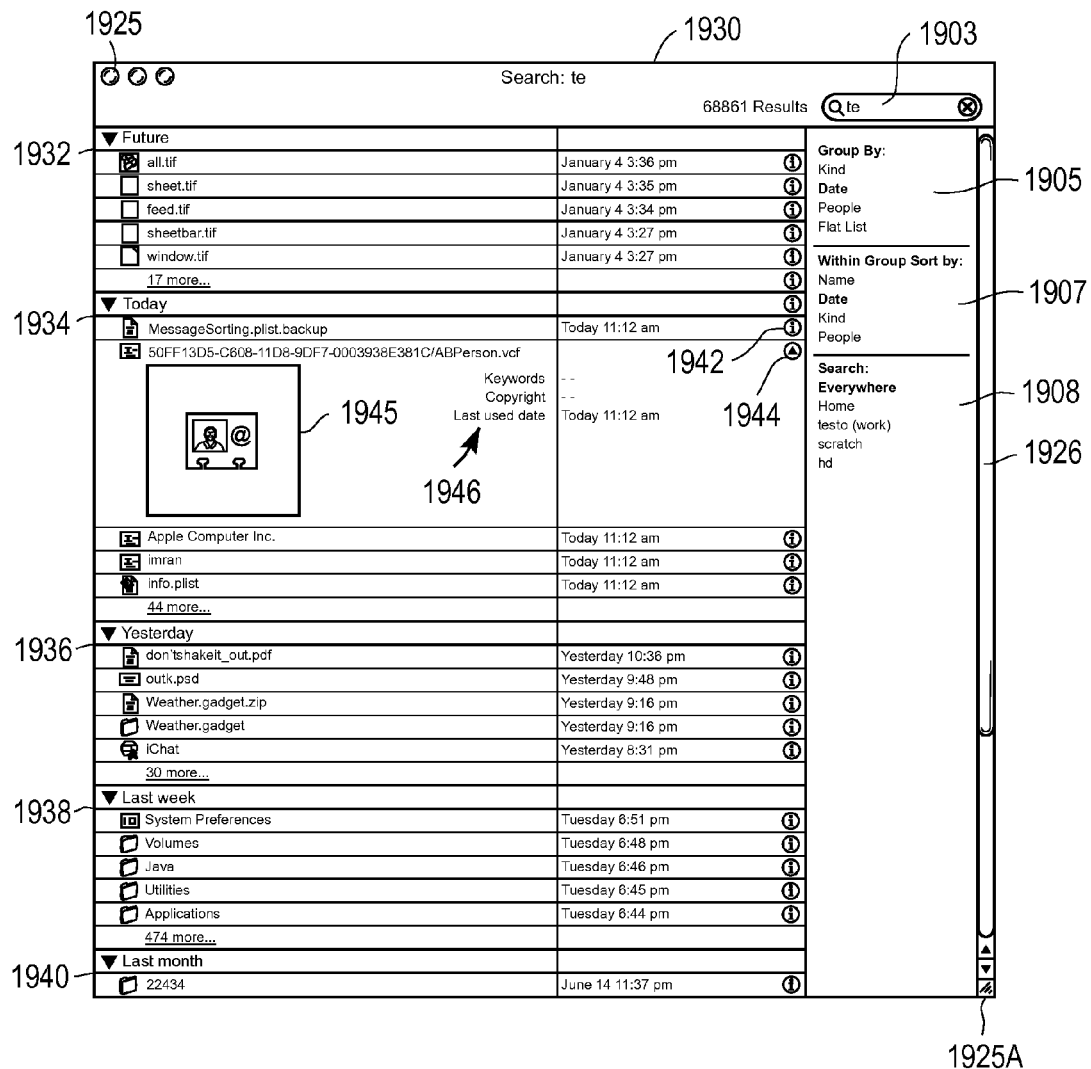

FIG. 19C shows the user interface of another search result window 1930 which includes a text entry region 1903 and the selection regions 1905, 1907, and 1908 along with a scrolling control 1926. The results shown in the window 1930 have been grouped by date and sorted within each group by date. Thus, the headers 1932, 1934, 1936, 1938, and 1940 specify time periods such as when the document was last modified (e.g. last modified today, or yesterday, or last week). Also shown within the search results window 1930 is the information button 1942 which may be selected to reveal further information, such as an icon 1945 and additional information 1946 as shown for one entry under the today group. This additional information may be removed by selecting the contraction button 1944.

Figure 19D:
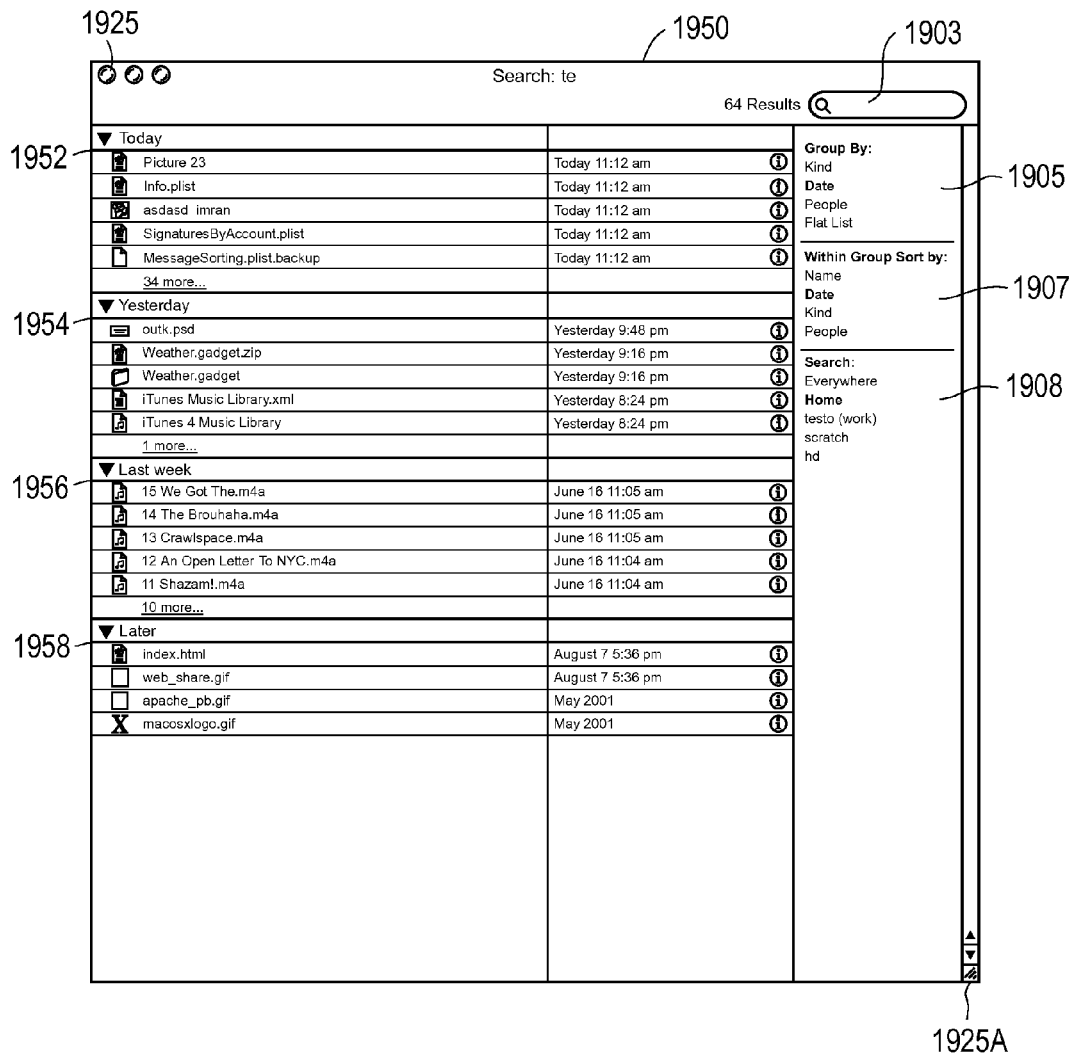

FIG. 19D shows a search result window 1950 in which a search for the text string "te" is grouped by date but the search was limited to a "home" folder as specified in the where menu selection region 1908. Time specific headers 1952, 1954, 1956, and 1958 separate items within one group from the other groups as shown in FIG. 19D.

FIG. 19E shows an alternative embodiment of a search result window. In this embodiment, the window 1970 includes elements which are similar to window 1901 such as the selection regions 1905, 1907, and a scrolling control 1926 as well as a close button 1925 and a resizing control 1925A. The search result window 1970 further includes a "when" menu selection region 1972 which allows the user to specify a search parameter based on time in addition to the text entered into the text entry region 1903. It can be seen from the example shown in FIG. 19E that the user has decided to group the search results by the category and to sort within each group by date. This results in the headers 1973, 1975, 1977, and 1979 as shown in FIG. 19E.

Figure 20:
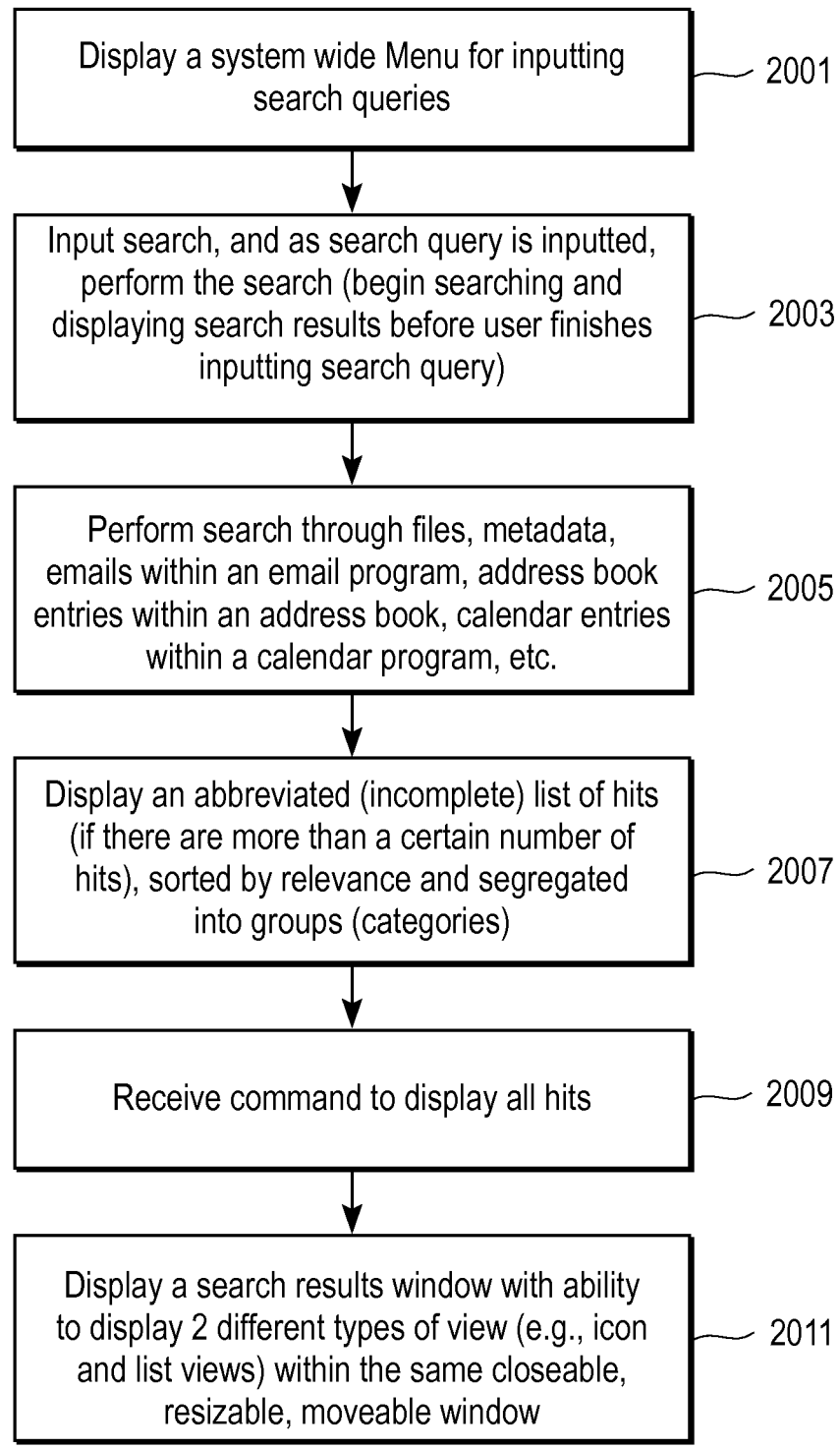
FIG. 20 is a flow chart which illustrates another exemplary method of the present invention.

FIG. 20 shows an exemplary method of operating a system wide menu for inputting search queries, such as the system wide menu available by selecting the search menu command 1505 shown in FIG. 15A or 15B, or 15C. In operation 2001, the system displays a system wide menu for inputting search queries. This may be the search menu command 1505. The user, in operation 2003, inputs a search, and as the search query is being inputted, the system begins performing and begins displaying the search results before the user finishes inputting the search query. This gives immediate feedback and input to the user as the user enters this information. The system is, in operation 2005, performing a search through files, metadata for the files, emails within an email program, address book entries within an address book program, calendar entries within a calendar program, etc. The system then, in operation 2007, displays an abbreviated (e.g. incomplete) list of hits if there are more than a certain number of hits. An example of this abbreviated listing is shown in FIG. 15B. The listing may be sorted by relevance and segregated into groups such as categories or types of documents. Then in operation 2009, the system receives a command from the user to display all the hits and in operation 2011 the system displays the search results window, such as the window 1601 shown in FIG. 16A. This window may have the ability to display two different types of views, such as an icon view and a list view within the same closeable, resizable, and moveable window. It will be appreciated that the searching, which is performed as the user is typing and the displaying of results as the user is typing may include the searching through the metadata files created from metadata extracted from files created by many different types of software programs.

FIGS. 21, and 22A, 22B, 22C, and 22D will now be referred to while describing another aspect of the inventions. This aspect relates to a method of selecting a group of files, such as a group of individual data files. In an exemplary method of this aspect, a data processing system receives a selection of a plurality of items, such as data files, folders (e.g. graphical user interface representations of subdirectories), application programs or a combination of one or more of these items. This selection may be performed by one of the many conventional ways to select a plurality of items such as (a) positioning a cursor at each item individually (e.g. through the movement of a mouse) and indicating a selection individually by, for example, pressing and releasing a button, such as a mouse's button; (b) pointing a cursor at a first item in a list and indicating a selection of the first item and pointing the cursor at a last item in a list of items and indicating a selection of all items from the first item to the last item in the list; (c) drawing a selection rectangle by a dragging operation of the cursor, etc. Thus operation 2101 shown in FIG. 21 receives one or more inputs indicating a selection of a plurality of items. The system in operation 2103 receives a command requesting both the creation of a new storage facility (e.g. a folder) and an association of the plurality of items with the new storage facility. While the operation 2103 is shown following operation 2101, in certain embodiments operation 2103 may precede operation 2101. The association of operation 2103 may be a copy or a move operation. For example, the user may select multiple items and then command the system to move those items from their existing locations to a new folder which is created in one operation as a result of the move and create new folder command. In response to the command received in operation 2103, the system creates a new storage facility, such as a new folder, with a predetermined directory path name or a user specified path name and the system further associates the selected plurality of items with the new storage facility. This association may be either a move or a copy operation. A copy operation would typically involve making a copy of each selected item and storing the item with a path name that reflects the storage of the item within the new folder having a predetermined directory path name or a user specified directory path name. A move operation, in which the items are moved into the new folder, may merely change the path names associated with each of the selected items (rather than making a copy of the items) which changed path names will reflect the new file system location (e.g. within the subdirectory of the new folder) of the selected items.

Figure 21:
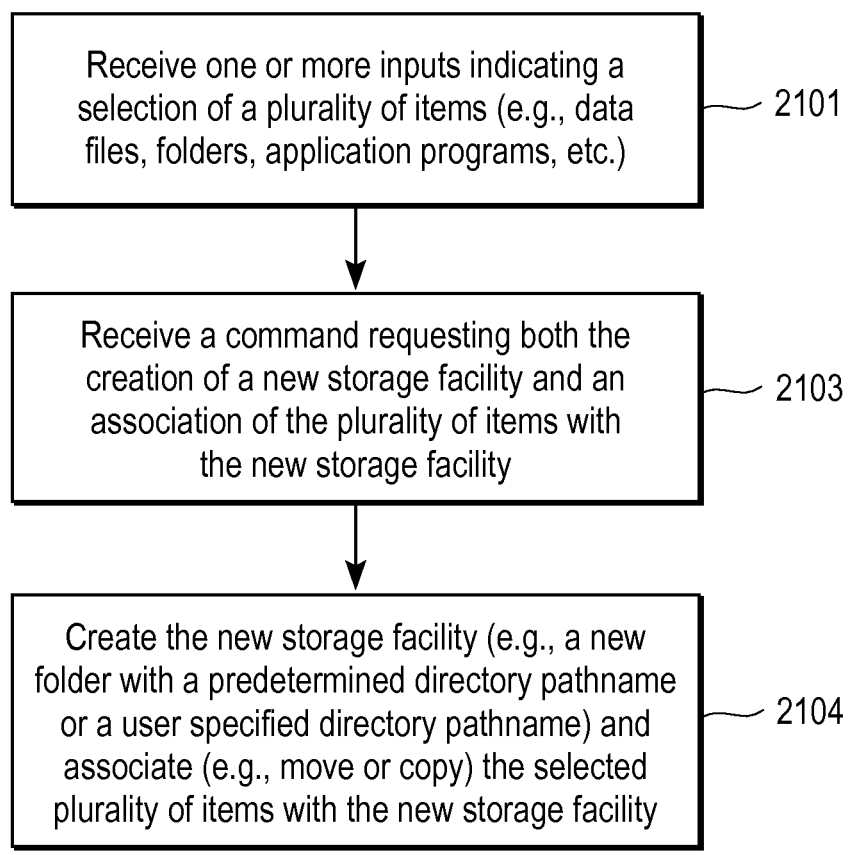
FIG. 21 is a flow chart showing another exemplary method of the present invention.
Figure 22A:
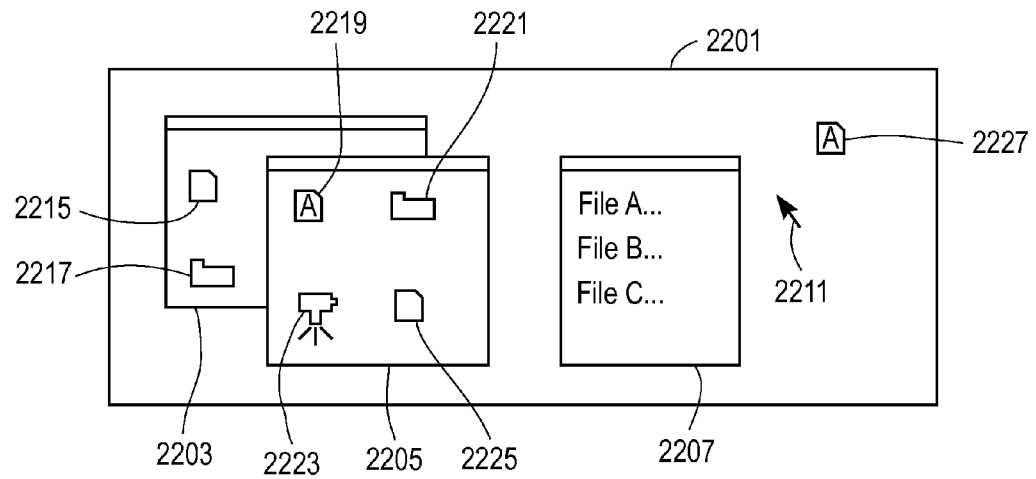
FIGS. 22A, 22B, 22C, and 22D illustrate the display of a display device on which an embodiment of the method of FIG. 21 is performed.
Figure 22B:
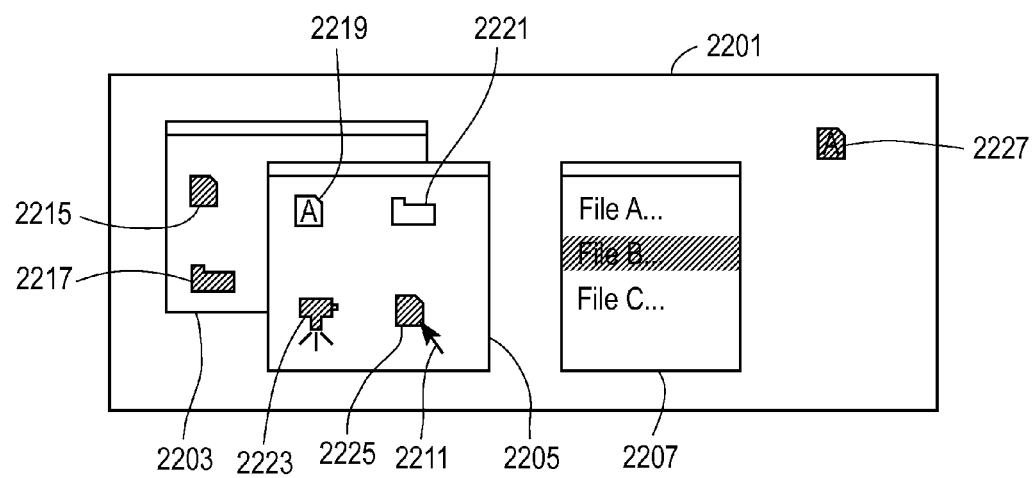
Figure 22C:
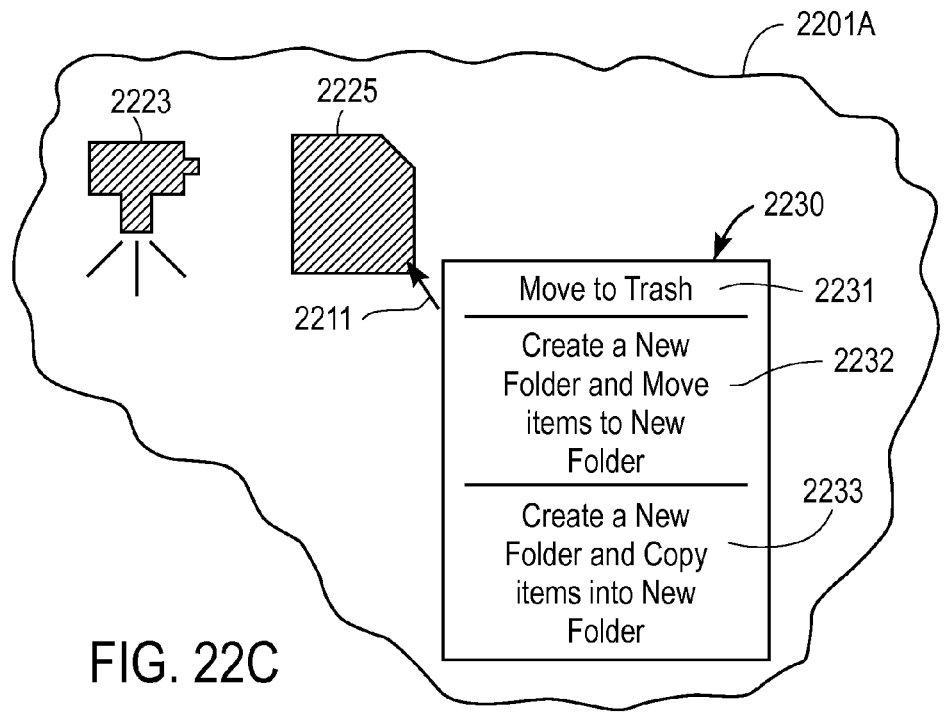
Figure 22D:
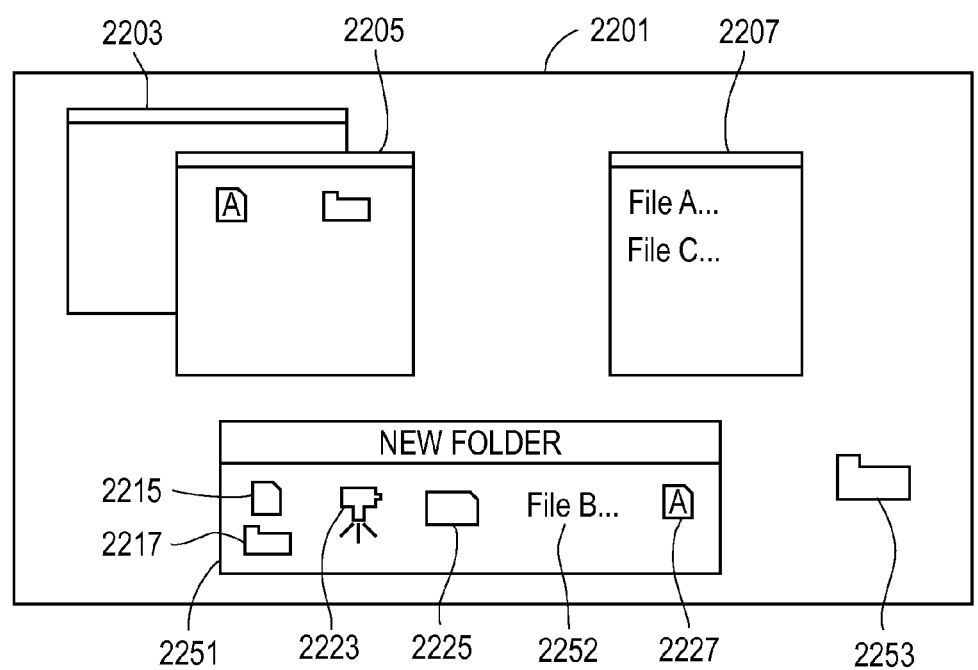

FIGS. 22A-22D show one example of the method of FIG. 21. A desktop 2201 on a display device is shown containing multiple windows and also an icon 2227 on the desktop. A cursor 2211 is also shown on the desktop. The windows 2203, 2205, and 2207 each contain a plurality of items shown as icons. In particular, window 2203 includes a data file represented by icon 2215 in a folder (e.g. a graphical representation of a subdirectory in a file storage system) represented by icon 2217. The window 2205 includes a program icon 2223 and a document icon 2219 and another document icon 2225 and a folder icon 2221. The window 2207 shows a list view of several files including "File B." The user may then, using the cursor 2211 or using other conventional user interface techniques, select multiple items. This may be done with one input or more inputs which indicate the selection of multiple items. FIG. 22B shows the result of the user having selected icons 2215, 2217, 2223, 2225, 2227, and "File B" in window 2207. It can be seen that the cursor 2211 is positioned adjacent to the icon 2225 at this point in the operation. Then the user, after having selected a plurality of items, may invoke the command referred to in operation 2103. An example of this is shown in FIG. 22C which represents a portion of the desktop 2101, which portion is designated 2201A as shown in FIG. 22C. The user has caused a pop up menu 2230 to appear, which pop up menu includes three options 2231, 2232, and 2233. Option 2231 would allow a user to move all the selected items into the trash (e.g. delete them) while options 2232 and 2233 relate to the command referred to in operation 2103 of FIG. 21. In particular, option 2232 is a command which is selectable by the user to create a new folder and, in the same operation, move the items which have been selected into the new folder. Option 2233 is a command which allows the user to, in one operation, create a new folder and copy the selected items into the new folder. In the example shown in FIGS. 22A-22D, the user will select option 2232, thereby causing the system to create a new storage facility, such as a new folder with a predetermined directory name (e.g. "new folder") or alternatively, a user specified path name. This result is shown in FIG. 22D in which the desktop 2201 now includes a new window labeled "new folder" which represents and shows the contents of this new folder, which is also shown as the folder 2253 which is a graphical user interface representation of this new folder.

It will be appreciated that this method may employ various alternatives. For example, a window may appear after the command option 2232 or 2233 has been selected, and this window asks for a name for the new folder. This window may display a default name (e.g. "new folder") in case the user does not enter a new name. Alternatively, the system may merely give the new folder or new storage facility a default path name. Also, the system may merely create the new folder and move or copy the items into the new folder without showing the new window as shown in FIG. 22D.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method comprising:
displaying a plurality of categories in a column, wherein each category includes one or more selectable options;
receiving a selection of a first option corresponding to a first category;
in response to receiving the selection of the first option, displaying the first option with a visual appearance indicating that the first option is selected, generating a first search query using the first option, performing a first search using the first search query, and displaying first search results of the first search, wherein the search results of the first search include text data and image data;
receiving a selection of a second option corresponding to a second category different from the first category;
in response to the selection of the second option, displaying the second option with a visual appearance indicating that the second option is selected, displaying a selectable clear control associated with the second category, generating a second search query combining the first option and the second option, performing a second search using the second search query, and displaying search results of the second search;
receiving a selection of the clear control; and
in response to the selection of the clear control, no longer displaying the second option with the visual appearance indicating that the second option is selected, no longer displaying the clear control associated with the second category, continuing to display the first option with the visual appearance indicating the first option is selected, generating a third search query using the first option and excluding the second option, performing a third search using the third search query, and displaying search results of the third search.

2. The machine-implemented method of claim 1, wherein the search results of the second search are a subset of the search results of the first search.

3. The machine-implemented method of claim 1, wherein the visual appearance indicating the first option or the second option is selected includes displaying the first option or the second option in bold text.

4. The machine-implemented method of claim 1, wherein the selection of the second option limits the search results of the second search to text and image data with metadata that corresponds to the second option.

5. The machine-implemented method of claim 1, further comprising:
receiving a selection of one of the search results of the third search.

6. The machine-implemented method of claim 1, wherein the first option or the second option corresponds to an author.

7. The machine-implemented method of claim 1, wherein the first option or the second option corresponds to content.

8. The machine-implemented method of claim 1, wherein the first option or the second option corresponds to a rating.

9. A non-transitory machine-readable medium storing instructions to cause a processing device to perform a method comprising:
displaying a plurality of categories in a column, wherein each category includes one or more selectable options;
receiving a selection of a first option corresponding to a first category;
in response to receiving the selection of the first option, displaying the first option with a visual appearance indicating that the first option is selected, generating a first search query using the first option, performing a first search using the first search query, and displaying first search results of the first search, wherein the search results of the first search include text data and image data;
receiving a selection of a second option corresponding to a second category different from the first category;
in response to the selection of the second option, displaying the second option with a visual appearance indicating that the second option is selected, displaying a selectable clear control associated with the second category, generating a second search query combining the first option and the second option, performing a second search using the second search query, and displaying search results of the second search;
receiving a selection of the clear control; and
in response to the selection of the clear control, no longer displaying the second option with the visual appearance indicating that the second option is selected, no longer displaying the clear control associated with the second category, continuing to display the first option with the visual appearance indicating the first option is selected, generating a third search query using the first option and excluding the second option, performing a third search using the third search query, and displaying search results of the third search.

10. The machine-readable medium of claim 9, wherein the search results of the second search are a subset of the search results of the first search.

11. The machine-readable medium of claim 9, wherein the visual appearance indicating the first option or the second option is selected includes displaying the first option or the second option in bold text.

12. The machine-readable medium of claim 9, wherein the selection of the second option limits the search results of the second search to text and image data with metadata that corresponds to the second option.

13. The machine-readable medium of claim 9 wherein the instructions further cause the processing device to receive a selection of one of the search results of the third search.

14. The machine-readable medium of claim 9, wherein the first option or the second option corresponds to an author.

15. The machine-readable medium of claim 9, wherein the first option or the second option corresponds to content.

16. The machine-readable medium of claim 9, wherein the first option or the second option corresponds to a rating.

17. An apparatus comprising:
a memory storing instructions;
a processing device coupled to the memory, the processing device to execute the instructions, wherein execution of the instructions causes the apparatus to
display a plurality of categories in a column, wherein each category includes one or more selectable options;
receive a selection of a first option corresponding to a first category;
in response to receiving the selection of the first option, display the first option with a visual appearance indicating that the first option is selected, generate a first search query using the first option, perform a first search using the first search query, and display first search results of the first search, wherein the search results of the first search include text data and image data;
receive a selection of a second option corresponding to a second category different from the first category;
in response to the selection of the second option, display the second option with a visual appearance indicating that the second option is selected, display a selectable clear control associated with the second category, generate a second search query combining the first option and the second option, perform a second search using the second search query, and display search results of the second search;
receive a selection of the clear control; and
in response to the selection of the clear control, no longer display the second option with the visual appearance indicating that the second option selected, no longer display the clear control associated with the second category, continue to display the first option with the visual appearance indicating the first option is selected, generate a third search query using the first option and excluding the second option, perform a third search using the third search query, and display search results of the third search.

18. The apparatus of claim 17, wherein the search results of the second search are a subset of the search results of the first search.

19. The apparatus of claim 17, wherein the visual appearance indicating the first option or the second option is selected includes displaying the first option or the second option in bold text.

20. The apparatus of claim 17, wherein the selection of the second option limits the search results of the second search to text and image data with metadata that corresponds to the second option.

21. The apparatus of claim 17, wherein execution of the instructions by the processing device further includes receiving a selection of one of the search results of the third search.

22. The apparatus of claim 17, wherein the first option or the second option corresponds to an author.

23. The apparatus of claim 17, wherein the first option or the second option corresponds to content.

24. The apparatus of claim 17, wherein the first option or the second option corresponds to a rating.

* * * * *